United States Patent
Liu et al.

(10) Patent No.: US 12,520,009 B2
(45) Date of Patent: Jan. 6, 2026

(54) SYSTEM AND METHOD FOR LIVESTREAM SMART ASSISTANCE

(71) Applicant: HYTTO PTE. LTD, Singapore (SG)

(72) Inventors: Dan Liu, Singapore (SG); Jilin Qiu, Singapore (SG); Hui Liao, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 19/316,655

(22) Filed: Sep. 2, 2025

(65) Prior Publication Data

US 2025/0386075 A1     Dec. 18, 2025

Related U.S. Application Data

(63) Continuation-in-part of application No. 19/278,425, filed on Jul. 23, 2025, which is a continuation-in-part of application No. 18/762,120, filed on Jul. 2, 2024, now Pat. No. 12,375,774, which is a continuation-in-part of application No. 17/806,078, filed on Jun. 8, 2022, now Pat. No. 12,155,899, said application No. 18/762,120 is a continuation-in-part of application No. 18/189,172, filed on Mar. 23, 2023.

(51) Int. Cl.
*H04N 21/466* (2011.01)
*H04N 21/2187* (2011.01)
*H04N 21/431* (2011.01)
*H04N 21/4788* (2011.01)

(52) U.S. Cl.
CPC ....... *H04N 21/466* (2013.01); *H04N 21/2187* (2013.01); *H04N 21/431* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 12,155,899 B2* | 11/2024 | Liu | H04N 21/4788 |
| 12,375,774 B2* | 7/2025 | Liu | H04N 21/2407 |
| 2022/0417566 A1 | 12/2022 | Tang | |
| 2023/0128243 A1* | 4/2023 | Sundareson | H04N 21/234345 |
| 2024/0357211 A1 | 10/2024 | Liu | |
| 2025/0063008 A1* | 2/2025 | Liu | H04N 21/478 |
| 2025/0126305 A1* | 4/2025 | Hsu | H04L 51/02 |
| 2025/0220081 A1* | 7/2025 | Liu | A61H 19/00 |

* cited by examiner

*Primary Examiner* — Junior O Mendoza
*(74) Attorney, Agent, or Firm* — Keefe IP Law, PLLC

(57) ABSTRACT

An interaction method is disclosed. The interaction method includes invoking a monitoring module to monitor, via an agentic AI, operational data associated with a livestream of a model user, wherein the operational data includes passive data not acted on by the model user without prompting, and invoking a judgment module to determine, via the agentic AI, whether the operational data satisfies a trigger condition. The interaction method also includes invoking a speculation module to speculate, via the agentic AI, at least one demand of the model user based on the operational data and the trigger condition, in response to a determination that the operational data satisfies the trigger condition, and invoking a determination module to determine, via the agentic AI, at least one execution module and an execution instruction corresponding to the at least one demand of the model user.

20 Claims, 21 Drawing Sheets

SYSTEM AND METHOD FOR LIVESTREAM SMART ASSISTANCE

CROSS-REFERENCE TO RELATED APPLICATIONS

This application claims priority to nonprovisional application Ser. No. 19/278,425 filed Jul. 23, 2025, nonprovisional application Ser. No. 18/189,172 filed Mar. 23, 2023, nonprovisional application Ser. No. 18/762,120 filed Jul. 2, 2024, and subsequently issued as U.S. Pat. No. 12,375,774 on Jul. 29, 2025, and nonprovisional application Ser. No. 17/806,078 filed Jun. 8, 2022, and subsequently issued as U.S. Pat. No. 12,155,899 on Nov. 26, 2024, the entire disclosure of each of which is incorporated herein by reference.

FIELD OF THE INVENTION

The present disclosure generally relates to a system and method for smart assistance, and more particularly to a system and method for livestream smart assistance.

BACKGROUND OF THE INVENTION

Models, such as pornographic models, often engage in livestreaming erotic videos to viewers as a safe and lucrative way to engage in erotic work. Such livestreaming typically involves significant amounts of dynamically changing data regarding various aspects of the livestreaming and viewer actions in response to the livestreaming.

It is often difficult for models to both perform in a live broadcast and also monitor, manage, and act on real-time data associated with that livestream. For example, when models are livestream broadcasting, they often cannot pay attention to all of the data generated in a live broadcast room. Models often miss valuable information, particularly in pornographic live broadcasts. This is often because models are typically performing various actions for viewers and usually cannot pay attention to the dynamic information of a live broadcast, such as audience comments, rewards, and audience entry and exit from the live broadcast.

In addition, before a live broadcast and during livestreaming, models often encounter problems such as complicated settings and setting errors in the use of applications. Further, models may experience overlooked issues and an inability to attend to viewer and system messaging during livestreaming due to actively managing streaming and performing in the live broadcast.

Accordingly, a need in the art exists for an efficient and convenient technique for models engaging in a live broadcast to manage significant amounts of dynamically changing data associated with that live broadcast.

The exemplary disclosed system and method are directed to overcoming one or more of the shortcomings set forth above and/or other deficiencies in existing technology.

SUMMARY OF THE INVENTION

In one exemplary aspect, the present disclosure is directed to an interaction method. The interaction method includes invoking a monitoring module to monitor, via an agentic AI, operational data associated with a livestream of a model user, wherein the operational data includes passive data not acted on by the model user without prompting, and invoking a judgment module to determine, via the agentic AI, whether the operational data satisfies a trigger condition. The interaction method also includes invoking a speculation module to speculate, via the agentic AI, at least one demand of the model user based on the operational data and the trigger condition, in response to a determination that the operational data satisfies the trigger condition, invoking a determination module to determine, via the agentic AI, at least one execution module and an execution instruction corresponding to the at least one demand of the model user, and invoking the at least one execution module to perform, via the agentic AI, a corresponding user-perceptible operation based on the execution instruction, wherein the user-perceptible operation is configured to address the at least one demand of the model user.

In another aspect, the present disclosure is directed to an interaction system. The interaction system includes a monitoring module, a judgment module, a speculation module, a determination module, and at least one execution module, the modules comprising computer-executable code stored in non-volatile memory, and a memory for storing instructions and a processor for executing the instructions. The computer-executable code, when operating on the processor, causes the system to invoke the monitoring module to monitor, via an agentic AI, operational data associated with a livestream of a model user, wherein the operational data includes passive data not acted on by the model user without prompting, and invoke the judgment module to determine, via the agentic AI, whether the operational data satisfies a trigger condition. The computer-executable code, when operating on the processor, also causes the system to invoke the speculation module to speculate, via the agentic AI, at least one demand of the model user based on the operational data and the trigger condition, in response to a determination that the operational data satisfies the trigger condition, invoke the determination module to determine, via the agentic AI, at least one execution module and an execution instruction corresponding to the at least one demand of the model user, and invoke the at least one execution module to perform, via the agentic AI, a corresponding user-perceptible operation based on the execution instruction, wherein the user-perceptible operation is configured to address the at least one demand of the model user.

In another aspect, the present disclosure is directed to an interactive method. The interactive method includes monitoring, using a monitoring module, operational data of a live broadcast of a live broadcast platform, the operational data of the live broadcast including at least one of operational data of the live broadcast associated with a model and operational data of the live broadcast of other models of the live broadcast platform; determining, using a determination module, execution information in response to the operational data of the live broadcast satisfying triggering of a reminder event, wherein the execution information includes determining an application module as an execution object for executing a corresponding reminder operation; and executing, using the application module, the corresponding reminder operation in response to the execution information, wherein the corresponding reminder operation is configured to characterize the reminder event to the model.

In another aspect, the present disclosure is directed to an interactive system. The interactive system includes a monitoring module, a determination module, and an application module, the modules comprising computer-executable code stored in non-volatile memory; and a memory for storing instructions and a processor for executing the instructions. The computer-executable code, when operating on the processor, causes the system to monitor, using the monitoring module, operational data of a live broadcast of a live broadcast platform, the operational data of the live broadcast including at least one of operational data of the live broadcast associated with a model and operational data of the live broadcast of other models of the live broadcast platform; determine, using the determination module, execution information in response to the operational data of the live broadcast satisfying triggering of a reminder event, wherein the execution information includes determining the application module as an execution object for executing a corresponding reminder operation; and execute, using the application module, the corresponding reminder operation in response to the execution information, wherein the corresponding reminder operation is configured to characterize the reminder event to the model.

DETAILED DESCRIPTION AND INDUSTRIAL APPLICABILITY

Figure 1:
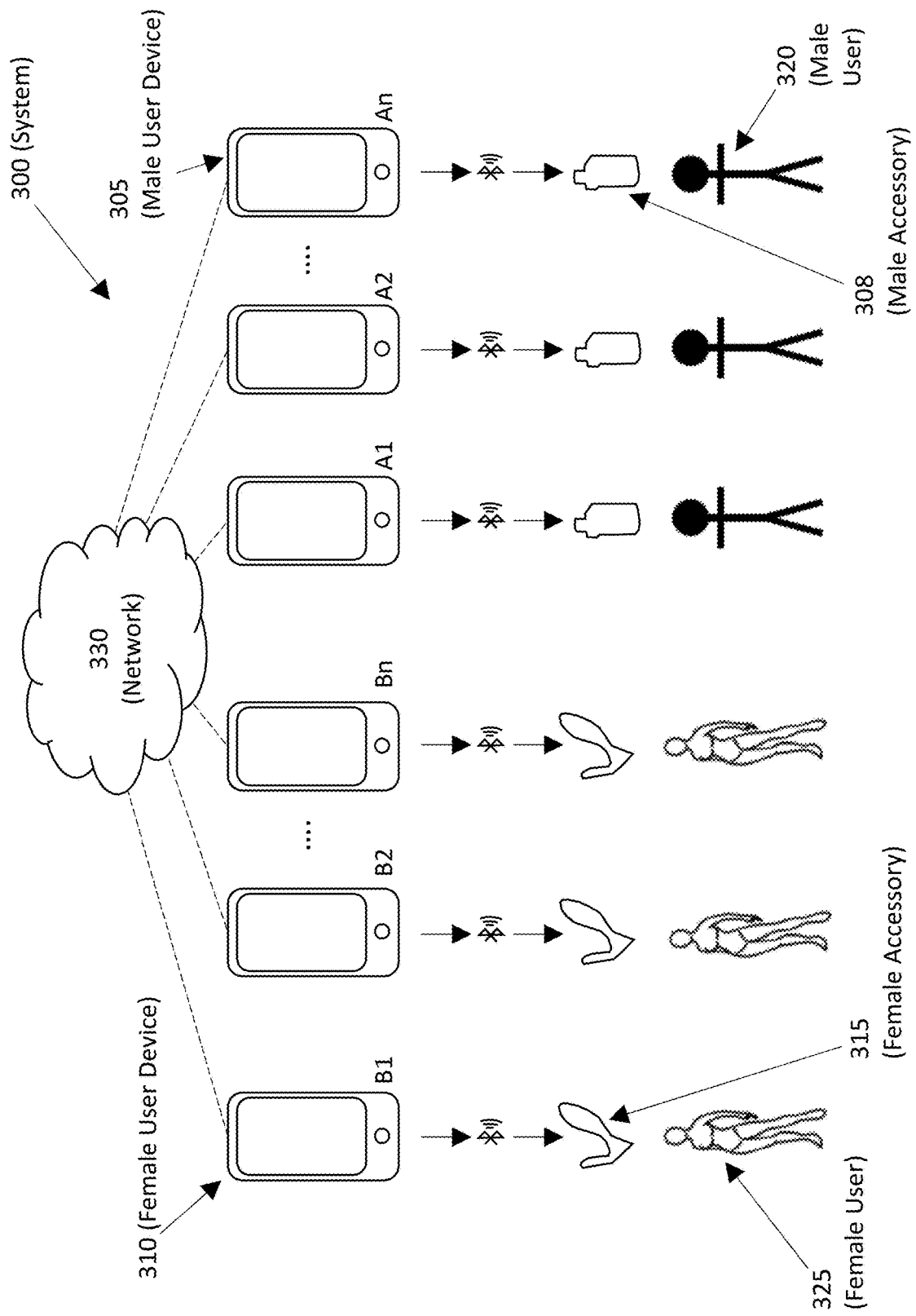
FIG. 1 is a schematic illustration of an exemplary system of the present invention.

FIG. 1 illustrates an exemplary system 300 for providing a live broadcast (e.g., a livestream broadcast) including for example controlling devices such as adult devices (e.g., adult toys) as part of the live broadcast. For example, system 300 may include a live broadcast platform. In at least some exemplary embodiments, system 300 may be a system for providing livestream smart assistance. In at least some exemplary embodiments, a model performing in a live broadcast may utilize the exemplary disclosed livestream smart assistance to quickly and efficiently be notified of and/or respond to notifications provided during a live broadcast.

As illustrated in FIG. 1, system 300 may include one or more male user devices 305, one or more female user devices 310, one or more male accessories 308, and one or more female accessories 315. For example, system 300 may include a plurality of male user devices 305, a plurality of male accessories 308, a plurality of female user devices 310, and a plurality of female accessories 315. Data such as image data, audio data, and/or control data may be transferred between male user devices 305, male accessories 308, female user devices 310, and female accessories 315.

Returning to FIG. 1, system 300 may include any desired number of male user devices 305 (e.g., A1, A2, . . . . An). Male user device 305 may be any suitable device for interfacing with other components of system 300 such as a computing device (e.g., user interface). For example, male user device 305 may be any suitable user interface for receiving input and/or providing output (e.g., image data) to a male user 320. Male user device 305 may include a camera and a microphone. Male user device 305 may be, for example, a touchscreen device (e.g., of a smartphone, a tablet, a smartboard, and/or any suitable computer device), a wearable device, a computer keyboard and monitor (e.g., desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 29 and 30). For example, male user device 305 may include a touchscreen device of a smartphone or handheld tablet. For example, male user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on male user device 305 and utilized by male user 320.

Figure 2:
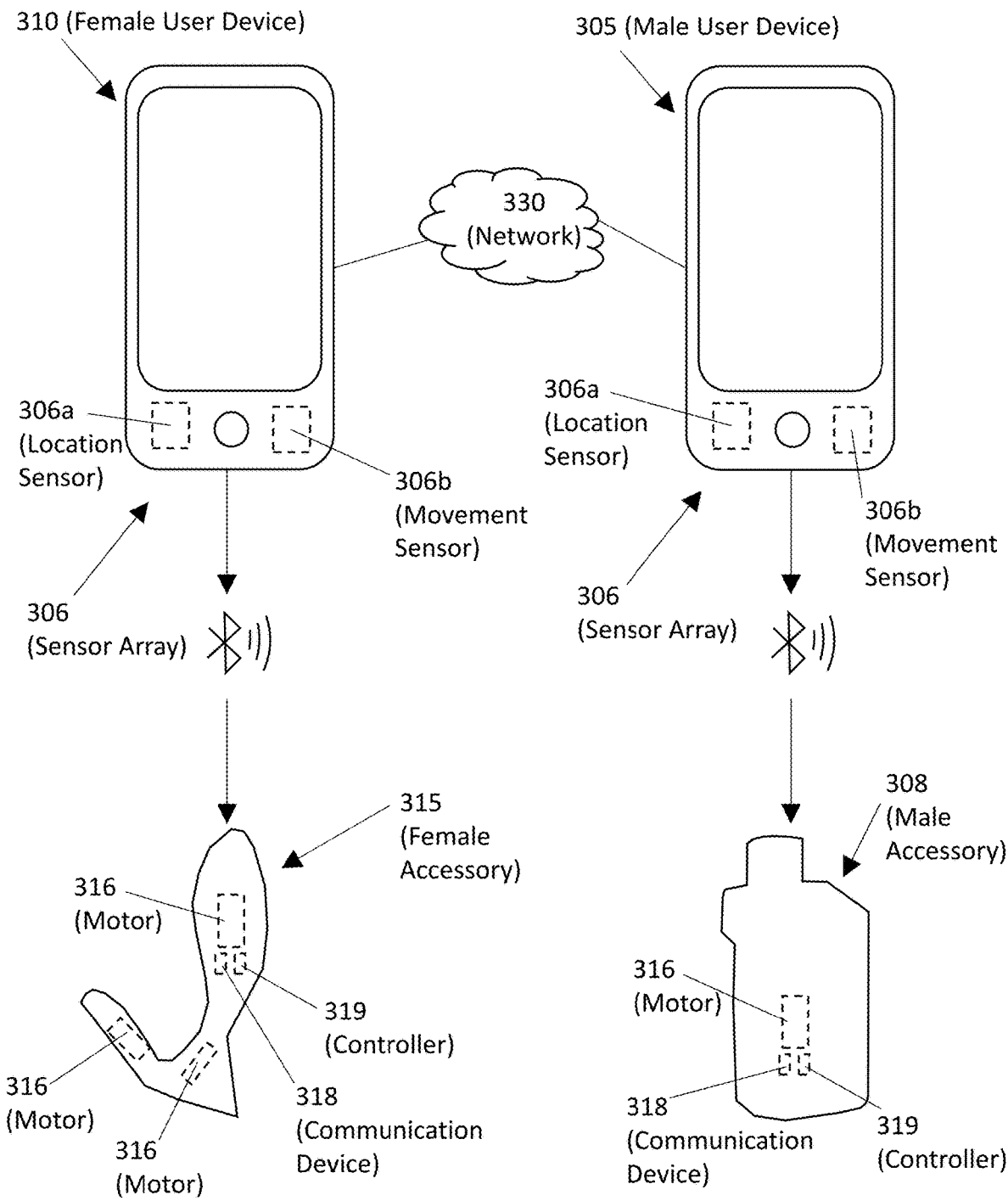
FIG. 2 is schematic illustration of an exemplary accessories of the exemplary disclosed system.

As illustrated in FIG. 2, male user device 305 may include a sensor array 306. In at least some exemplary embodiments, sensor array 306 may include one or more sensors integrated or built into the exemplary disclosed user device (e.g., male user device 305) such as, for example, a mobile phone, a pad, or a wearable device. Sensor array 306 may include any suitable sensors for use with system 300 such as, for example, a location sensor 306a and a movement sensor 306b. Location sensor 306a may include a GPS device, a Galileo device, a GLONASS device, an IRNSS device, a BeiDou device, and/or any other suitable device that may operate with a global navigation system.

Movement sensor 306b may include any suitable components for sensing motion (e.g., motion amplitude), velocity, and/or acceleration. Movement sensor 306b may include an acceleration sensor. Movement sensor 306b may include a gyroscope. For example, movement sensor 306b may include a displacement sensor, a velocity sensor, and/or an accelerometer. For example, movement sensor 306b may include components such as a servo accelerometer, a piezoelectric accelerometer, a potentiometric accelerometer, and/or a strain gauge accelerometer. Movement sensor 306b may include a piezoelectric velocity sensor or any other suitable type of velocity or acceleration sensor.

System 300 may include any desired number of female user devices 310 (e.g., B1, B2, . . . Bn). Female user device 310 may be similar to male user device 305. For example, female user device 310 may be any suitable user interface for receiving input and/or providing output (e.g., image data) to a female user 325. Female user 325 may operate female user device 310 to record and transfer image (e.g., video) and audio data to one or more male users 320 and/or other female users 325 via a network 330. Additional exemplary disclosed devices and/or users of any desired gender may also be included in the exemplary disclosed system (e.g., a non-binary user and/or a non-binary user device and/or non-binary accessory similar to the examples described herein).

Female accessory 315 may be any suitable accessory for use by female user 325 (e.g., when female user 325 is imaged by female user device 310). For example, female accessory 315 may be a prop that is used by female user 325 while female user 325 is being imaged (e.g., a video or pictures of female user 325 are being recorded and/or transmitted in real-time to be viewed by male user 320 and/or another female user 325). For example, female accessory 315 may be a device used for erotic stimulation (e.g., a sex aid or a "sex toy"). Female accessory 315 may be a sexual stimulation device that may be associated with a given female user 325 and respective female user device 310 of that given female user 325. In at least some exemplary embodiments, female accessory 315 may be a massaging apparatus for human genitalia (e.g., a vibrator). For example, female accessory 315 may be any suitable device for use in a video or pictures recorded by female user device 310, which may be an erotic video or erotic pictures). In at least some exemplary embodiments, female accessory 315 may be a tool or other indicator that may be used in video or pictures recorded by female user device 310 such as a sign providing information such as location or time information, a surveillance tool used by female user 325, and/or any other suitable tool or accessory that may be used while female user device 310 is recording a video or pictures of female user 325. For example, female user 325 may be an erotic model using female accessory 315 that may be an erotic device, a technician or laborer using female accessory 315 that may be a tool or work device specific to a desired application, an operative using female accessory 315 that may be a surveillance tool or a part of a weapon system being recorded by female user device 310, and/or any other desired role using any suitable female accessory 315.

Female accessory 315 may include one or more driving components such as one or more motors 316. Motor 316 may include an electric motor. Motor 316 may include a server motor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be a reversible electric motor (e.g., a reversible electric motor). Motor 316 may be a unidirectional motor (e.g., a one-way motor). Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Female accessory 315 may include a controller 319 that may be any suitable computing device for controlling an operation of motor 316 and a communication device 318. Controller 319 may, for example, include components similar to the components described below regarding FIG. 29. Controller 319 may include for example a processor (e.g., micro-processing logic control device) or board components. Controller 319 may control one or more motors 316 based on input data and/or commands (e.g., control commands) received from male user device 305 and/or female user device 310 via a network 330 and/or communication device 318 (e.g., transferred directly to communication device 318 by any suitable component of system 300). Motor 316 may be controlled by controller 319 to vibrate female accessory 315 at a desired level or strength, perform a suction operation at a desired level or strength using female accessory 315 (e.g., using female accessory 315 as a suction device), rotate or swing female accessory 315 at a desired speed or amount, contract or expand female accessory 315 by a desired amount, cause female accessory 315 to perform an inhalation action, and/or cause female accessory 315 to perform any other suitable action or function.

In at least some exemplary embodiments, motor 316 may be or may include a thermal device such as a heater (e.g., or a cooler or any other suitable thermal device). Alternatively for example, a heater unit and the exemplary disclosed motor may be separately provided (e.g., installed) in the exemplary disclosed adult toy. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from female accessory 315. For example, motor 316 may cause a temperature variation of female accessory 315.

Returning to FIG. 2, male accessory 308 may include components generally similar to female accessory 315 and may operate generally similarly to female accessory 315.

Male accessory 308 may be a sexual stimulation device that may be associated with a given male user 320 (e.g., a viewer of one or more female users 325 and/or male users 320; or a male model) and respective male user device 305 (e.g., a viewer device) of that given male user 320.

Network 330 may be any suitable communication network over which data may be transferred between one or more male user devices 305, one or more male accessories 308, one or more female user devices 310, and/or one or more female accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electromechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 30. Male user devices 305, male accessories 308, female user devices 310, and/or female accessories 315 may include any suitable communication components for communicating with other components of system 300 using for example the communication techniques described above. For example, male user devices 305 and female user devices 310 may include integrally formed communication devices (e.g., smartphone components), and male accessories 308 and female accessories 315 may each include communication device 318 that may communicate using any of the exemplary disclosed communication techniques.

In at least some exemplary embodiments, a given female accessory 315 may communicate with a given female user device 310 (e.g., a paired female user device 310) via any suitable short distance communication technique. For example, female accessories 315 (e.g., via communication device 318) and female user devices 310 may communicate via Wifi, Bluetooth, ZigBee, NFC, IrDA, and/or any other suitable short distance technique. Female accessory 315 may be an adult toy that may be connected with female user device 310 through short distance wireless communication. An application (e.g., operating using the exemplary disclosed modules) may be installed on female user device 310, the application and female user device 310 being configured to send commands to female accessory 315 to drive (e.g., actuate) female accessory 315. Male accessory 308 may communicate with male user device 305 similarly to the communication of female accessory 315 and female user device 310 described above.

System 300 may include one or modules for performing the exemplary disclosed operations such as, for example, the exemplary disclosed monitoring module, determination module, application module, analysis module, and/or display module for example as described below. The one or more modules may include an accessory control module for controlling male accessory 308 and female accessory 315. The one or more modules may be stored and operated by any suitable components of system 300 (e.g., including processor components) such as, for example, network 330, male user device 305, male accessory 308, female user device 310, female accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 29 and 30. For example, the exemplary disclosed buffer storage may include components similar to the exemplary storage medium and RAM described below regarding FIG. 29. The exemplary disclosed buffer storage may be implemented in software and/or a fixed memory location in hardware of system 300. The exemplary disclosed buffer storage (e.g., a data buffer) may store data temporarily during an operation of system 300.

The one or more exemplary disclosed modules may include software modules running on model equipment. The software modules may include a smart panel (e.g., as described below), game plug-ins, and/or toy control plug-ins (e.g., for the exemplary disclosed toys) that may assist models in live broadcasting.

Figure 3:
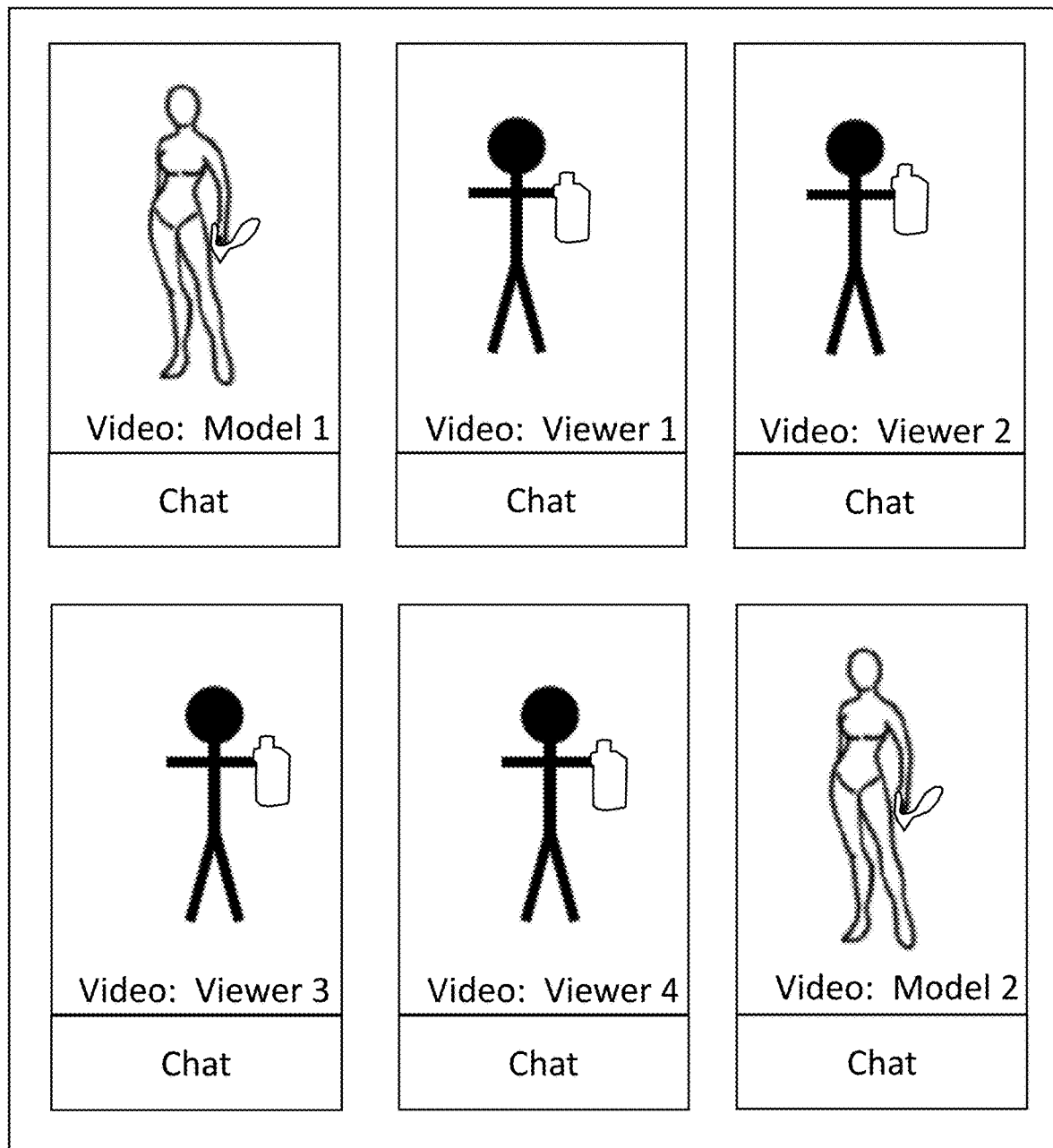
FIG. 3 is a schematic illustration of an exemplary embodiment of the exemplary disclosed system.

The one or more exemplary disclosed modules may also provide a chat room interface via one or more male user devices 305 and/or one or more female user devices 310 for use by male users 320 and female users 325. For example, video display of female user 325, one or more male users 320, and/or and a chat or messaging app (e.g., any suitable chat communication or messaging app such as, for example, text, voice, and/or video chat boxes) may be displayed to each male user 320 via male user device 305 and to each female user 325 via female user device 310. One or more male users 320 and one or more female users 325 may thereby view and chat (e.g., text, voice, and/or video chat) with each other via the one or more exemplary disclosed modules via respective male user devices 305 and female user devices 310. Male users 320 and female users 325 may thereby view, interact with, and/or chat (e.g., text, voice, and/or video chat) with other female users 325 and/or other male users 320 (e.g., and/or any other users of an gender such as non-binary users as described above or any other gender). For example, multiple text, voice, and/or video chat boxes including a plurality of male users 320 (e.g., viewers or models each having one or more male accessories 308) and/or a plurality of female users 325 (e.g., viewers or models each having one or more female accessories 315) may be displayed to each male user 320 and each female user 325 via respective male user devices 305 and female user devices 310. Male users 320 and female users 325 may thereby view and interact with other male users 320 and female users 325 that may each have one or more respective accessories (e.g., respective male accessories 308 and female accessories 315). FIG. 3 schematically illustrates an exemplary embodiment of the exemplary disclosed chat room that may be displayed to male user 320 via male user device 305 or to female user 325 via female user device 310.

Figure 4:
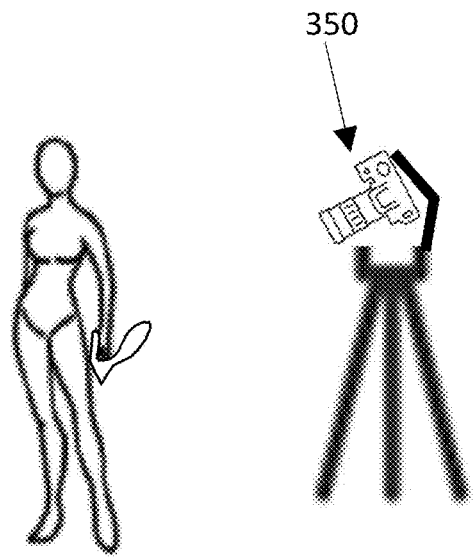
FIG. 4 is a schematic illustration of an exemplary embodiment of the exemplary disclosed system.

In at least some exemplary embodiments and as illustrated in FIG. 4, system 300 may further include an imaging device 350. Imaging device 350 may be used directly and/or indirectly to provide data to be used in an operation of system 300. For example, imaging device 350 may be a camera that may be used to obtain user input (e.g., data of gesturing images made by the user) by any suitable imaging technique (e.g., for example as described herein).

Imaging device 350 may be any suitable imaging device such as a camera. For example, imaging device 350 may be any suitable video camera such as a digital video camera, a webcam, and/or any other suitable camera for recording visual data (e.g., recording a video or taking pictures) and/or image recognition. Imaging device 350 may be a 3D camera. Imaging device 350 may be a headset that may be worn by a user (e.g., male user 320 or female user 325). Imaging device 350 may be a spatial computing device (e.g., a spatial computer). Imaging device 350 may utilize any suitable spatial computing features and/or techniques (e.g., similar to Apple Vision Pro). Imaging device 350 may be for example a three-dimensional video sensor or camera. One or more imaging devices 350 may include a plurality of cameras or a single camera configured to collect three-dimensional image data. In at least some exemplary embodiments, imaging device 350 may be a stereoscopic camera and/or any other suitable device for stereo photography, stereo videography, and/or stereoscopic vision. Imaging device 350 may be substantially entirely integrated into the exemplary disclosed user devices or may be a stand-alone device. In at least some exemplary embodiments, imaging device 350 may be a smartphone or tablet camera. Imaging device 350 may provide data to an exemplary image recognition module of system 300. Imaging device 350 may include one or more actuators that may adjust a position of imaging device 350 based on an operation of system 300 (imaging device 350 may also include a support or stand for supporting imaging device 350). The actuators may be for example one or more external actuators disposed at an exterior of imaging device 350 and/or one or more integrated actuators that are completely or partially integrated into imaging device 350 (e.g., disposed and/or integrated within an interior of imaging device 350). In at least some exemplary embodiments, the actuators may be internally integrated into imaging device 350 and may turn optical components and/or move lenses of imaging device 350 within a housing of imaging device 350 to zoom in and out at different features or points within a variable field of view of imaging device 350 (e.g., zoom in and out on points or features of a user and/or exemplary disclosed accessories). The actuator may also be one or more external and/or internally-integrated mechanical actuators configured to mechanically turn imaging device 350 and move lenses of imaging device 350 to focus in and out at desired objects (e.g., points and/or features of a user and/or an accessory). System 300 may also include an image recognition module that may perform feature detection and matching to allow for matching and comparison of features imaged by imaging device 350. For example, imaging device 350 may find predetermined features that may correspond to two-dimensional and/or three-dimensional surfaces and/or contours of an object within a field of view of imaging device 350. Also for example, any suitable technique may be used to identify features (e.g., spatial data) of a viewed object (e.g., features of a user and/or accessory) and to match those imaged features to predetermined features provided by system 300 (e.g., or provided by a user). Also for example, optical character recognition of text and/or markings located on a viewed object may be performed. For example, spatial data and/or other data may be determined that may be matched to predetermined data provided by system 300 (e.g., predetermined shapes, colors, text, contours, and other features). For example, the spatial data and/or other data may include data defining points (e.g., or contours) of a user and/or accessory based on an actual image of an object (e.g., the exemplary disclosed accessories) imaged by imaging device 350. For example, spatial and/or data based on viewing an object may be used to match that data to predetermined data to identify points or features of an object being viewed. Any suitable techniques for recognizing objects and/or determining spatial and/or other data of a viewed object may be utilized by system 300 for image recognition via imaging device 350.

The exemplary disclosed system and method may be used in any suitable application for a live broadcast. The exemplary disclosed system and method may be used in any suitable application involving a model livestreaming a video to an audience. For example, the exemplary disclosed system and method may be used in any suitable application for providing a livestream erotic broadcast. The exemplary disclosed system and method may be used in any suitable application involving agentic artificial intelligence (AI). For example, the exemplary disclosed system and method may be used in any suitable application involving the use of agentic AI during a livestreaming broadcast.

Figure 6:
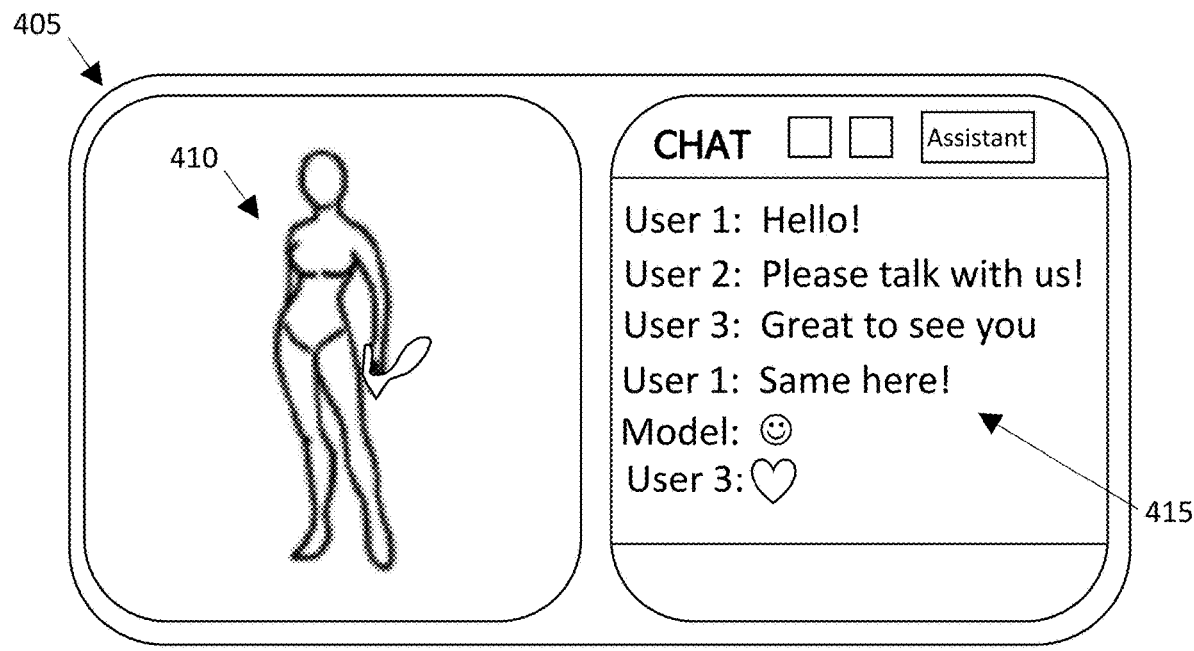
FIG. 6 is a schematic illustration of an exemplary embodiment of the exemplary disclosed system.

In at least some exemplary embodiments and for example as illustrated in FIG. 6, system 300 may be displayed on a graphical user interface such as a GUI 405 on a display or touchscreen of the exemplary disclosed user device to the user (e.g., or a spatial computing interface such as for example similar to Apple Vision Pro). GUI 405 may display the exemplary disclosed live broadcast (e.g., a live broadcast 410) to a model (e.g., female user 325 or male user 320) via the exemplary disclosed user device (e.g., female user device 310 or male user device 305) and/or to one or more viewers (e.g., one or more female users 325 and/or one or more male users 320) via one or more of the exemplary disclosed user devices (e.g., female user devices 310 and/or male user devices 305).

The exemplary disclosed live broadcast may be displayed via any suitable application for livestreaming such as, for example, any suitable video chat application. GUI 405 may also display a chat interface 415 (e.g., chatbox) in addition to the exemplary disclosed live broadcast. The exemplary disclosed chat interface may be any suitable interface for providing data associated with a livestream, providing for communication (e.g., chat) between the exemplary disclosed model and viewers, and/or any other suitable interaction between users of system 300 (e.g., including features similar to as described above regarding FIG. 3).

Figure 7:
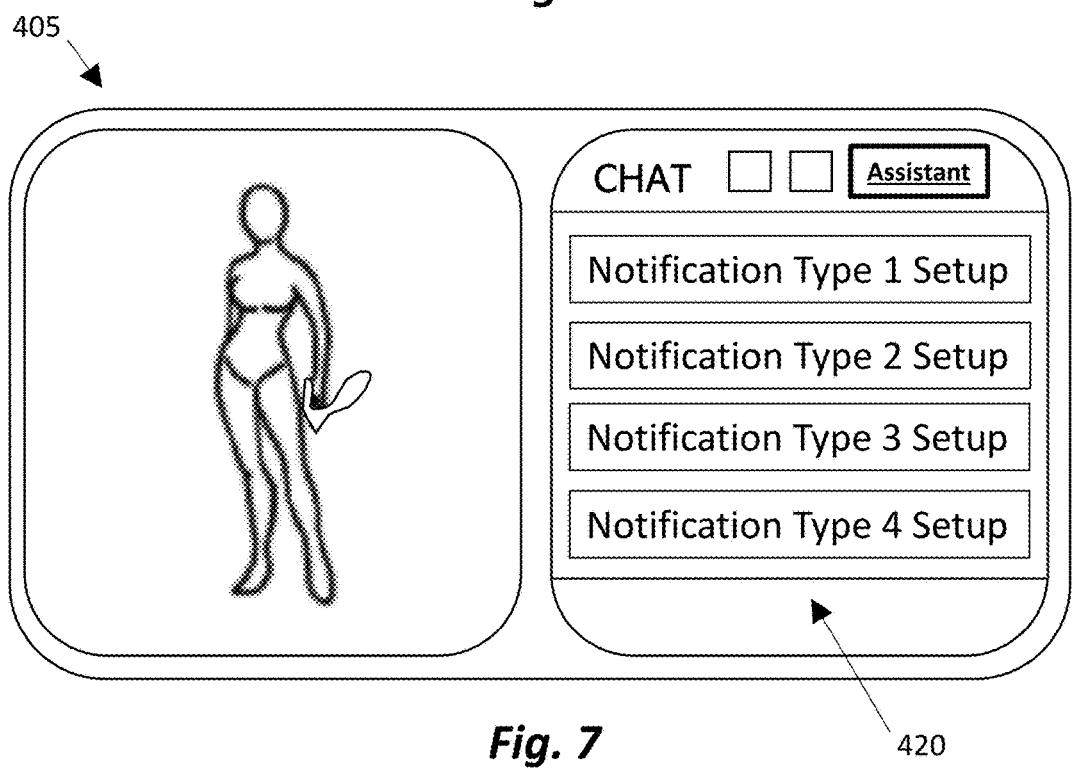
FIG. 7 is a schematic illustration of an exemplary embodiment of the exemplary disclosed system.

A smart assistance panel may be associated with the exemplary disclosed chat interface displayed via GUI 405. For example as illustrated in FIG. 7, a smart assistance panel 420 may be displayed by GUI 405 (e.g., based on a user such as the exemplary disclosed model using GUI 405 to display smart assistance panel 420, for example by clicking on graphical elements designated for display of the exemplary disclosed smart assistance panel).

Smart assistance panel 420 may display the exemplary disclosed setup options related to the exemplary disclosed operational data, execution information, reminder events, execution objects, and reminder operations described below. For example as illustrated in FIG. 7, smart assistance panel 420 may provide setup options related to an amount of tips received by a model, an online viewer count of viewers viewing a model, keywords that may be entered by viewers (e.g., as part of the exemplary disclosed operational data during a livestream), viewer notices, and/or any other suitable setup options. For example, the exemplary disclosed model may use smart assistance panel 420 to set up thresholds and other indicators for generating notification messages for example as described below. Templates and other suitable input aids may be provided to the exemplary disclosed model to facilitate configuring options (e.g., for example templates for notifications based on numbers of online viewers of a model and number of fans of a model). The exemplary disclosed options may be used by system 300 in monitoring the exemplary disclosed operational data for example as described herein. The exemplary disclosed notification messages described herein may be generated based on the setup options configured (e.g., input) by the exemplary disclosed model using smart assistance panel 420 of GUI 405 (e.g., of chat interface 415).

In at least some exemplary embodiments, system 300 may determine whether the exemplary disclosed operational data (e.g., live broadcast data) meets a condition for event triggering. For example, before the model starts a live broadcast, during the live broadcast, and/or after the live broadcast ends, system 300 may determine whether the exemplary disclosed operational data (e.g., specific live broadcast data) meets criteria (e.g., conditions) for event triggering. If the exemplary disclosed operational data is determined as meeting a given condition, system 300 may provide a prompt to the user (e.g., at least one of the exemplary disclosed model and one or more exemplary disclosed viewers, for example of the live broadcast audience) in a predetermined (e.g., preset) manner.

In at least some exemplary embodiments, the exemplary disclosed operational data may further include internet data (e.g., data on the Internet) such as data of certain competition events (e.g., World Cup event or any other desired sporting event, recreational event, or any other suitable event), data of a popular singer or actor, or any other desired data. As an illustrative example, system 300 may determine whether the data of the World Cup meets a condition for event triggering (e.g., discussion volume of a special event of the World Cup on the Internet increases rapidly, for example, a team has scored a goal). If the exemplary disclosed operational data is determined as meeting a given condition, system 300 may provide a prompt to one or more models of the live broadcast platform, which prompts the one or more models to interact with the viewers regarding events related to the World Cup. A generally similar operation may be performed regarding any suitable internet data.

Figure 5:
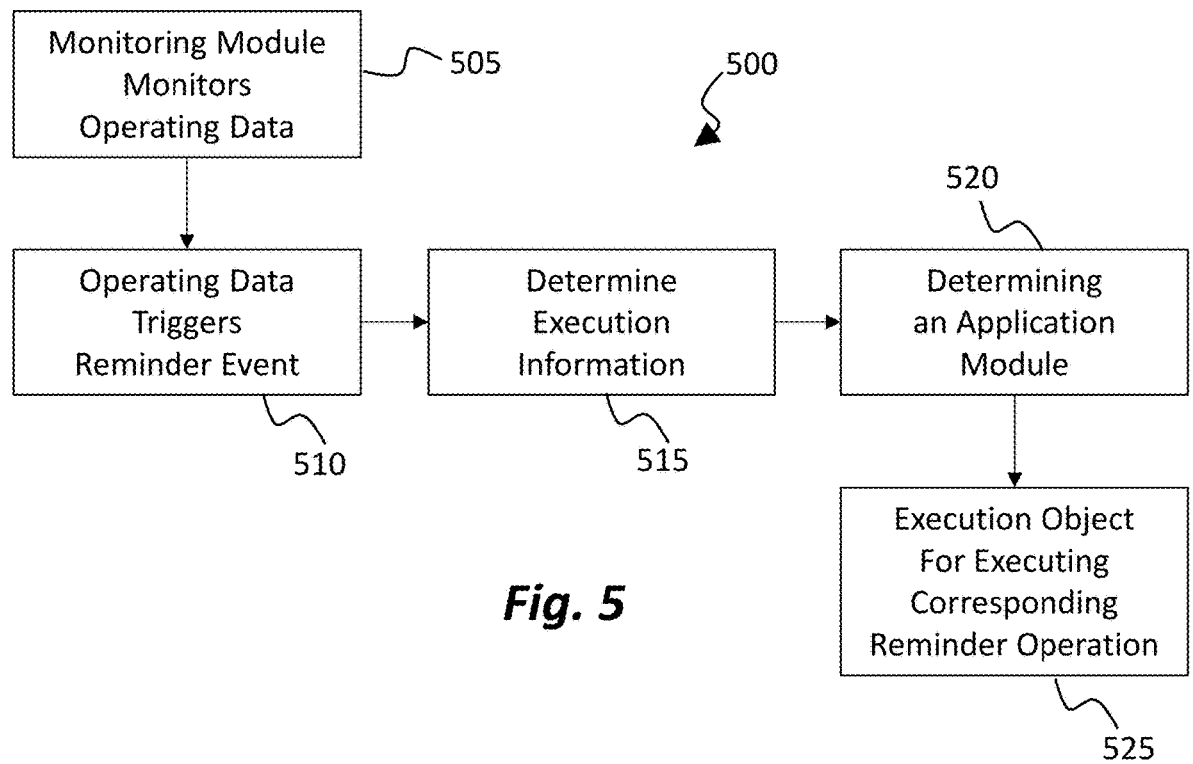
FIG. 5 is a flowchart showing an exemplary process of the present invention.

In at least some exemplary embodiments and for example as illustrated in process 500 of FIG. 5, system 300 may monitor the exemplary disclosed operational data of the live broadcast using the exemplary disclosed monitoring module at step 505. The exemplary disclosed operational data of the live broadcast may include a number of viewers of the live broadcast (e.g., which may vary over a time period of the broadcast), a number of viewers' rewards (e.g., number of aggregate times all of the viewers of the livestream contributed rewards such as tips), an amount of rewards of viewers (e.g., total amount of tokens, cash, and/or any other suitable type of rewards made during the livestream, which may include how the reward amounts varied and/or accumulated over a time period of the broadcast), a time of viewers' rewards (e.g., when and how much the viewers contributed as a function of time during the broadcast), the viewers' identity (e.g., username and/or other system identification information of the viewers), the viewers' exemplary disclosed characteristic information for example as described herein, data of comments from viewers made in the live broadcast (e.g., including keywords, word counts, use of punctuation such as exclamation marks, AI data associated with comments such as assessment of tone or meaning such as satisfaction or irritation), data of other models' live broadcasts that may be streamlining at the same time and/or may be similar in content (e.g., or other models that users viewing the present model's broadcast may have viewed in the past), and/or any other suitable data associated with the live broadcast. For example, the exemplary disclosed operational data may include similar data as described above for other models utilizing system 300, in addition to the present model being prompted by system 300 with the exemplary disclosed notification messages. For example, the exemplary disclosed operational data may include at least one of the operational data of the live broadcast associated with a model and/or operational data of the live broadcast of other models using system 300. The exemplary disclosed operational data (e.g., associated with a livestreaming model) may include historical live broadcast data of some or all live broadcasts associated with the model, real-time (e.g., real-time and/or near real-time) live broadcast data of a live broadcast (e.g., currently occurring live broadcast) associated with the model, and/or statistical data associated with the model after the live broadcast. System 300 may monitor the exemplary disclosed operational data using any suitable technique such as, for example, computer processing techniques described regarding FIGS. 29 and 30 and/or machine learning techniques for example as described herein.

At step 510, the exemplary disclosed operational data may trigger a reminder event based on the monitoring at step 505 and/or criteria of smart assistance panel 420 (e.g., for the exemplary disclosed notification criteria configured using smart assistance panel 420 for example as described above) and/or any other suitable criteria. For example, the exemplary disclosed reminder event may include a certain amount of tips received by a model (e.g., including a plurality of different thresholds), a certain amount of tips not being received, a certain amount of online viewers viewing a model (e.g., including a plurality of different thresholds), various keywords that may be entered by viewers, viewer notices (e.g., that a certain user has entered or left the livestream, or has made a certain amount of tips or not made a certain amount of tips), and/or any other desired criteria for a reminder event (e.g., any suitable criteria configured by the model for example using smart assistance panel 420, configured by system 300, and/or any other suitable criteria).

At step 515, system 300 may determine execution information in response to the operational data of the live broadcast satisfying triggering of the exemplary disclosed reminder event using the exemplary disclosed determination module at step 510. The execution information may be based on operational data that may be related to the reminder event. The execution information may also be related to a notification message to be provided based on the relevant operational data and reminder event. For example, the exemplary disclosed execution information may be determined based on the reminder event being a certain amount of tips received by a model, a certain amount of tips not being received, a certain amount of online viewers viewing a model, various keywords that may be entered by viewers, viewer notices, and/or any other desired information (e.g., for providing one of the exemplary disclosed notification messages for example as described below). System 300 may determine, at different stages of the model's live broadcast, execution information based on preset rules (e.g., configuration for example as described above) at different stages of the model's live broadcast.

For example, if the number of viewers in a live broadcast rising to 500 triggers a reminder event, system 300 may determine execution information. Also for example, if the number of viewers in the live broadcast dropping to 100 triggers a reminder event, system 300 may determine execution information. Further for example, if the number of viewers in the live broadcast still not reaching 100 within 30 minutes after the broadcast beginning triggers a reminder event, system 300 may determine execution information.

For example, if the exemplary disclosed operational data includes data of viewers' characteristic information being a loyal audience of the model who is livestreaming (e.g., viewers who have viewed the model before or who have viewed the model a certain number of previous times), when that audience of one or more viewers enters a live broadcast of the model, system 300 may determine execution information. For example, system 300 may prompt the model to welcome the audience based on this execution information for example as described below.

Accordingly, during a model's live broadcast, the model may be prompted by system 300 based on real-time (e.g., real-time and/or near real-time) operational data of the live broadcast (e.g., based on execution information being determined based on operation data triggering a related reminder event).

Figure 12:
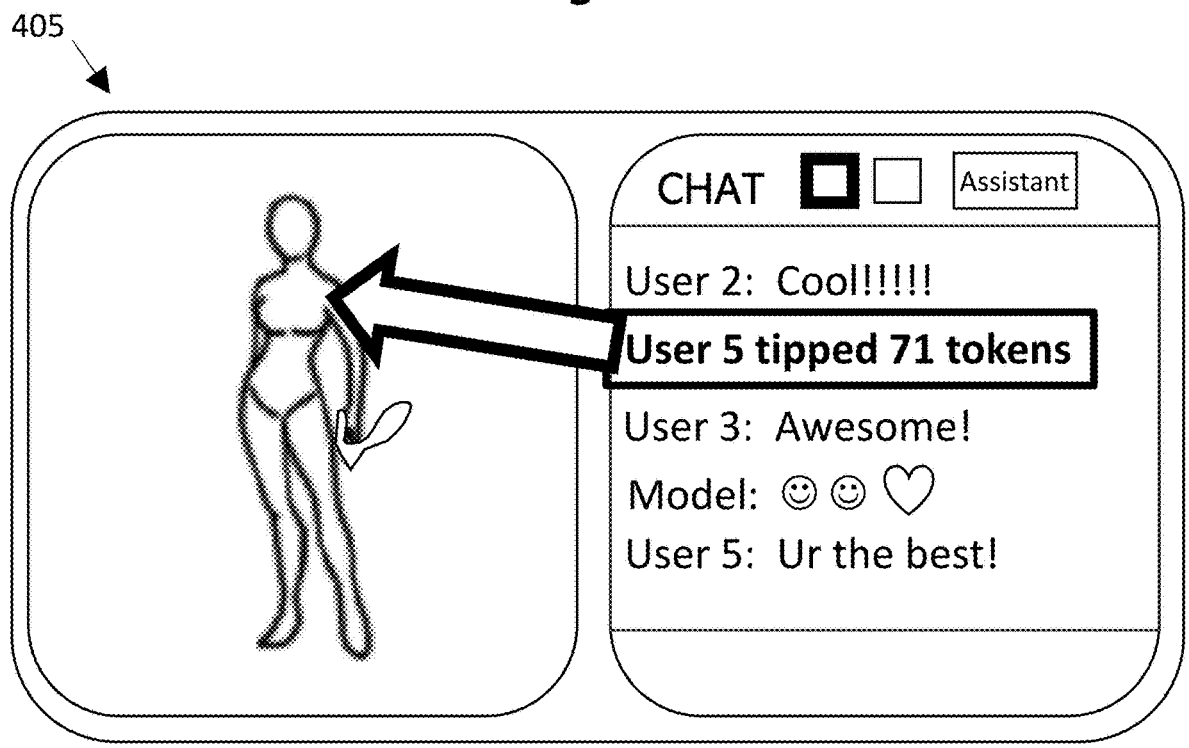
FIG. 12 is a schematic illustration of an exemplary embodiment of the exemplary disclosed system.
Figure 13:
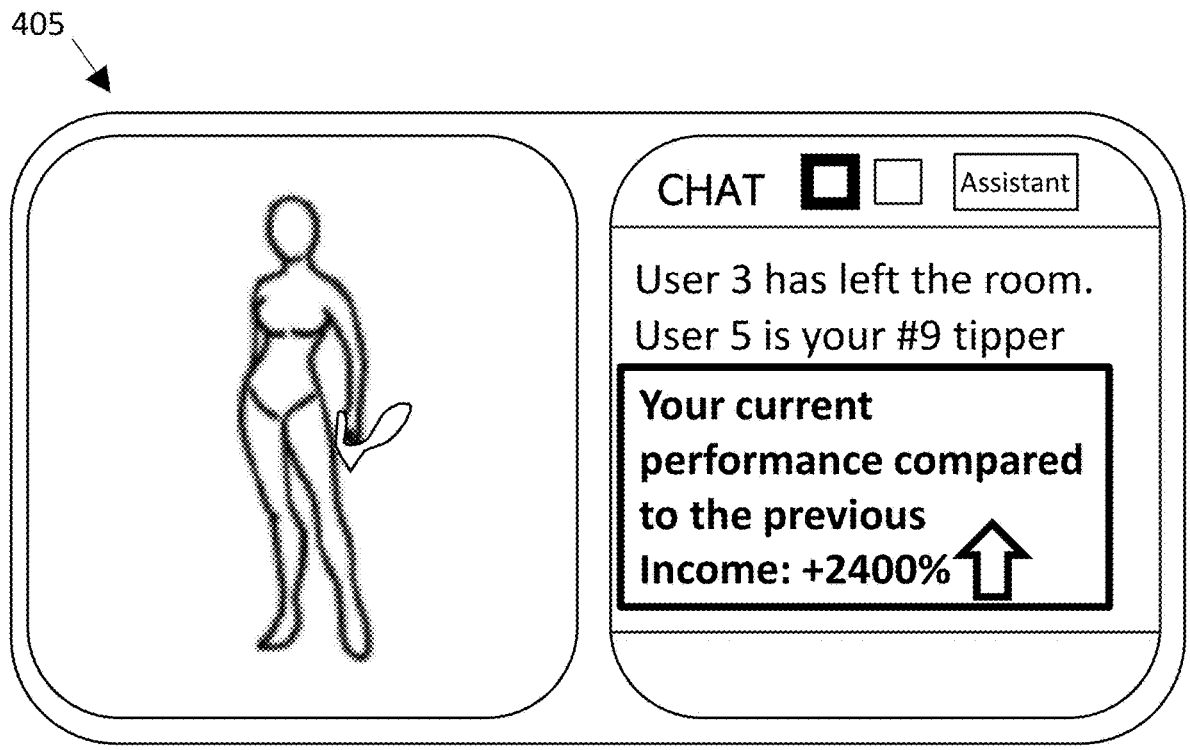
FIG. 13 is a schematic illustration of an exemplary embodiment of the exemplary disclosed system.
Figure 14:
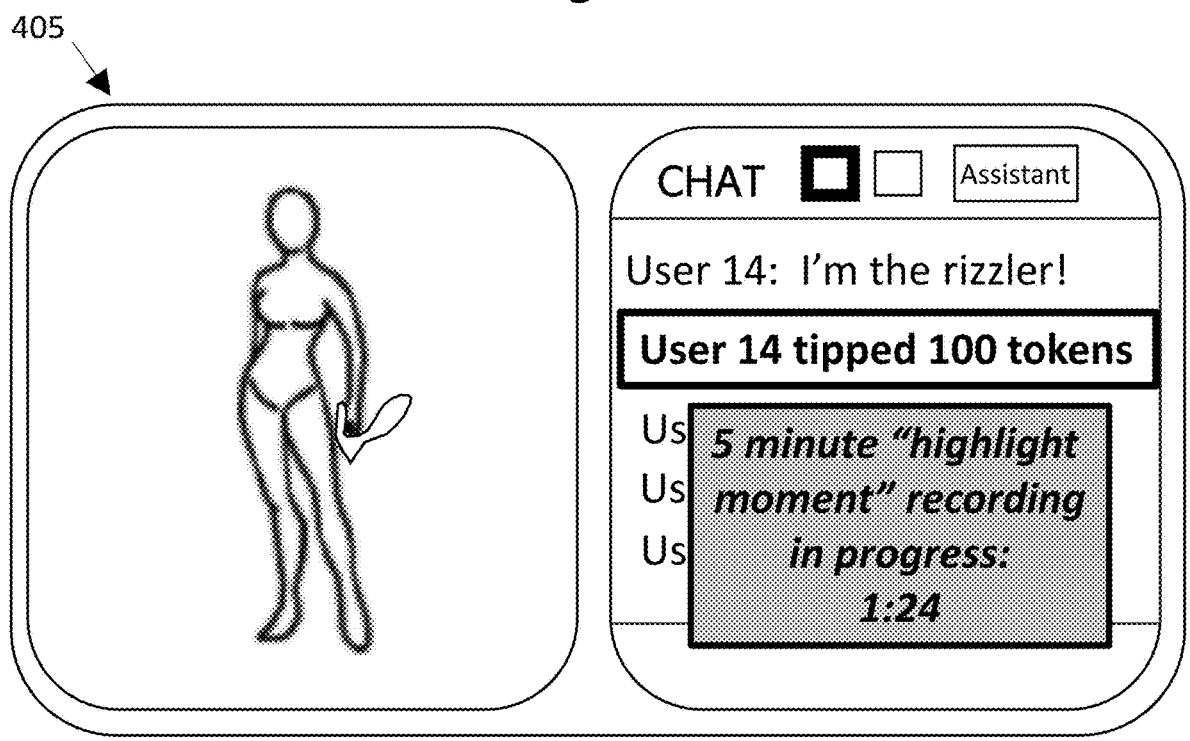
FIG. 14 is a schematic illustration of an exemplary embodiment of the exemplary disclosed system.

At step 520, system 300 may determine, based on the execution information, an application module as an execution object for executing a corresponding reminder operation. The application module may be determined for example based on the type of reminder to be provided to the user (e.g., the exemplary disclosed model). The application module as an execution object may include a game plug-in or a toy plug-in for example as described below. The application module as an execution object may include an exemplary disclosed adult toy (e.g., female accessory 315 and/or male accessory 308). The application module as an execution object may include the exemplary disclosed smart assistance panel (e.g., chat interface 415 including smart assistance panel 420). For example, a first application module (e.g., first execution object) may be determined to provide a first reminder operation (e.g., associated with a first notification message type) for example as illustrated in FIG. 8, a second application module (e.g., second execution object) may be determined to provide a second reminder operation (e.g., associated with a second notification message type) for example as illustrated in FIG. 12, a third application module (e.g., third execution object) may be determined to provide a third reminder operation (e.g., associated with a third notification message type) for example as illustrated in FIG. 13, or a fourth application module (e.g., fourth execution object) may be determined to provide a fourth reminder operation (e.g., associated with a fourth notification message type) for example as illustrated in FIG. 14.

Returning to FIG. 5 at step 525, system 300 may execute a corresponding reminder operation by the application module in response to the execution information. For example, the first, second, third, or fourth reminder operations discussed above may be executed. The exemplary disclosed reminder operation may be configured to characterize the reminder event to the model. For example, the exemplary disclosed reminder operation may include displaying a prompt (e.g., an action prompt and/or notification) for example as illustrated in FIGS. 8 through 14, which may correspond to the related exemplary disclosed operational data, execution information, reminder event, application module, execution object, and/or notification message (e.g., as further described below).

Figure 8:
FIG. 8 is a schematic illustration of exemplary embodiments of the exemplary disclosed system.

FIG. 8 illustrates examples of the exemplary disclosed notification message. In at least some exemplary embodiments, these notification messages may be viewed, selected, and/or configured by a user such as the exemplary disclosed model using system 300 (e.g., using smart assistance panel 420 of chat interface 415). For example, the exemplary disclosed model may be prompted with pictures and/or animation by system 300 to make positive reactions to viewers such as, for example, cheering or making a "hurrah" when a certain amounts of tips is given (e.g., 1 to 9 tokens or any other desired amount) or any other desired criteria, or smiling when a certain amount of tips is given (e.g., a relatively greater amount such as 10 to 20 tokens or any other desired amount) or any other desired criteria. Also for example, the exemplary disclosed model may be prompted by system 300 with pictures and/or animation to begin a show when a certain amounts of tips has been given (e.g., 1 to 9 tokens, 21 to 999 tokens, or any other desired amount) and/or any other desired criteria. Further for example, the exemplary disclosed model may be prompted with pictures and/or animation by system 300 to make a negative reaction (e.g., frown or scowl) when a certain amount of tips is given (e.g., or not given) such as 1 to 5 tokens, 10 to 20 tokens, or any other desired amount, and/or any other desired criteria. Additionally for example, the exemplary disclosed model may be prompted with pictures and/or animation by system 300 to continue performing (e.g., "don't stop" or "continue") when a certain amount of tips is given (e.g., or not given) such as 21 to 999 tokens, or any other desired amount, and/or any other desired criteria. For example in at least some exemplary embodiments, the exemplary disclosed prompt may be provided to the model when system 300 determines, based on the exemplary disclosed operational data analysis, that a current performance is well received by the audience (e.g., popular or very popular with the audience). For example, system 300 may make this determination based on any suitable information of the exemplary disclosed operational data such as, for example, user tips, user input, user comments, user activity, number of users, few or no users leaving a broadcast, and/or any other suitable data.

In at least some exemplary embodiments, the exemplary disclosed prompts (e.g., for example as illustrated in FIG. 8) may vary based on operational data such as, for example, viewer data. For example, the exemplary disclosed prompts may differ based on viewers' identities (e.g., user profile and/or other identifying information relative to system 300) and/or viewers' characteristic information for example as described herein. For example, for a first viewer a prompt may be of a first type (e.g., based on viewer data of the first viewer), which may welcome the first viewer. For example, the viewer data of the first viewer may indicate that the first viewer is a relatively new viewer. Also for example, for a second viewer a prompt may be of a second type (e.g., based on viewer data of the second viewer), which may greet the second viewer who may be a returning viewer (e.g., may greet the second viewer with "Nice to see you!" or a similar greeting). For example, the viewer data of the second viewer may indicate that the second viewer is a returning or relatively experienced viewer who has previously used system 300.

Figure 9:
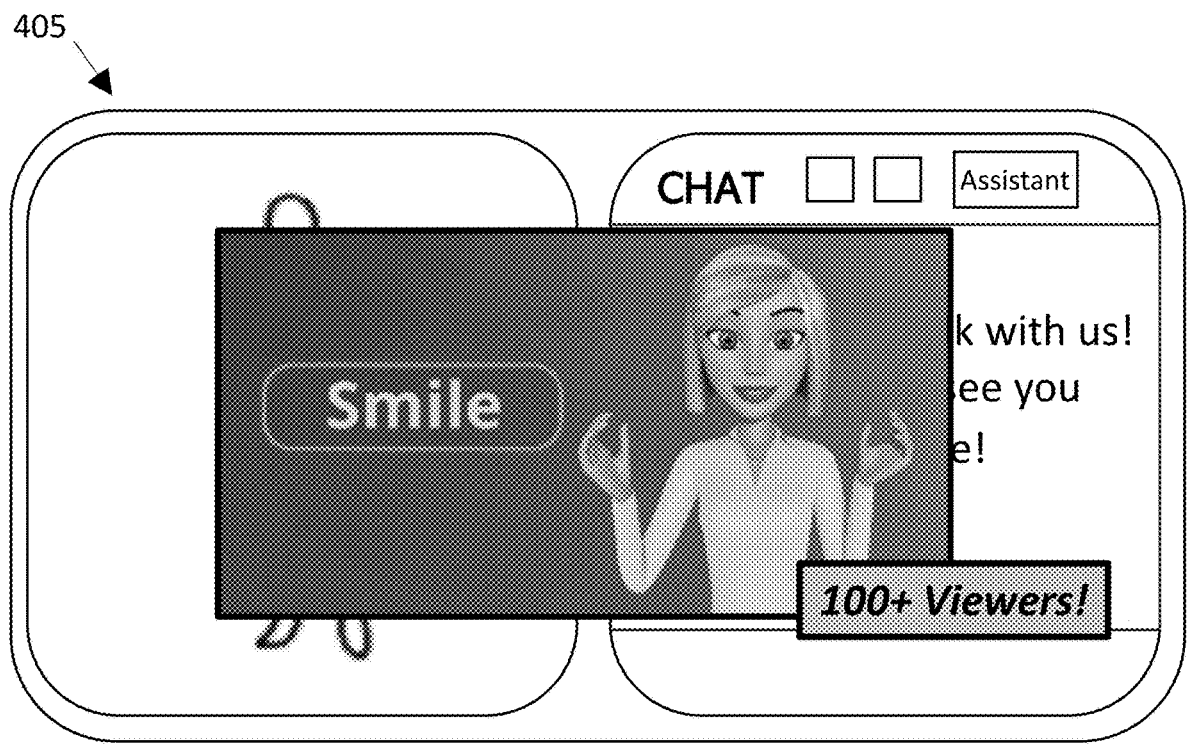
FIG. 9 is a schematic illustration of an exemplary embodiment of the exemplary disclosed system.

FIG. 9 illustrates an exemplary embodiment of an exemplary reminder operation that may be performed by an application module of system 300 in response to execution information. For example, the exemplary disclosed model may be prompted by system 300 with pictures and/or animation to smile based on a reminder event of 100 or more viewers (e.g., or any other desired number) viewing the live broadcast (e.g., or any other desired criteria).

Figure 10:
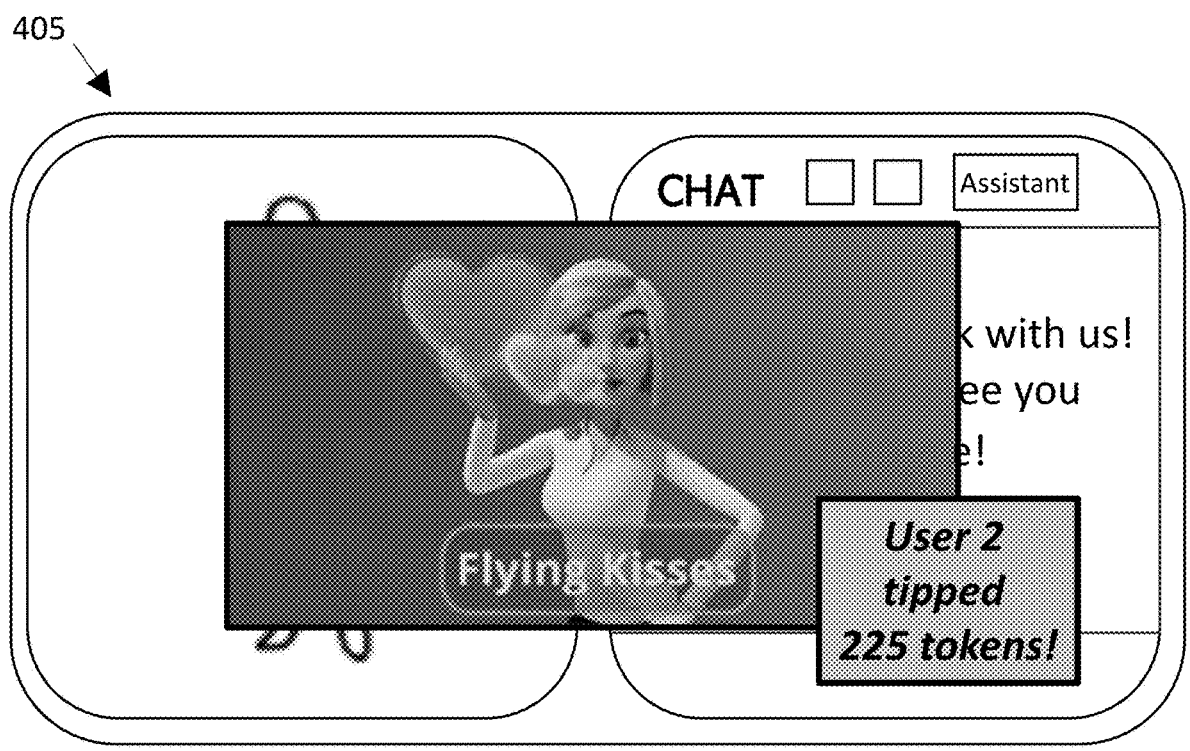
FIG. 10 is a schematic illustration of an exemplary embodiment of the exemplary disclosed system.

FIG. 10 illustrates an exemplary embodiment of another exemplary reminder operation that may be performed by an application module of system 300 in response to execution information. For example, the exemplary disclosed model may be prompted by system 300 with pictures and/or animation to blow kisses (e.g., "flying kisses") based on a reminder event of a viewer tipping a certain amount (e.g., 225 tokens or any other desired number).

In at least some exemplary embodiments and for example as illustrated in FIG. 10, the exemplary disclosed application module may include chat interface 415 (e.g., including smart assistance panel 420). During the model's live broadcast, if a viewer (e.g., User 2) rewards the model with more than a preset amount of tokens (e.g., 50 tokens), system 300 may prompt the model through chat interface 415 (e.g., including smart assistance panel 420) to thank User 2. For example, the exemplary disclosed notification message may include "Flying Kisses" to User 2. Further for example, if the model takes corresponding actions according to the prompt (e.g., notification message), when system 300 detects that the model performed the action of flying kisses according to the prompt (e.g., based on imaging device 350 detecting motion for example as described above), system 300 may render a special effect (e.g., flying kisses) on the live broadcast screen (e.g., GUI 405 of the model and one or more viewers). For example, the special effect (e.g., flying kisses) may be rendered at the position of the model's displayed hands and/or mouth of the live broadcast screen in real-time (e.g., real-time and/or near real-time). System 300 may thereby substantially prevent the model from missing important reward information (e.g., such as large rewards), and thereby substantially prevent the model from failing to thank a viewer for a relatively large tip or other action. Also for example, after the model expresses gratitude (e.g., thanks or blows a kiss) to the audience, the audience may be further motivated to reward the model.

In at least some exemplary embodiments, system 300 may translate a viewer's comments into a model's language in real-time or near real-time. Also for example, system 300 may translate a model's responses to a viewer's comments into a corresponding language (e.g., into the language of the viewer) and send the translated comments to the live broadcast platform. The translated content may be provided as translated audio comments, translated textual comments (e.g., subtitles), and/or any other desired format.

In at least some exemplary embodiments, system 300 may display any suitable data (e.g., preset information) of the audience on GUI 405. For example, system 300 may display viewer information such as the audience's identity, the audience's level (e.g., any suitable comparative data relating viewers to other users of system 300), and/or data associated with connected toys of viewers. Also for example, when one or more viewers (e.g., the audience) sends a request to the model to control the one or more viewer's toys (e.g., and/or toys of the model), the request may be displayed on the system (e.g., via one or more GUI 405). For example, a control panel (e.g., via smart assistance panel 420) may be output to control the one or more viewer's toys (e.g., audience's toys).

Figure 11:
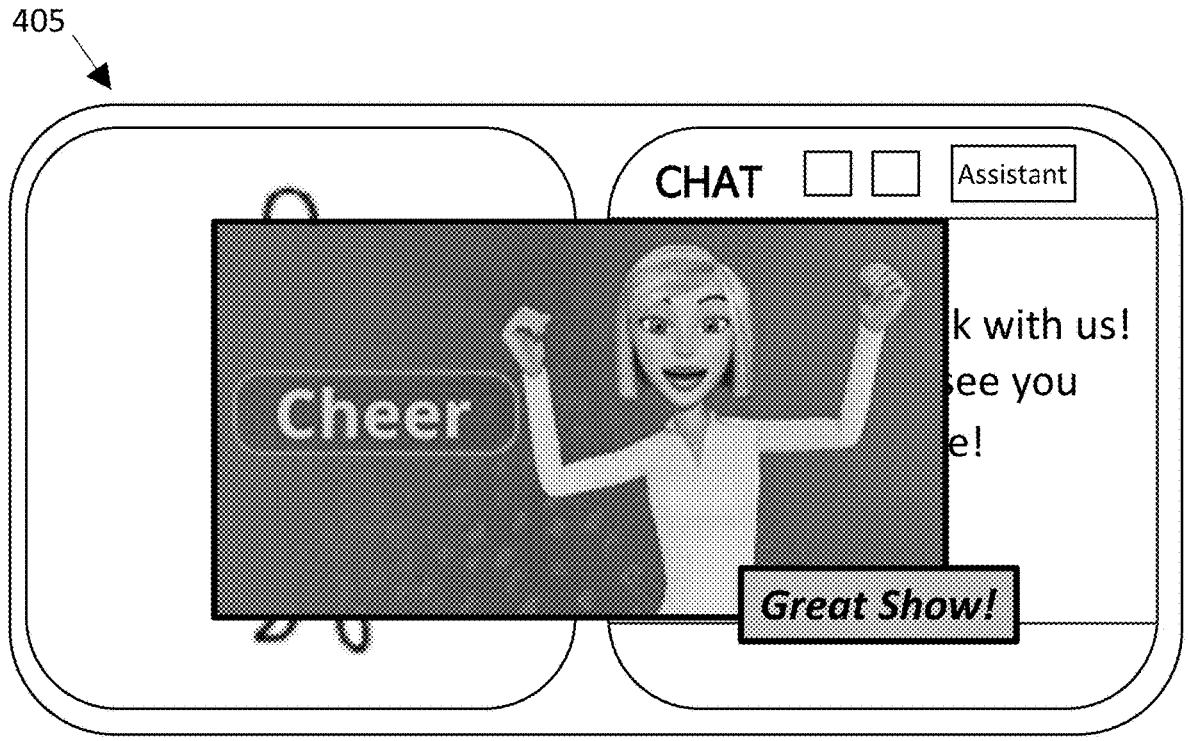
FIG. 11 is a schematic illustration of an exemplary embodiment of the exemplary disclosed system.

FIG. 11 illustrates an exemplary embodiment of another exemplary reminder operation that may be performed by an application module of system 300 in response to execution information. For example, the exemplary disclosed model may be prompted by system 300 with pictures and/or animation of cheering (e.g., "cheer") based on a reminder event of a certain amount of tips being received, positive user feedback (e.g., "Great Show!"), a certain amount of viewers remaining for a predetermined amount of time to view a show, and/or any other suitable criteria. The model may be prompted to cheer to the audience based on the prompt. For example, during the model's live broadcast, when the audience sends cheering comments to the model (e.g., chat comments that may be part of the exemplary disclosed operational data and monitored as keywords), the model may be prompted by system 300 to cheer (e.g., via chat interface 415 including smart assistance panel 420). Also for example, the prompt may notify the model (e.g., give feedback) that the present show is going favorably based on the exemplary disclosed operational data that may trigger a reminder event associated with favorable show performance (e.g., that may be configured for example as described above).

In at least some exemplary embodiments, before the model starts a live broadcast, the model may be prompted by system 300, based on operational data such as the historical operational data of the live broadcasts (e.g., previous live broadcasts) of the model, to set different reward rules (e.g., using smart assistance panel 420). System 300 may configure the triggering rules of different events based on historical data. For example, system 300 may configure the exemplary disclosed reminder events for different models intelligently based on different historical data relating a given model. For example, for different models, the conditions for the operational data of the live broadcast to satisfy triggering of a reminder event may be different (e.g., may differ between different models). For example, for models with relatively high popularity, the conditions for triggering of a reminder event may be set higher (e.g., relative to other models). Also for example, for models who are just starting to broadcast (e.g., beginners), the conditions for triggering of a reminder event may be set relatively lower. For example, during the model's live broadcast, the model may be prompted based on historical and/or real-time (e.g., real-time and/or near real-time) operational data of the live broadcast to reconfigure (e.g., set up improvements to) the current live broadcast, such as changing sexual positions or showing close-up body parts (e.g., breasts or other body parts). For example, when a model shows a position (e.g., a sex position) for more than 15 minutes, the model may be prompted by system 300 to change sex positions. Also for example, if the number of tips or the amount of tips increases when a model shows a close-up position (e.g., vaginal position), the model may be prompted by system 300 to maintain that sex position (e.g., "don't stop" for example as illustrated in FIG. 8). For example regarding the exemplary disclosed prompts, if a number of tips and/or an amount of tips increases when a model shows a close-up position, system 300 may determine that an audience enjoys (e.g., likes) the model's current performance (e.g., the close-up) and may prompt the model to maintain that sex position. Also for example, if there are "invisible" or "poorly visible" indications in the operational data (e.g., a significant amount of indications) when a model shows a close-up position (e.g., based on user input, user activity, system data such as camera information, and/or any other suitable data), system 300 may determine that the audience cannot clearly see the current model's performance, and the model may be prompted by system 300 to change that sex position.

In at least some exemplary embodiments, the exemplary disclosed application module may include activity or game plug-ins. The activity or game plug-ins may for example be associated with a game that may be displayed on a GUI of models and viewers during the live broadcast (e.g., a game that encourages viewers to compete with each other in tipping such as, for example, a "blitz mode"). The game plug-ins may determine pricing rules for different games in response to the exemplary disclosed execution information. For example, the application module may be an activity plug-in (e.g., game plug-in), and the activity plug-in may turn on or turn off different activities in response to the exemplary disclosed execution information (e.g., execution information for example as described above). For example, system 300 may provide an activity called "blitz mode" to users. If the operational data of the live broadcast meets the conditions (e.g., associated with the execution information), the activity plug-in may start the "blitz mode" activity.

In at least some exemplary embodiments, the exemplary disclosed application module may include toy control plug-ins (e.g., of the exemplary disclosed toys such as male accessory 308 and/or female accessory 315). The toy control plug-ins may control a toy associated with the model (e.g., female accessory 315 or male accessory 308) to perform corresponding actions (e.g., vibration at a desired level) in response to the execution information. For example when the exemplary disclosed model uses one or more toys to perform pornographic acts during the live broadcast, the toys may be controlled by system 300 to perform different actions to remind the user (e.g., model) of different events in response to the exemplary disclosed execution information (e.g., so that the model may not take time to pay attention to the operational data that may be provided in the feed or scrolled on the model's GUI 405).

In at least some exemplary embodiments, the exemplary disclosed execution object may include a stimulation device (e.g., female accessory 315 and/or male accessory 308) of the exemplary disclosed model. The exemplary disclosed method may include performing, using the stimulation device of the model, at least one action corresponding to the reminder event to characterize the reminder event to the model (e.g., the exemplary disclosed stimulation device may operate to notify and/or remind the model of the reminder event). An association between the at least one action performed by the stimulation device and the reminder event may be preset (e.g., preset and stored by system 300). For example, the stimulation device may operate more intensely if the reminder event is for a model to become excited, may cease to operate if the reminder event is for a model to stop, and/or any other suitable operation or operation change associated with any desired reminder event.

In at least some exemplary embodiments and as illustrated in FIG. 12, the exemplary disclosed application module may execute a corresponding reminder operation that may be configured to characterize the exemplary disclosed reminder event to the exemplary disclosed model in an alternative manner (e.g., alternative as compared for example to FIGS. 8 through 12). For example, when a reminder event occurs (e.g., a user tipping a model), system 300 may display the exemplary disclosed notification message based on highlighting and/or marking (e.g., bolding, boxing, marking with arrows, and/or otherwise indicating using any other suitable technique) information related to the reminder event (e.g., user tip information for example as illustrated in FIG. 12) in GUI 405 (e.g., in chat interface 415 including smart assistance panel 420). For example, the exemplary application module illustrated in FIG. 12 may present information (e.g., the exemplary disclosed notification message) to the user (e.g., model) differently than the configuration of the application module and corresponding notification message illustrated in FIGS. 8 through 12. Also for example, when a reminder event occurs, a corresponding reminder operation may be displayed on glasses or Vision Pro (e.g., or any other suitable device) worn by the model. Accordingly, the application module that executes the exemplary disclosed reminder operation may be configured to characterize a reminder event to the model differently from how system 300 (e.g., the live broadcast platform) displays the exemplary disclosed operation data of the live broadcast (e.g., how it is displayed to the viewers and/or the model).

In at least some exemplary embodiments and as illustrated in FIG. 13, the exemplary disclosed application module may execute a corresponding reminder operation. Based on execution of the exemplary disclosed application module, a prompt may be provided to the model. The prompt may include output visual prompt information that may be perceptible by the model's senses. For example, the output visual prompt information may be perceptible by the model's senses and may activate a predetermined program function. For example, the exemplary disclosed operation may include at least one of outputting visual prompt information, outputting messages that the model user can perceive with their senses, and/or activating a predetermined program function. For example, a notification message may be provided via chat interface 415 (e.g., including smart assistance panel 420). System 300 may thereby activate a predetermined program function (e.g., including comparing operational data of the present live broadcast to one or more previous broadcasts, such as comparing income generation of the live broadcasts). In at least some exemplary embodiments and as illustrated in FIG. 13, system 300 may provide any suitable application module output visual prompt information such as, for example, a smart panel output notification message on a preset user interface (e.g., chat interface 415).

For example as illustrated in FIG. 13, the exemplary disclosed smart panel (e.g., chat interface 415 including smart assistance panel 420) may compare operational data including current live broadcast data of a given model with historical live broadcast data of that given model and/or other models utilizing system 300. System 300 may analyze the operational data (e.g., live broadcast data) using the exemplary disclosed computing devices, modules, and/or machine learning techniques and provide the exemplary disclosed prompts to the user such as a model (e.g., including comparison data, recommended reconfiguration of the execution information, and/or any other suitable analysis results).

In at least some exemplary embodiments, the exemplary disclosed application module output information may be perceptible by a model's senses such as via the exemplary disclosed toys (e.g., male accessory 308 and/or female accessory 315). For example, the exemplary disclosed toy (e.g., female accessory 315) associated with the model may perform different actions corresponding to different execution information (e.g., prompt information). For example, the application module output information perceptible by the model's senses may include operation of female accessory 315 (e.g., or male accessory 308) and/or an odor-generating device that may release different odors corresponding to different execution information (e.g., prompt information). Also for example, the exemplary disclosed application module may activate a predetermined program function such as initiating an activity or game for example as described above (e.g., blitz mode) and/or a control link function.

In at least some exemplary embodiments, the exemplary disclosed application module may display a notification message on a preset user interface (e.g., chat interface 415 including smart assistance panel 420) to characterize the reminder event to the model. For example, the exemplary disclosed notification message may include text, one or more images, audio, and/or one or more videos (e.g., for example as illustrated in FIGS. 8 through 15). Also for example, the exemplary disclosed notification message may include text, one or more images, audio, and/or one or more videos generated by an AI model for example using the exemplary disclosed artificial intelligence operations. For example, system 300 may generate the exemplary disclosed notification message using AI based on the exemplary disclosed operational data of the live broadcast. System 300 may generate the exemplary disclosed notification message using the AI model so that the notification messages may be associated with at least one of preset characteristic information of the model and/or audience information (e.g., viewer data) for example as described above.

In at least some exemplary embodiments, the exemplary disclosed method may include generating at least one reminder message (e.g., one or more reminder messages) of the exemplary disclosed application module performing a corresponding reminder operation and/or the model's feedback on the application module performing the corresponding reminder operation (e.g., the model's feedback on the exemplary disclosed notification message). The exemplary disclosed reminder message may be generally similar to the exemplary disclosed notification message and may be provided to a viewer by system 300 similarly to system 300 providing notification messages to the model. For example, system 300 may provide (e.g., push) the reminder message to at least one (e.g., one or more) users such as viewers of the audience viewing the live broadcast. Pushing the reminder message to a user (e.g., viewer of the viewer audience) by system 300 may include outputting a smart panel similar to chat interface 415 including smart assistance panel 420 on a viewer's device (e.g., male user device 305 or female user device 310) to remind an audience user (e.g., viewer) of the exemplary disclosed reminder operation (e.g., to remind the viewer to tip the model, interact with the model, and/or to take any other suitable action using system 300).

In at least some exemplary embodiments and as illustrated in FIG. 14, during the exemplary disclosed model's live broadcast, if the exemplary disclosed operational data of the live broadcast satisfying the triggering of the exemplary disclosed reminder event is recorded, the time point at which the operational data of the live broadcast satisfying triggering of the reminder event may be recorded (e.g., recording of the live broadcast may begin when the reminder event is triggered). For example, during the model's live broadcast, if the exemplary disclosed operational data of the live broadcast satisfies triggering of the reminder event, the function of recording the model's live broadcast will be triggered. For example as illustrated in FIG. 14, when the audience's single reward exceeds a certain amount (e.g., user 14 tips 100 tokens to model), a function of automatically recording the model's live broadcast is triggered by system 300. For example, a notification message may be displayed to the model (e.g., and/or viewers) that recording is occurring (e.g., that a 5-minute "highlight moment" is being recorded).

Figure 15:
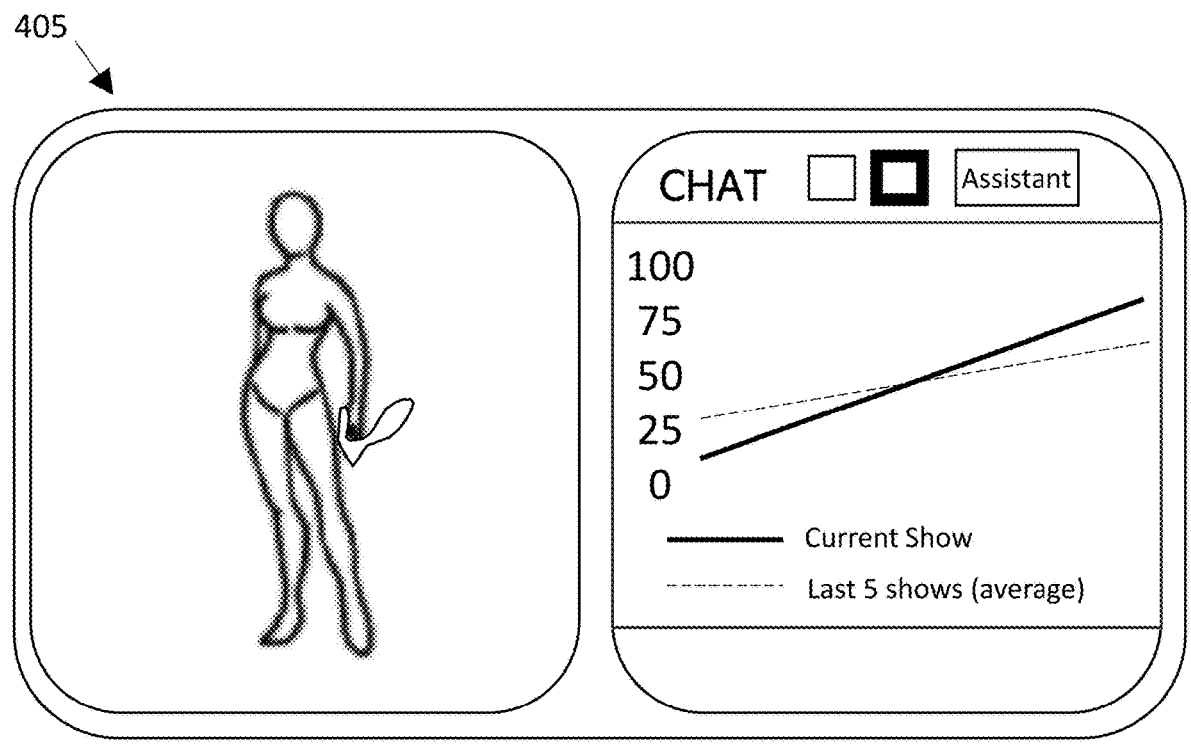
FIG. 15 is a schematic illustration of an exemplary embodiment of the exemplary disclosed system.

In at least some exemplary embodiments and as illustrated in FIG. 15, system 300 may provide any suitable analysis information to the exemplary disclosed model. For example, during the model's live broadcast or after the live broadcast ends, system 300 may display (e.g., via smart assistance panel 420) a change curve or other desired depiction of the exemplary disclosed operational data of the live broadcast. For example as illustrated in FIG. 15, a viewer count, tip count, or any other operational data of the live broadcast may be displayed by system 300 to the model.

Figure 15A:
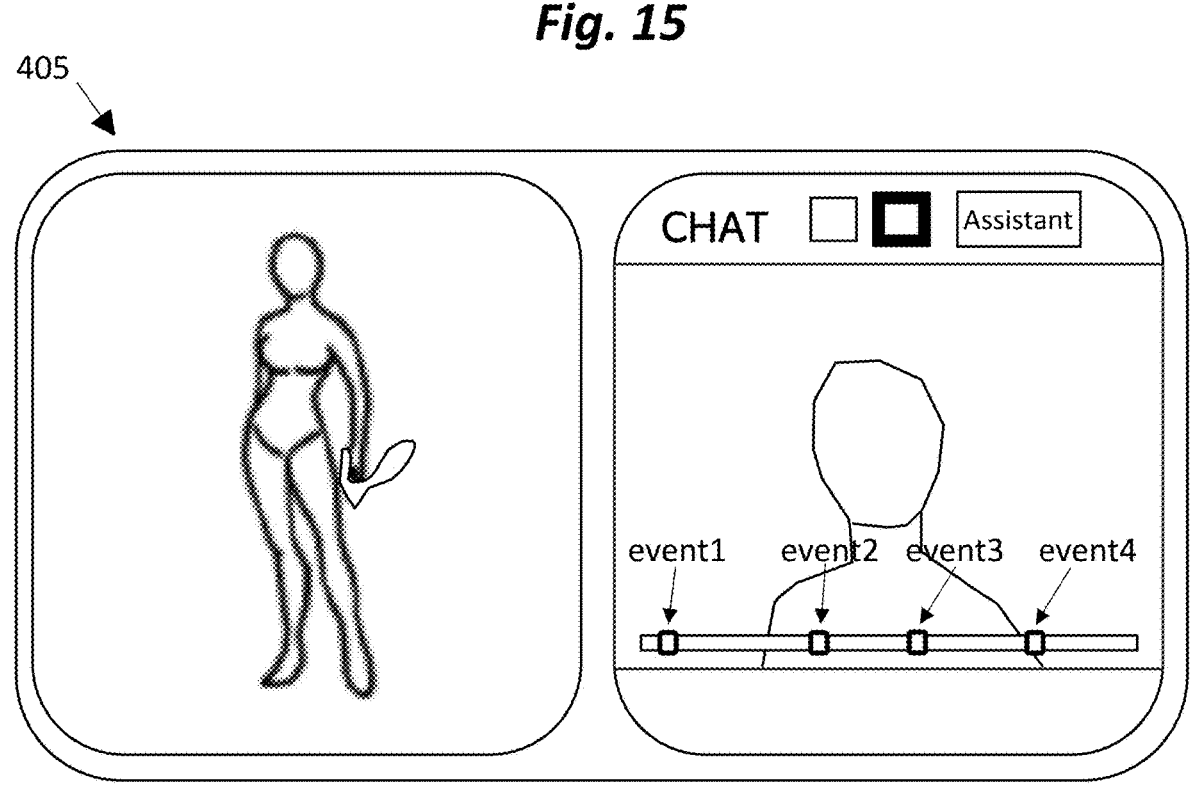
FIG. 15A is a schematic illustration of an exemplary embodiment of the exemplary disclosed system.

In at least some exemplary embodiments, the exemplary disclosed method may include recording, using the exemplary disclosed analysis module, at least one time node of the operational data of the live broadcast that may satisfy triggering of the reminder event (e.g., as described above regarding FIG. 5). The exemplary disclosed method may also include saving, using the exemplary disclosed analysis module, live broadcast data of the model and associating the live broadcast data with the at least one time node of the reminder event. The exemplary disclosed method may further include displaying, using the exemplary disclosed display module, a relationship between the live broadcast data of the model, the reminder event, and/or the at least one time node of the reminder event on a preset graphical interface (e.g., generally similar to as illustrated in FIG. 15). For example as illustrated in FIG. 15A, a plurality of time nodes (e.g., event1, event2, event3, and event4) of one or more reminder events are illustrated as time nodes of an exemplary disclosed recorded video of the exemplary disclosed model.

In at least some exemplary embodiments, if a specific event or valuable information is provided in the model live broadcast room, system 300 may provide prompts and/or feedback to the model to notify the model of these items. System 300 may operate to transform data, which may be difficult for livestreaming models to perceive, into information that may be easier (e.g., easy) for models to perceive and/or understand. System 300 may also provide for the model giving specific feedback and/or may activate a specific function to remind an audience of a desired item or event during the live broadcast. Before the model starts broadcasting, during broadcasting, and/or after broadcasting, various strategies for reconfiguring system 300 (e.g., to increase tips) may be provided as prompts to the model (e.g., based on operational data of the live broadcast room to improve the model's live broadcast).

In at least some exemplary embodiments, the exemplary disclosed notification messages and reminder messages may be displayed to any suitable user of system 300. For example, the exemplary disclosed notification messages and/or reminder messages may be displayed to one or more models, one or more viewers, and/or any other suitable user of system 300.

In at least some exemplary embodiments, the exemplary disclosed notification message may be configured to prompt the exemplary disclosed model to provide feedback on the reminder event (e.g., to take additional actions for example as described below). The notification message may include action prompts for a different reminder event (e.g., prompts to take actions corresponding to another, different reminder event). For example, the notification message may include action prompts for a different reminder event such as a greeting, message, and/or body action. For example, a specific reward value threshold being reached may trigger an action prompt of "Thank you" by the model, a specific reward value threshold not being reached may trigger an action prompt of the model acting in an exaggeratedly (e.g., and/or playfully or humorously) irritated fashion, a specific audience member entering a chat room may trigger an action prompt of "Welcome" by the model, a threshold number of viewers viewing the model may trigger an action prompt of the model looking around as though standing in front of a large crowd (e.g., being in front of a large crowd and pretending to peer to the back of a large theater), or any other suitable action prompt. System 300 may monitor, using the monitoring module, the model's body movements (e.g., including using imaging device 350). System 300 may also render a special effect corresponding to the action prompts on the display of the live broadcast (e.g., GUI 405) when the model's body movements match the action prompts (e.g., based for example on an operation of imaging device 350). The exemplary disclosed special effect may be pushed to at least one of one or more viewers of the audience viewing the live broadcast. The special effect may include animation, one or more images, audio, and/or text. The special effect may include, for example, floating hearts, floating kisses, cartoon animation, changes in displayed brightness, words or other text, sounds, and/or any other desired special effect that may be displayed using GUI 405. Also for example, when a predetermined program function such as the exemplary described "blitz mode" is activated, system 300 may notify viewers. For example, system 300 may notify users to encourage the users (e.g., viewers) to participate in the "blitz mode" activity (e.g., or other suitable activity).

In at least some exemplary embodiments, system 300 may operate to provide for situations in live broadcasts (e.g., live pornographic broadcasts) when it may be difficult for a model to pay attention to operational data being displayed when performing (for example via GUI 405). For example, during relatively intense and/or physical portions of a performance during a live broadcast, it may be difficult for a model to view operational data being displayed to the model by system 300. During such portions of a live broadcast, system 300 may provide a conspicuous action prompt (e.g., a very conspicuous prompt) associated with an execution object and notification message as a reminder to a model of select operational data. For example, the exemplary disclosed action prompt may be displayed with relatively intense colors, flashing, bold text, large size, and/or any other suitable characteristics for attracting the model's attention and clearly communicating an action prompt. In at least some exemplary embodiments, system 300 may thereby convert operational data that may be difficult for a model to perceive during a live broadcast into an easily perceived animation displayed to the model (e.g., via GUI 405).

Figure 16:
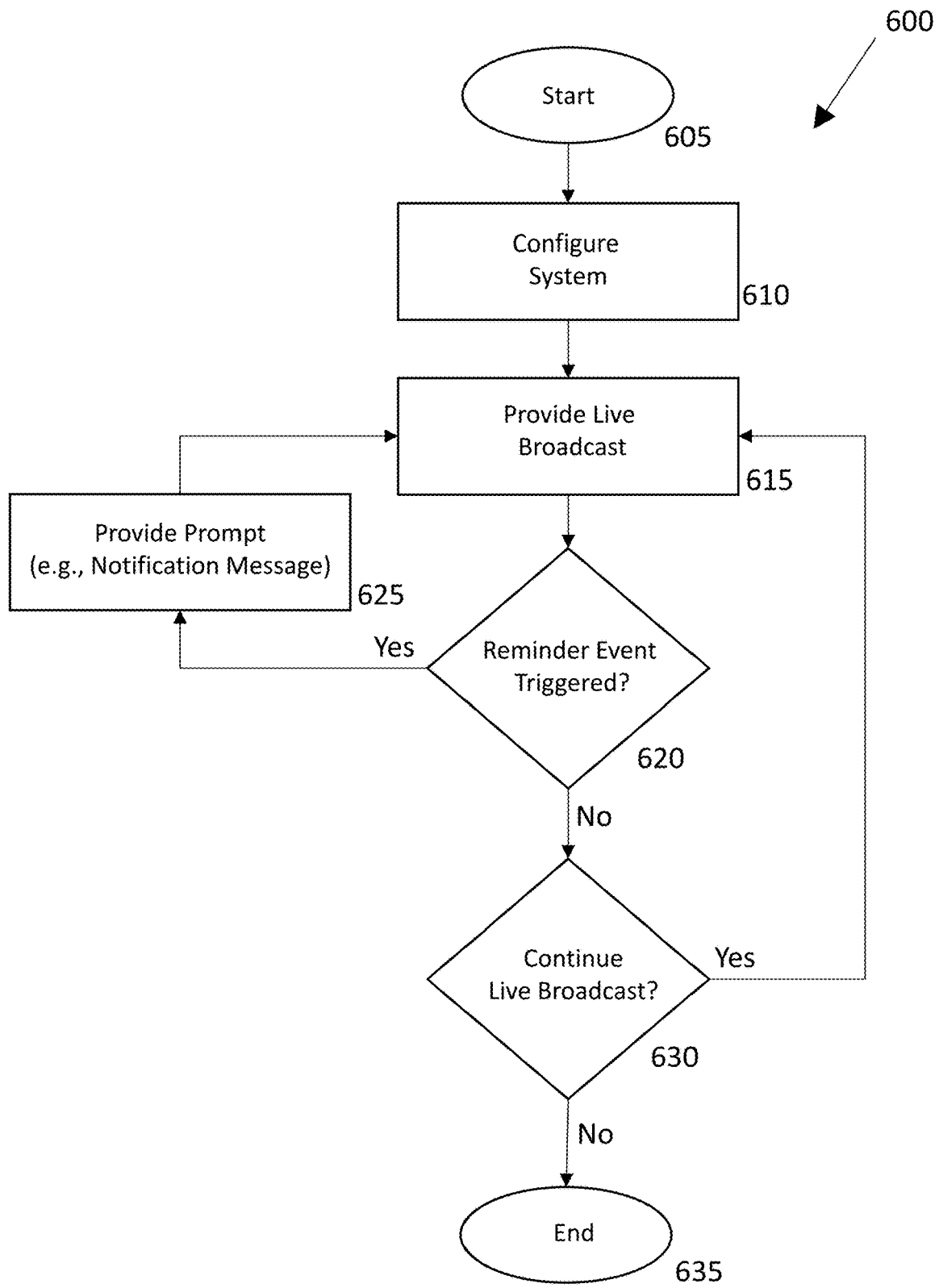
FIG. 16 is a flowchart showing an exemplary process of the present invention.

FIG. 16 illustrates an exemplary process for the exemplary disclosed user (e.g., model) to use the exemplary disclosed system. Process 600 begins at step 605. At step 610, a model may configure system 300 for example as described above regarding FIG. 7 (e.g., via using smart assistance panel 420 and/or any other suitable technique for configuring system 300). At step 615, the model may provide a live broadcast including for example a performance as described above.

At step 620, system 300 may determine whether or not a reminder event has been triggered for example as described above regarding FIG. 5. If a reminder event has been triggered, process 600 may proceed to step 625. At step 625, system 300 may provide a notification message to the model for example as described above regarding FIGS. 9 through 14. Process 600 may then return to step 615.

If a reminder event has not been triggered, process 600 may proceed to step 630. At step 630, system 300 may determine whether or not the live performance is to be continued (e.g., based on model control or input, a predetermined time period elapsing, viewer input, operational data of the live broadcast, and/or any other suitable criteria). If the live broadcast is to be continued, process 600 may return to step 615. As many iterations as desired of steps 610 through 630 may be performed. If the live broadcast is not to be continued, process 600 ends at step 635.

Figure 17:
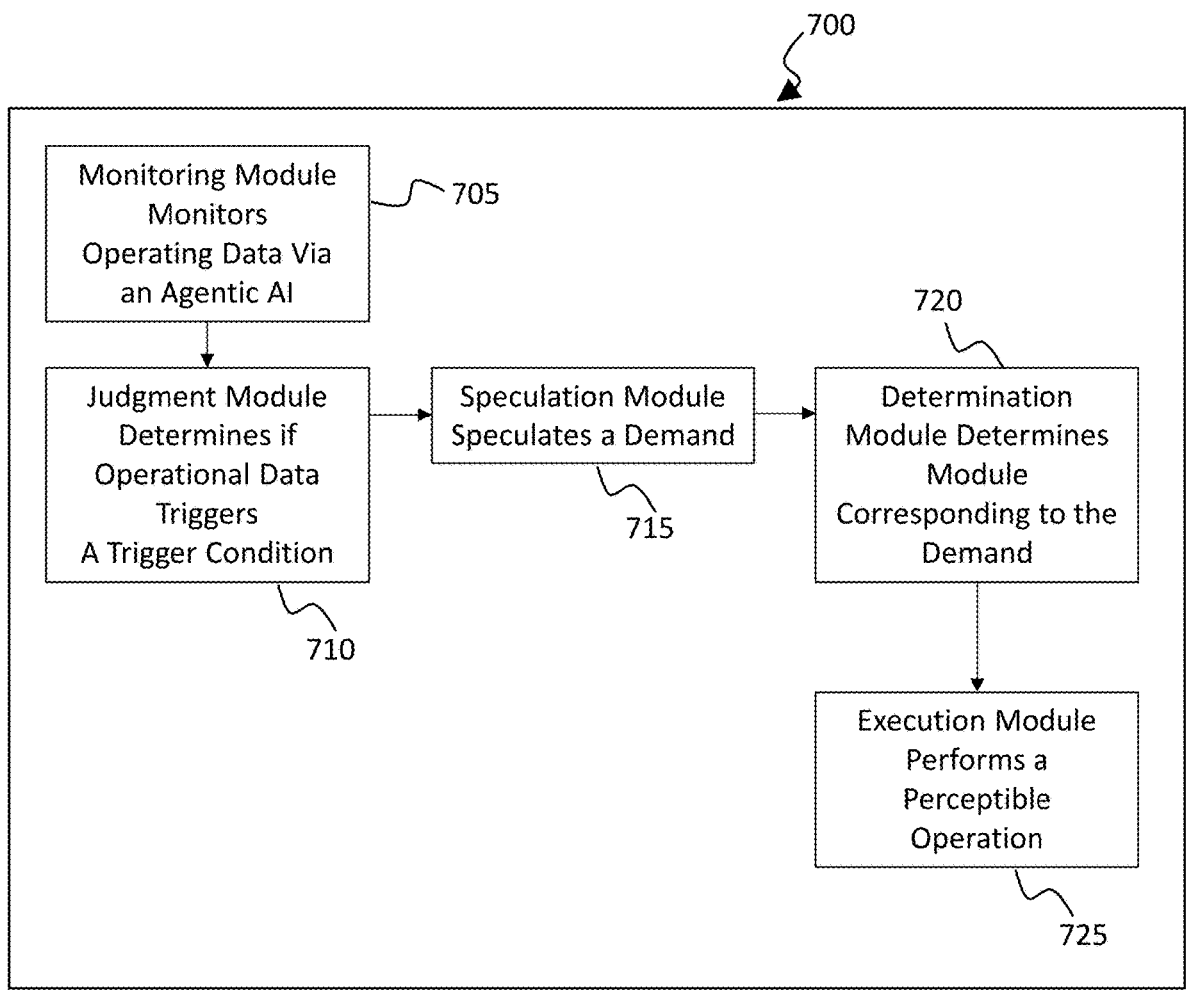
FIG. 17 is a schematic illustration of an exemplary embodiment of the exemplary disclosed system.
Figure 18:
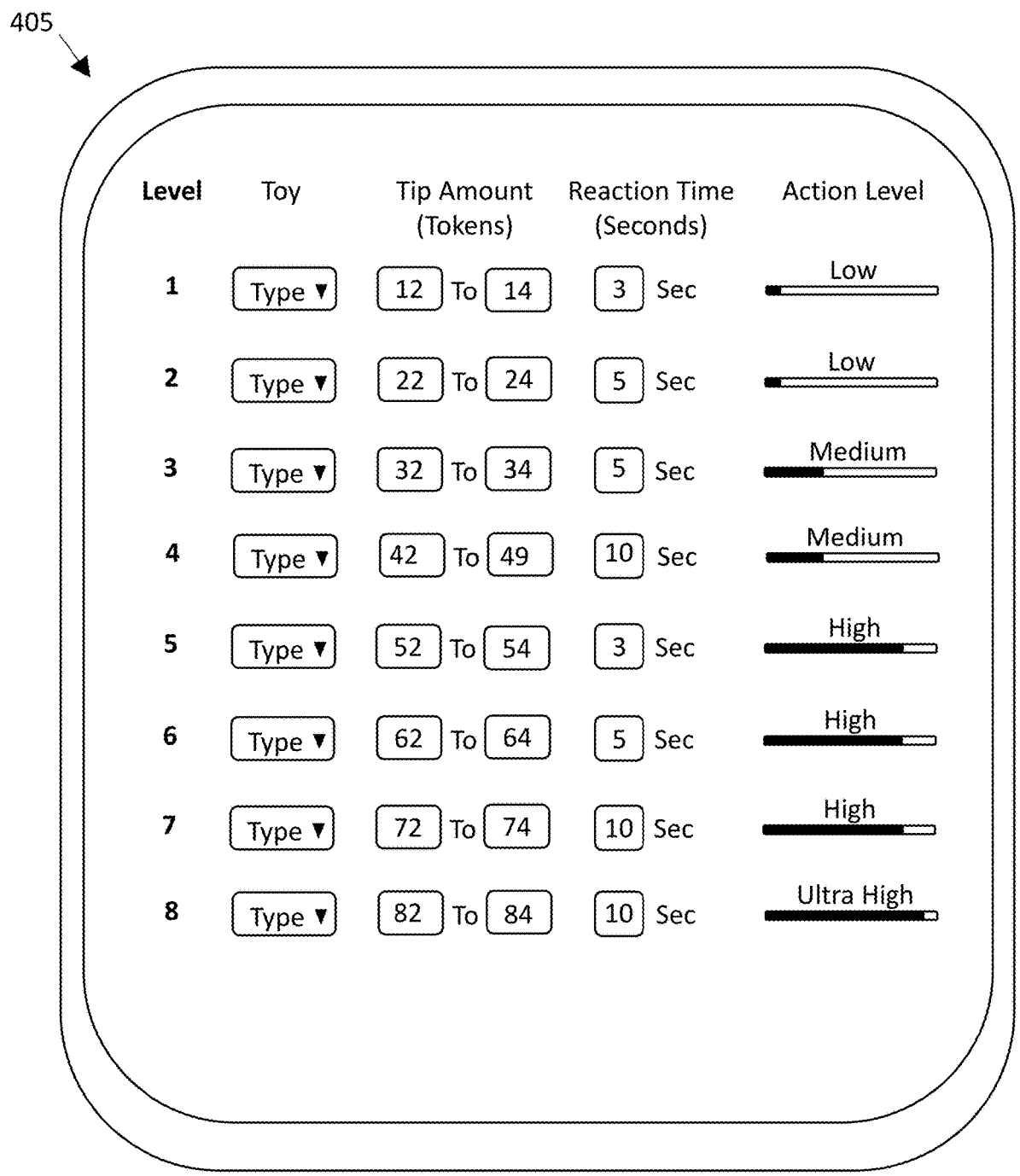
FIG. 18 is a schematic illustration of an exemplary embodiment of the exemplary disclosed system.

In at least some exemplary embodiments and for example as illustrated in FIG. 17, system 300 may include an agentic AI system 700 with components and functions schematically described and shown in FIG. 17. Agentic AI system 700 may include any suitable components for facilitating autonomous perception, reasoning, and action. The exemplary disclosed components may be similar to at least some of the exemplary disclosed hardware and software components and modules described herein (e.g., regarding FIGS. 1-4, 29, and 30), and may facilitate (e.g., allow for) the exemplary disclosed artificial intelligence operations and machine learning operations described herein. These exemplary disclosed components may include any suitable modules for obtaining data, engines for reasoning and making decisions, and executing modules for implementing actions associated with those decisions. Agentic AI system 700 may also include learning components for improving an operation of system 300.

Agentic AI system 700 may include sensors for example as described herein (e.g., cameras, microphones, and other exemplary disclosed sensors of male accessory 308, female accessory 315, male user device 305 and/or female user device 310, including for example respective sensor array 306, imaging device 350, and/or any other suitable devices described herein). Agentic AI system 700 may also include input channels for processing raw data obtained by system 300 and a data preprocessing module for preparing data for use by the exemplary disclosed engines. Agentic AI system 700 may utilize algorithms for analyzing the obtained data for example as described herein. Agentic AI system 700 may operate (e.g., using reinforcement learning or rule-based planning) to create a series of activities or actions for achieving a desired result. Agentic AI system 700 may then organize stored data for use in reasoning and decision-making by the system. Agentic AI system 700 may implement activities and results as physical actions (e.g., of the exemplary disclosed adult toys) and/or software commands (e.g., of the exemplary disclosed component described herein). Agentic AI system 700 may utilize output channels such as the exemplary disclosed applications and/or control of the exemplary disclosed adult toys. Agentic AI system 700 may also utilize feedback loops using the exemplary disclosed components to monitor and evaluate results of its actions and feedback (e.g., based on comments and actions of users using the exemplary disclosed devices including for example tipping and other user behavior). Agentic AI system 700 may utilize any suitable machine learning operations such as supervised learning (e.g., involving labeling data and focusing on performance of specific tasks), reinforcement learning (e.g., involving rewards and penalties received on a trial and error basis), transfer learning (e.g., use of knowledge obtained on previous tasks for use on future tasks), and/or unsupervised learning (e.g., system 300 detecting relationships and patterns without the use of data labeling).

In at least some exemplary embodiments, agentic AI system 700 may act as a "field control expert" for the model (e.g., female user 325 or male user 320) before and/or during (e.g., and/or following) a live broadcast of the model. Agentic AI system 700 may provide real-time (e.g., real-time or near real-time) live broadcast field control functions for the model. Agentic AI system 700 may thereby help to solve problems such as cumbersome settings of software and/or hardware (e.g., involving the exemplary disclosed sex toys, lighting of the exemplary disclosed devices, microphones of the exemplary disclosed devices, and/or any other desired problems), incorrect settings, and/or issues that may arise during livestreaming but that may be overlooked by the model (e.g., who may be busy performing). For example, agentic AI system 700 may operate to handle (e.g., process and respond to) messages from users and/or system 300 that the model may be unable to pay attention to during a live broadcast.

In at least some exemplary embodiments and for example as illustrated in FIG. 17, agentic AI system 700 of system 300 may include a monitoring module (e.g., module 705) that may monitor the exemplary disclosed operational data via the exemplary disclosed agentic AI. For example, agentic AI system 700 may invoke the monitoring module to monitor, via the agentic AI, operational data associated with the model user's livestream. The exemplary disclosed operational data may comprise passive data not acted on by the model user without prompting such as at least one of user-imperceptible data (e.g., not able to be perceived by a user such as the model), user-neglected data (e.g., not acted on or responded to by a user such as the model), user-unperceived data (e.g., not noticed by a user such as the model), and/or user-perceptible data lacking utilization guidance (e.g., data for which a user such as the model may not know or understand how to act on or respond to). For example, the exemplary disclosed operational data is further described below in the exemplary embodiments that follow below.

In at least some exemplary embodiments, the exemplary disclosed operational data may be associated with a model user's livestream. The exemplary disclosed operational data may include operation data of the model's livestreaming room before and/or during (e.g., and/or after) a live broadcast. The exemplary disclosed operational data may include data related to a live interaction configuration associated with a model's livestreaming, livestreaming technology configuration data, and/or livestreaming operation configuration data. For example, the exemplary disclosed operational data may include parameter setting data for software and/or hardware, a number of viewers in the live broadcast, a number of viewers' rewards (e.g., by viewer, for an aggregate or total number of viewers, and/or for different categories or subsets of viewers), an amount of viewers' rewards, a time of viewers' rewards (e.g., time received, including for example over a desired time period), identities of viewers, viewers' characteristic information (e.g., biographical information, system information such as computing device information, and/or any other desired information), comments from viewers in the live broadcast, data of other model live broadcasts, and/or any other desired data. Also for example, the exemplary disclosed operational data may be associated with a model user's livestream history and/or statistics. For example, the exemplary disclosed operational data may include at least one of historical live broadcast data of a live broadcast associated with the model, real-time live broadcast data of the live broadcast associated with the model, statistical data obtained (e.g., compiled) after the live broadcast associated with the model, and/or any other desired livestream history and/or statistics and/or other related data. Also for example, the exemplary disclosed operational data may be data associated with a physiological state of a model user, including the model user's body temperature, heart rate, respiratory rate, sweating state, sexual state, and/or other suitable physiological data.

In at least some exemplary embodiments and for example as illustrated in FIG. 17, agentic AI system 700 of system 300 may include a judgment module (e.g., module 710) that may determine if operational data triggers a trigger condition. For example, agentic AI system 700 may invoke the judgment module to determine, via the agentic AI, whether the operational data satisfies a trigger condition. The trigger condition may be a condition based on which agentic AI system 700 takes action on, for example as described further below (e.g., a large tip being made, a user to whom proposed tips and actions are to be provided to evoke tipping, prompts or script actions that are to be provided to the model, proposed responses to be made to users by the model, and/or any other suitable trigger condition).

In at least some exemplary embodiments and for example as illustrated in FIG. 17, agentic AI system 700 of system 300 may include a speculation module (e.g., module 715) that may speculate a demand. For example, agentic AI system 700 may invoke the speculation module to speculate, via the agentic AI, at least one demand (e.g., one or more demands, such as one or more related demands) of the model user based on the operational data and the trigger condition. The one or more demands may be made by agentic AI system 700 in response to a determination that the exemplary disclosed operational data satisfies the exemplary disclosed trigger condition. The exemplary disclosed demand may be a demand for the model to take action based on a user-perceptible operation (e.g., an action perceptible to a user such as the model user) for example as described below (e.g., to take an action during the livestreaming based on the user-perceptible operation). The exemplary disclosed demands may include adjusting the settings of the livestreaming software, adjusting a lighting effect of a live broadcast screen (e.g., displayed via GUI 405), setting reward rules, recommending live content (e.g., actions and/or scripting for a model's performance), and/or any other suitable criteria. For example, the exemplary disclosed demands may be related to operations (e.g., actions) for example as described below in the exemplary embodiments of FIGS. 19A through 24, 26, and 27.

In at least some exemplary embodiments and for example as illustrated in FIG. 17, agentic AI system 700 of system 300 may include a determination module (e.g., module 720) that may determine a module (e.g., the exemplary disclosed execution module described below at module 725) corresponding to the exemplary disclosed demand. For example, agentic AI system 700 may invoke a determination module (e.g., module 720) to determine, via the agentic AI, at least one execution module (e.g., described below at module 725) and an execution instruction corresponding to the at least one demand of the model user. The exemplary disclosed execution instruction may be for performing the exemplary disclosed user-perceptible operation for example as described below.

In at least some exemplary embodiments and for example as illustrated in FIG. 17, agentic AI system 700 of system 300 may include an execution module (e.g., module 725) that may perform the exemplary disclosed user-perceptible operation. For example, agentic AI system 700 may invoke at least one execution module to perform, via the agentic AI, a corresponding user-perceptible operation based on the execution instruction. The user-perceptible operation may be configured to address the at least one exemplary disclosed demand of the model user. The user-perceptible operation may be any suitable operation (e.g., displayed by GUI 405 to a model and/or viewer) for example as described below in the exemplary embodiments of FIGS. 19A through 24, 26, and 27. In at least some exemplary embodiments, when the agentic AI system 700 of system 300 perceives that the operational data related to the current model user is similar to a historical data that has been collected, agentic AI system 700 may invoke the speculation module to speculate the model's current one or more demands based on the performance or demands of other models in the historical data, and then may provide the model with execution information that meets the demands. At the same time, if agentic AI system 700 receives the model's feedback on the execution information, agentic AI system 700 may score the speculated demands based on the model's feedback on the execution information, thereby updating the demand speculated algorithm.

In at least some exemplary embodiments, system 300 (e.g., including agentic AI system 700) may provide agentic AI chatbox assistance. System 300 (e.g., including agentic AI system 700, for example with the exemplary disclosed agentic AI as a main body) may act as a "field control expert" for the model before and/or during (e.g., and/or after) the live broadcast, providing real-time (e.g., real-time and near real-time) live broadcast field control functions for the model (e.g., female user 325 or male user 320). System 300 may thereby help to solve problems such as cumbersome settings, incorrect settings, overlooked issues, and/or the model being unable to pay attention to messages during the live broadcast. The exemplary disclosed agentic AI may serve as a technical support system, providing configuration support for software and/or hardware utilized by the model to conduct live broadcasts. The exemplary disclosed agentic AI may serve as operational support to promote the livestreaming of the model and may encourage viewers to tip the model. The exemplary disclosed agentic AI may provide customer service support, responding to user messages (e.g., messages from viewers) during livestreaming by the model. The exemplary disclosed agentic AI may act as a director's assistant, providing suggestions (e.g., scripting or prompting for a performance) for the livestreaming content of the model.

In at least some exemplary embodiments and as illustrated in FIGS. 18 through 21, system 300 (e.g., including agentic AI system 700) may include the exemplary disclosed agentic AI that may operate (e.g., act as an expert) to provide guidance based on the relevant parameters set (e.g., by the model and/or system 300 for example based on user input, operation of algorithms, and/or the exemplary disclosed AI) for the model livestreaming. The exemplary disclosed agentic AI may provide for audience incentive interaction demands for the model. For example, the exemplary disclosed agentic AI may guide viewers to provide rewards (e.g., tip rewards) based on the reward parameters set by the model (e.g., and/or system 300) for example as illustrated in the exemplary disclosed tip menu of FIG. 18 during the live broadcast.

Figure 19A:
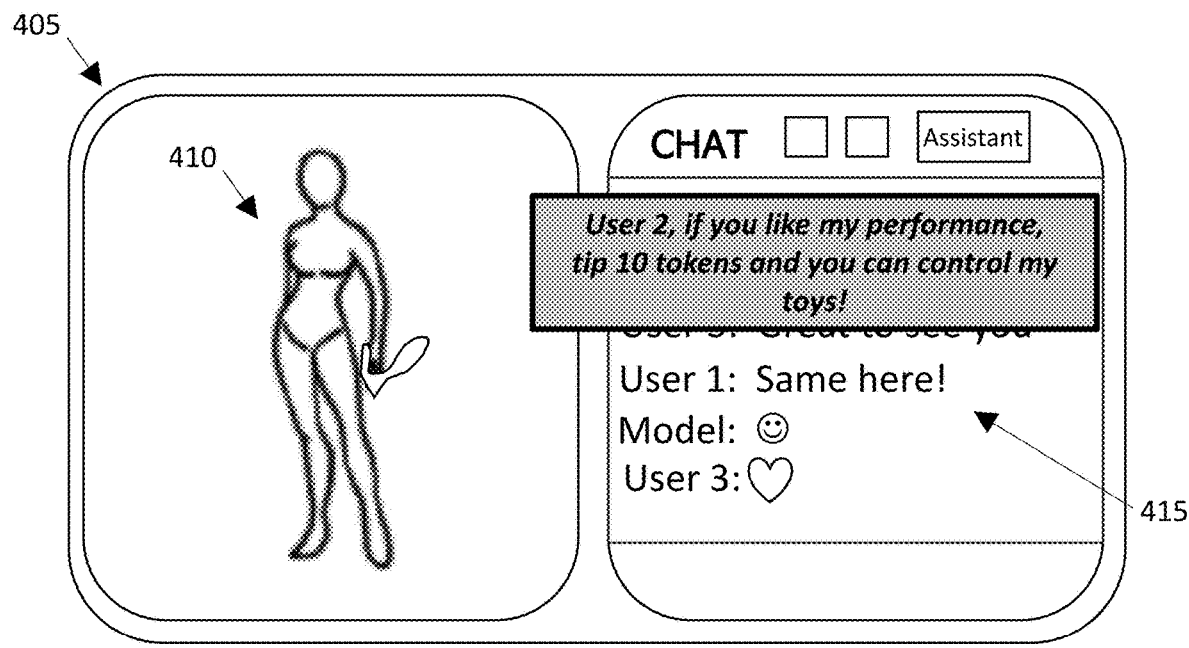
FIG. 19A is a schematic illustration of an exemplary embodiment of the exemplary disclosed system.
Figure 19B:
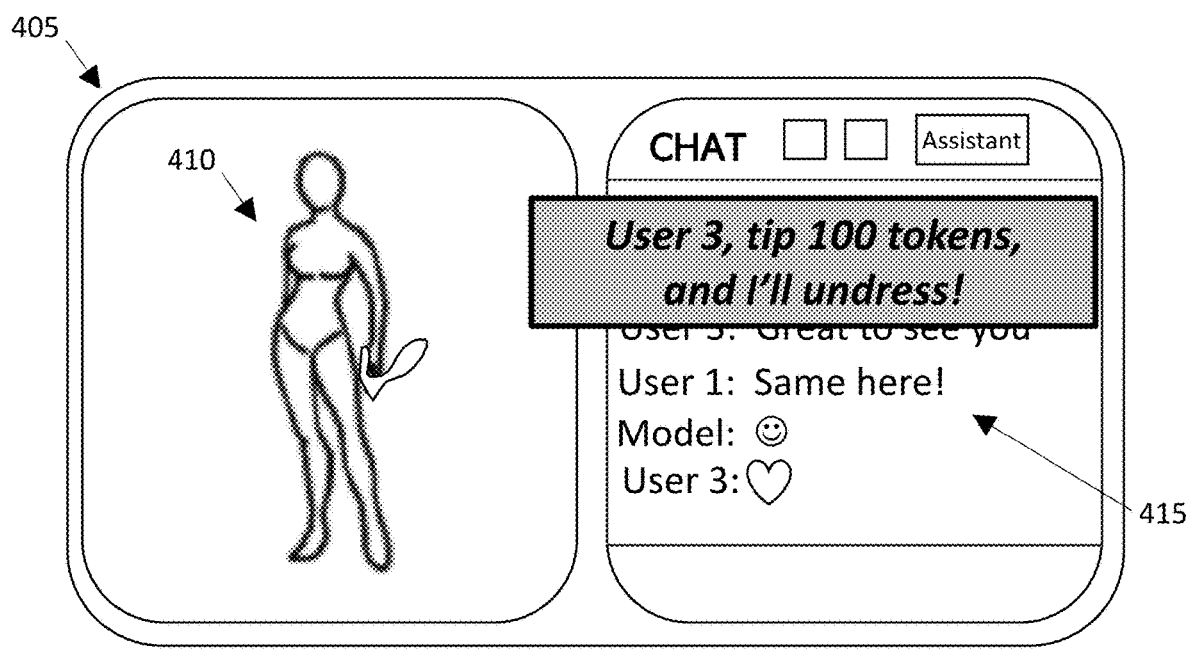
FIG. 19B is a schematic illustration of an exemplary embodiment of the exemplary disclosed system.
Figure 20:
FIG. 20 is a schematic illustration of an exemplary embodiment of the exemplary disclosed system.
Figure 21:
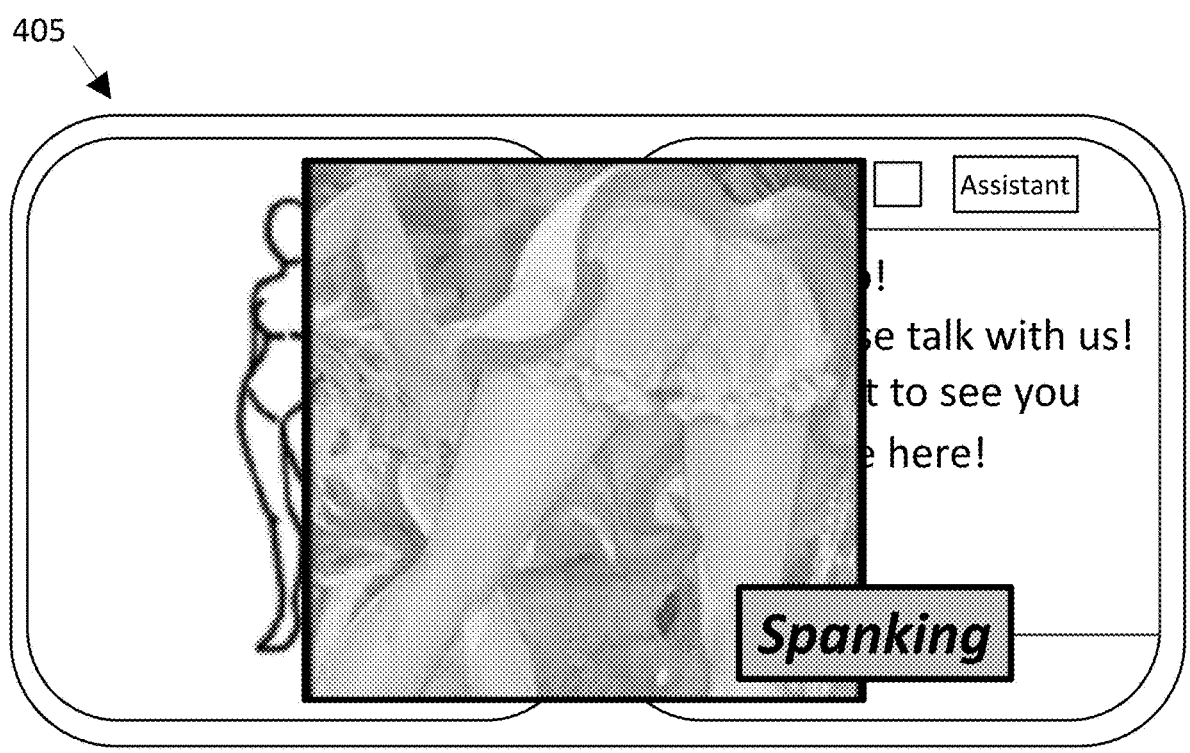
FIG. 21 is a schematic illustration of an exemplary embodiment of the exemplary disclosed system.

For example, if a new viewer (e.g., new viewer A such as User 2 or User 3 as illustrated in FIGS. 19A and 19B) enters the model's live broadcast room, and watches the viewer model's live broadcast room for a time period that reaches 5 minutes of livestreaming, the exemplary disclosed agentic AI may actively output content and/or guide (e.g., prompt or encourage) the viewer to give rewards based on the reward parameters (e.g., as set forth in the tip menu of FIG. 18) set by the model and/or system 300 (e.g., including agentic AI system 700). In this illustrative example, operational data of a new viewer (e.g., new viewer A, such as user 2 or user 3) entering the model's live broadcast room might be perceivable (e.g., able to be relatively easily perceived) by the model. However, in this illustrative example, operational data of the user A watching the viewer model's live broadcast room reaching a time period of 5 minutes of livestreaming may be user-imperceptible data (e.g., a type of the exemplary disclosed passive data not acted on by the model user without prompting, which may not be relatively easily perceived by the model). Other examples of the exemplary disclosed user-imperceptible data may include other actions of viewers associated with time periods (e.g., a ranking or hierarchy of viewers who watch the model most), viewers who may exit and reenter the model's live broadcast room, viewers who may tip more or less based on certain actions of the model (e.g., the model making different performance actions and/or removing certain types of articles of clothing), and/or any other suitable data that may not be relatively easily perceived. The exemplary disclosed agentic AI may relatively accurately (e.g., relatively, substantially, accurately) identify this type of operational data (e.g., the exemplary disclosed user-imperceptible data). For example as illustrated in FIG. 19A, system 300 may provide any suitable output content (e.g., via GUI 405) to one or more viewers such as "User 2, if you like my performance, tip 10 tokens and you can control my toys!". Also for example based on the tip menu of FIG. 18, system 300 may similarly output "Tip 24 tokens for 5 seconds of toy action!" or "Tip 83 tokens for 10 seconds of Ultra High toy action!" Further for example (e.g., based on parameters set by the model and/or system 300), the exemplary disclosed agentic AI may display prompts to one or more viewers such as "User 3, tip 100 tokens, and I'll undress" for example as illustrated in FIG. 19B. If the user tips at least the requested amount, system 300 (e.g., including agentic AI system 700) may operate to perform a user-perceptible operation for the model via the model's GUI 405 to undress for example as illustrated in FIG. 20. System 300 (e.g., including agentic AI system 700) may provide the prompt at a suitable time based, for example, on past data of tipping amounts and/or tipping times for viewers in general and/or for specific users receiving the prompt (e.g., related to the user-perceptible operation) using the exemplary disclosed agentic AI operations. Further for example, system 300 (e.g., including agentic AI system 700) may output animation information on GUI 405 (e.g., of a viewer) corresponding to the reward rules (e.g., similar to tip menu illustrated in FIG. 18). For example, for the rule of "User 3, tip 100 tokens, and I'll undress" displayed by system 300 on behalf of the model, the exemplary disclosed agentic AI may generate a model image and perform an undressing animation (e.g., on the viewer's GUI 405 prior to the model undressing and/or on the model's GUI 405 as the exemplary disclosed user-perceptible operation to perform the undressing). For example, for a rule (e.g., a tip menu rule) of "reward 50 tokens, model performs spanking," the exemplary disclosed agentic AI may generate a model image and perform a spanking animation (e.g., on the viewer's GUI 405 prior to the model performing the spanking and/or on the model's GUI 405 as the exemplary disclosed user-perceptible operation to perform the spanking) for example as illustrated in FIG. 21.

Figure 22:
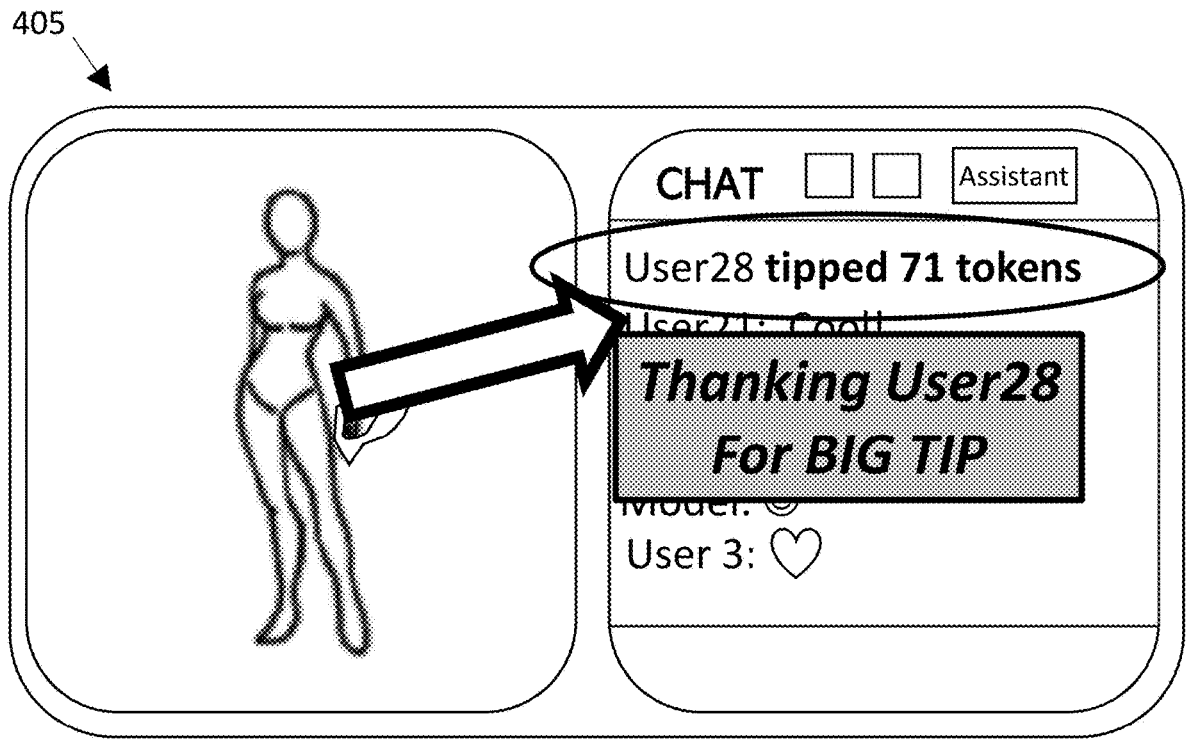
FIG. 22 is a schematic illustration of an exemplary embodiment of the exemplary disclosed system.
Figure 23:
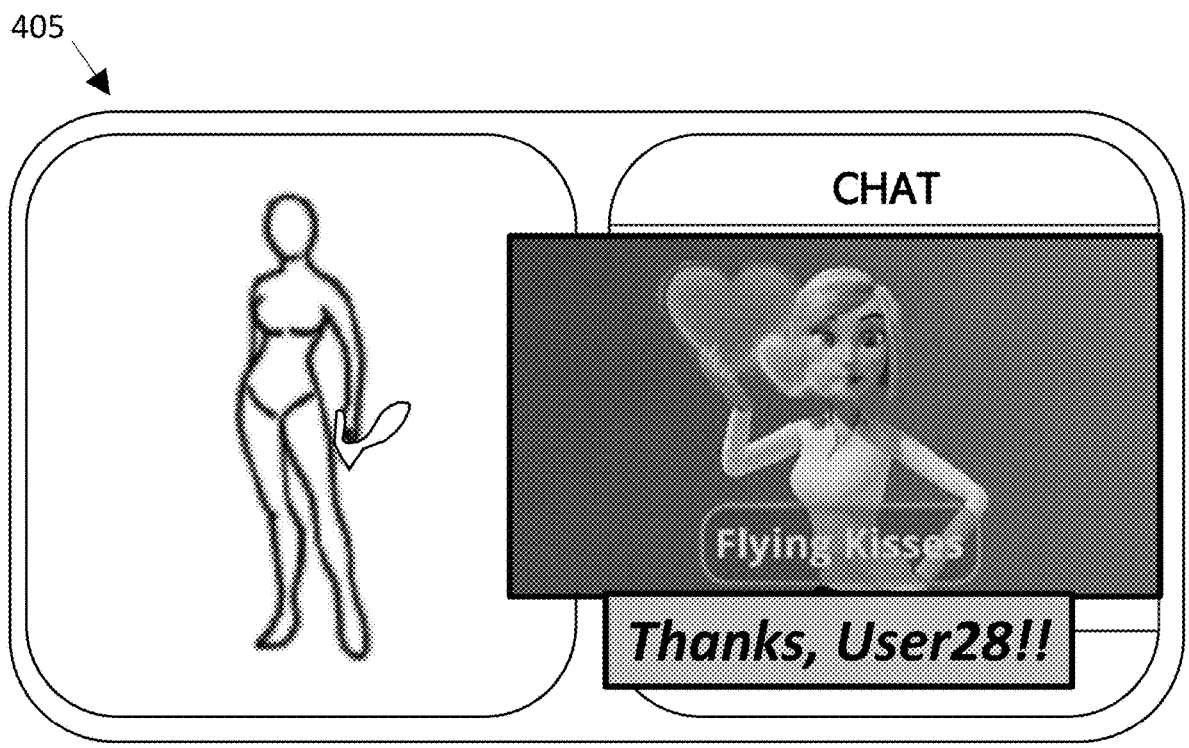
FIG. 23 is a schematic illustration of an exemplary embodiment of the exemplary disclosed system.
Figure 24:
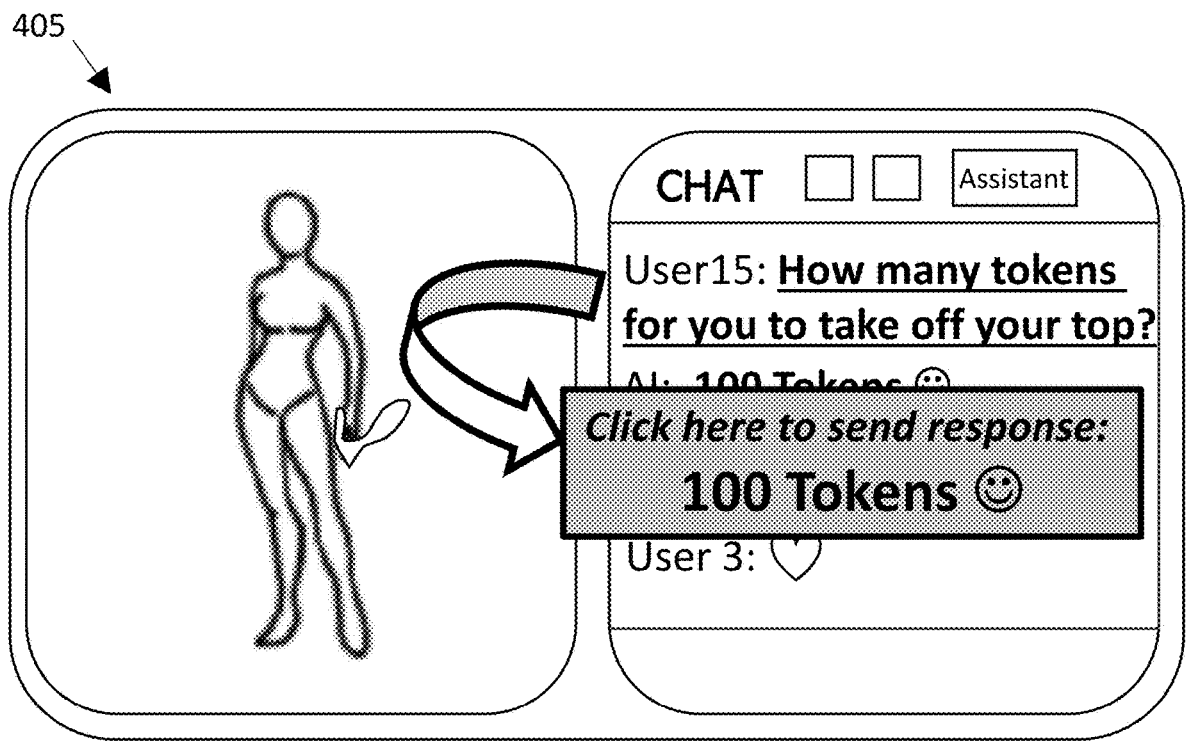
FIG. 24 is a schematic illustration of an exemplary embodiment of the exemplary disclosed system.

In at least some exemplary embodiments and as illustrated in FIGS. 22 through 24, system 300 (e.g., including agentic AI system 700) may act as a customer service agent and may respond to operational data, including for example interaction data between viewers and the model. For example, when a new viewer enters the model's live broadcast room, or when a viewer who has provided significant tips (e.g., in previous livestreaming) enters the model's live broadcast room, the exemplary disclosed agentic AI may automatically generate different welcome messages. System 300 (e.g., including agentic AI system 700) may provide the prompt based, for example, on past data of tipping amounts for the specific user entering the room and receiving the prompt (e.g., related to the user-perceptible operation) using the exemplary disclosed agentic AI operations. For example, a prompt (e.g., user-perceptible operation) of hand-waving, winking, or smiling (e.g., and/or text stating "Big Tipper" or "Greet Big Tipper [username]") may be displayed to the model to prompt the model to make the corresponding action in the livestream to greet the high tipper. System 300 may thereby operate to provide a prompt to the model based on operational data such as user-neglected data (e.g., a type of the exemplary disclosed passive data not acted on by the model user without prompting, which may include data not acted on or responded to by the model such as a big tipper entering the model's live broadcast room). System 300 may provide similar prompts based on any suitable user-neglected data such as, for example, a certain threshold of tips (e.g. tipping amounts) being met, predetermined goals or objectives (e.g., stated objectives) of the model being met (e.g., if the model earlier stated during the livestream performance that the model would take a certain action if a certain condition or threshold related to the livestreaming is met), and/or any other suitable user-neglected data. Also for example as illustrated in FIGS. 22 and 23, when a viewer gives a reward (e.g., tip, such as a big tip) in the live broadcast room, the exemplary disclosed agentic AI may generate a corresponding response based on the amount of the reward and reply to the reward (e.g., via the viewer's GUI 405). For example as illustrated in FIG. 22, the exemplary disclosed agentic AI may provide a user-perceptible operation that it is thanking a user (e.g., "Thanking User28 for BIG TIP") via the model's GUI 405 to the model, while also simultaneously providing a user-perceptible operation to the viewer as illustrated in FIG. 23 to thank the tipping viewer via the tipping viewer's GUI 405 (e.g., text thanking the user and/or any suitable animation such as, for example, blowing kisses).

Also for example as illustrated in FIG. 24, the exemplary disclosed agentic AI may formulate responses to viewer comments for example based on parameters provided by the model and/or system 300 (e.g., similar to the exemplary disclosed tip menu described above regarding FIG. 18). The exemplary disclosed agentic AI may monitor comments for certain combinations of words and/or questions corresponding to a part of the exemplary disclosed tip menu or any other suitable criteria associated with system 300 (e.g., and/or based on self-defined and/or learned responses based on the exemplary disclosed artificial intelligence operations). System 300 may thereby operate to provide a prompt to the model based on operational data such as user-unperceived data (e.g., a type of the exemplary disclosed passive data not acted on by the model user without prompting, which may include data not noticed by the model such as questions entered into the chat of the model's live broadcast room by a viewer). System 300 may provide similar prompts based on any suitable user-unperceived data such as, for example, interactions or chat exchanges between users (e.g., involving a model action that if performed may lead to tipping and/or competition between viewers in tipping amounts), encouragement or playful teasing made by a viewer (e.g., gestures based on images of the user and/or comments in the chat), and/or any other suitable user-unperceived data. For example, when a viewer in a live broadcast room urges a model to undress and/or remove specific articles of clothing (e.g., or asks the model what the conditions are for taking an action in the livestream such as removing clothing), the exemplary disclosed agentic AI may formulate a response for example as illustrated in FIG. 24. For example, in response to the viewer question "How many tokens for you to take off your top?" or a similar query, the exemplary disclosed agentic AI may display an amount of tokens (e.g., 100 tokens) as a proposed response as illustrated in FIG. 24. The exemplary disclosed agentic AI may provide the model an opportunity to approve the proposed response as illustrated in FIG. 24, or may automatically send the response in at least some exemplary embodiments (e.g., based on settings provided to system 300 by the model user).

Figure 25:
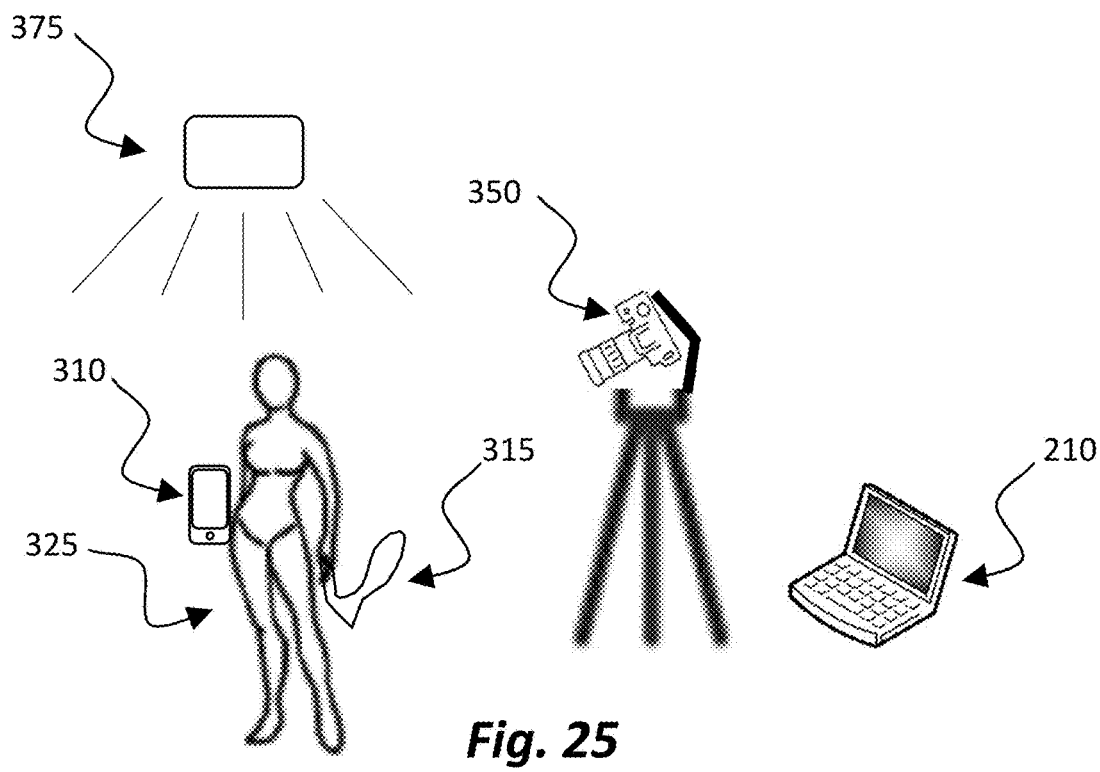
FIG. 25 is a schematic illustration of an exemplary embodiment of the exemplary disclosed system.

In at least some exemplary embodiments and as illustrated in FIG. 25, system 300 (e.g., including agentic AI system 700) may operate (e.g., act) as a technical support system and respond to operational data, including configuration data of the exemplary disclosed software and/or hardware related to a model's live broadcast. For example, before a model starts a live broadcast, the exemplary disclosed agentic AI may monitor the setting data of the exemplary disclosed software (e.g., application) used by the model for the live broadcast such as, for example, resolution settings, bit rate settings, streaming address settings, and/or any other suitable settings. Such data may be examples of user-perceptible data lacking utilization guidance. If an error is found in the data settings by system 300 (e.g., including agentic AI system 700), the exemplary disclosed agentic AI may automatically configure it to be usable data (e.g., including automatically reconfiguring settings). The exemplary disclosed agentic AI may configure the settings based on past configurations of system 300 during livestreaming and/or based on self-defined and/or learned settings based on the exemplary disclosed artificial intelligence operations. System 300 may thereby operate to provide a prompt to the model based on operational data such as user-perceptible data lacking utilization guidance (e.g., a type of the exemplary disclosed passive data not acted on by the model user without prompting, which may include data for which a user such as the model may not know or understand how to act on or respond to). System 300 may provide similar prompts based on any suitable user-perceptible data lacking utilization guidance such as, for example, application settings for the live broadcast (e.g., that the model may not utilize based on not understanding the settings and/or seldom attempting to adjust the settings), software and/or other settings related to plugins and/or other software that may be used with the exemplary disclosed application, camera settings, and/or any other suitable user-perceptible data lacking utilization guidance.

In at least some exemplary embodiments, system 300 (e.g., including agentic AI system 700) may, for example before the model starts livestreaming, monitor the model's reward rule setting data (e.g., similar to the tip menu described above regarding FIG. 18), and configure reward rules for the model based on the model's personal details and data (e.g., portrait), the model's audience details and data (e.g., portrait), the model's historical livestreaming reward details and data (e.g., portrait such as tipping history), the livestreaming platform's audience reward details and data (e.g., portrait such as aggregate tipping information), aggregate tipping (e.g., average tipping including, for example, for similar model performances and/or models) on the platform, and/or any other suitable criteria. System 300 (e.g., including agentic AI system 700) may thereby provide suitable rewards for the model using the exemplary disclosed agentic AI operations so that a model does not for example undervalue the model's own performance value during livestreaming.

Figure 29:
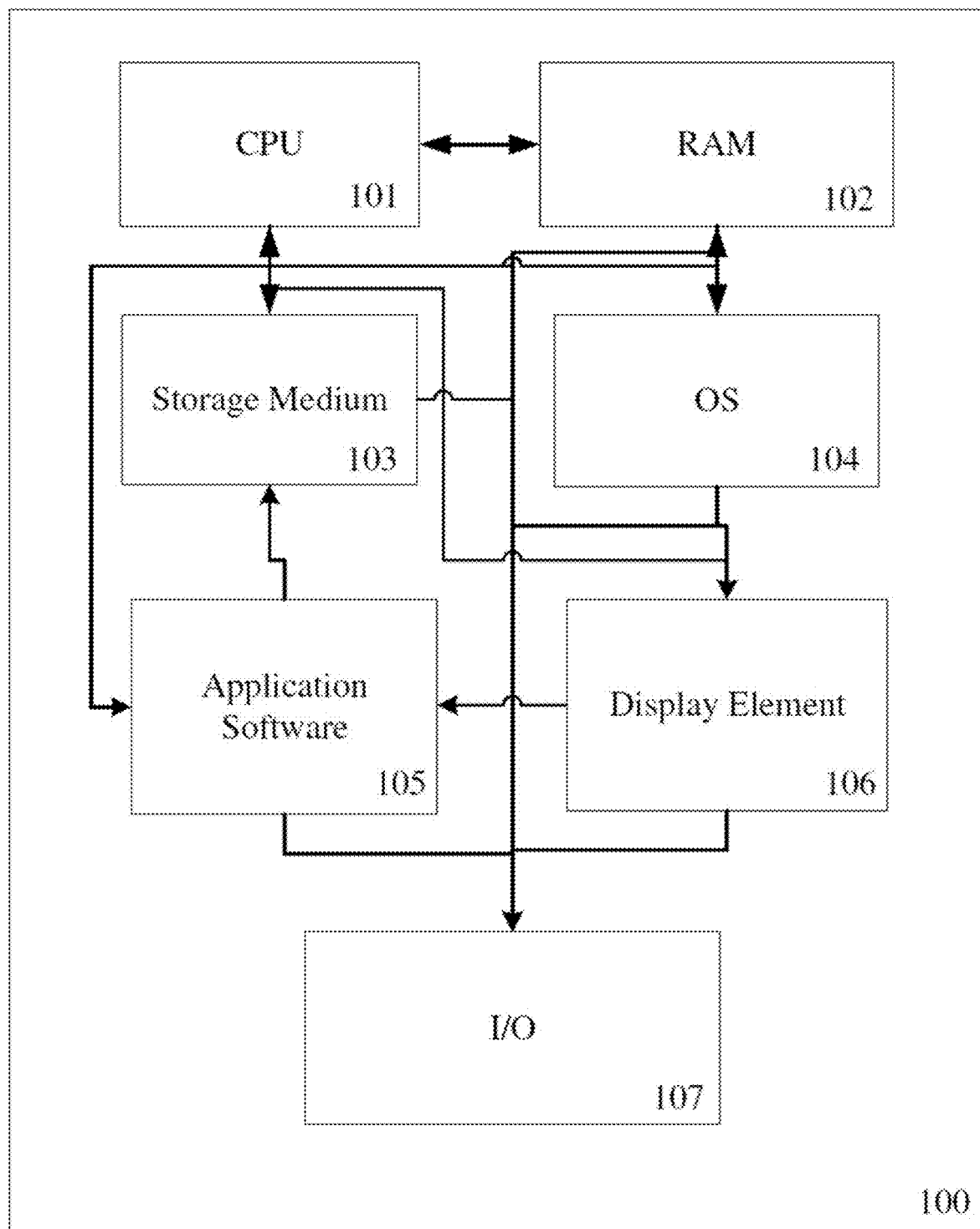
FIG. 29 is a schematic illustration of an exemplary computing device, in accordance with at least some exemplary embodiments of the present disclosure.
Figure 30:
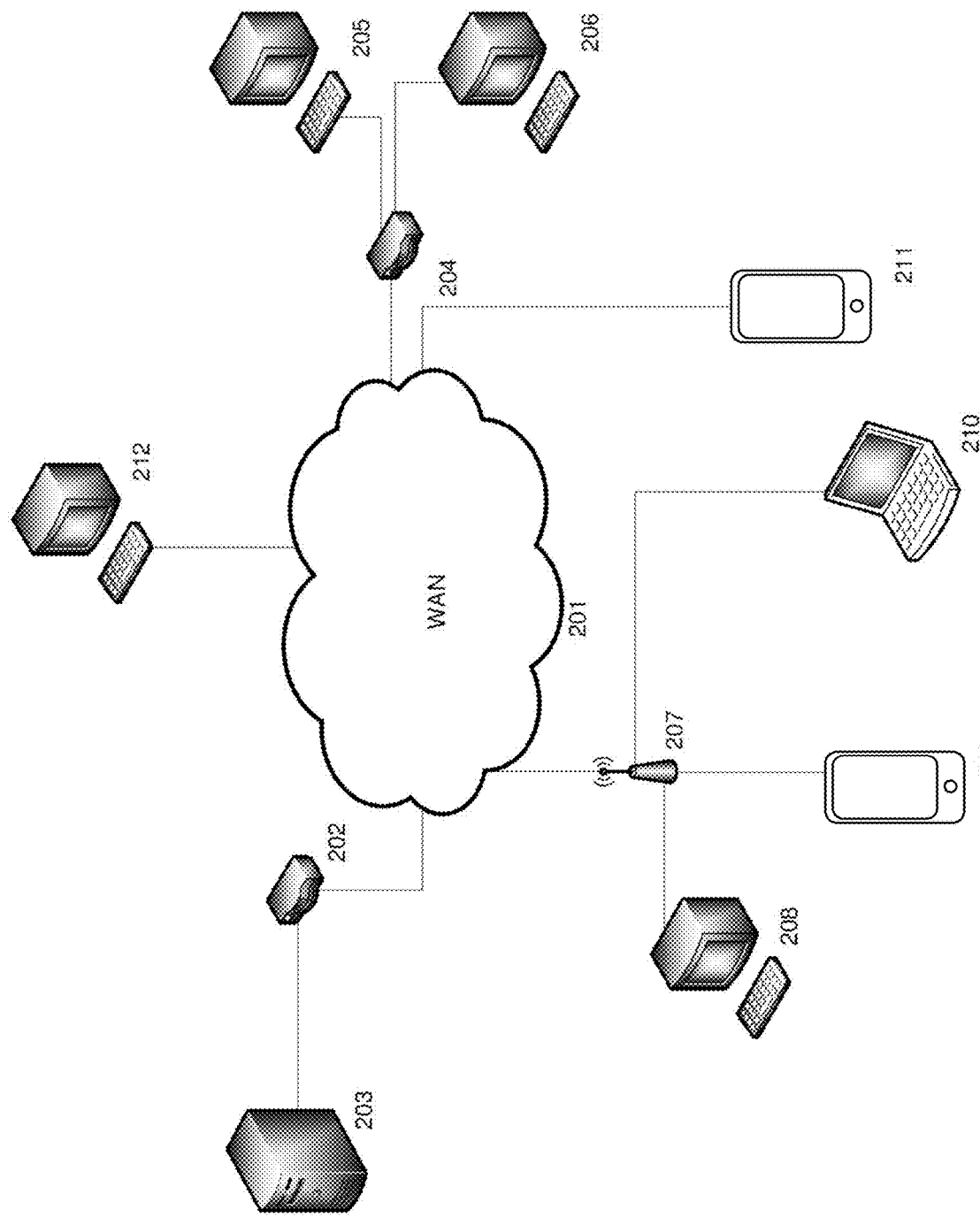
FIG. 30 is a schematic illustration of an exemplary network, in accordance with at least some exemplary embodiments of the present disclosure.

In at least some exemplary embodiments and as illustrated in FIG. 25, system 300 (e.g., including agentic AI system 700) may, for example before a model starts a live broadcast, monitor configuration data of the model's lighting (e.g., including based on a lighting apparatus 375 that may be for example a lamp or overhead light and/or light provided from the model's exemplary disclosed devices), sex toys (e.g., female accessory 315 and/or male accessory 308), cameras (e.g., imaging device 350 and/or an exemplary disclosed user device camera such as a smartphone camera), and/or other suitable hardware equipment (e.g., as described regarding FIGS. 29 and 30). For example, system 300 (e.g., including agentic AI system 700) may monitor and configure configuration data based on past data of configuration data (e.g., and/or learned configuration data) for example that may correspond to previous positively received or successful livestreams using the exemplary disclosed agentic AI operations. For example, the exemplary disclosed agentic AI may determine whether the lighting affects the live broadcast picture, whether the exemplary disclosed adult toys remain connected, whether the exemplary disclosed adult toys have sufficient power, whether the exemplary disclosed camera is focused accurately, and any other suitable criteria. Then, based on the monitored configuration data, if there are errors or deficiencies (e.g., similar to those that a model user might recognize as errors), the exemplary disclosed agentic AI may automatically configure the configuration data of the corresponding hardware equipment for example as described herein.

In at least some exemplary embodiments, system 300 (e.g., including agentic AI system 700) may operate (e.g., act) as an agent or operator to assist models in promoting model live broadcasts. For example before a model starts livestreaming, the exemplary disclosed agentic AI may assist the model in promotion based on the start time and/or end time of the model's livestreaming. As an illustrative example, 12 hours, 6 hours, and/or 1 hour before the model starts livestreaming, the exemplary disclosed agentic AI may automatically generate promotional content (e.g., promotional copy) and publish it on any suitable social platforms (e.g., any suitable social media platforms). Also for example (e.g., and at the same time), for different platforms such as social media platforms, agentic AI may generate different copy according to the rules and characteristics of the platform (e.g., such as text copy, video copy, images, and/or any other suitable content). Further for example, when generating messages, the exemplary disclosed agentic AI may combine current popular slang (e.g., the current hot or trending words), and integrate the current words into the promotional messages (e.g., including improving or polishing them using the exemplary disclosed AI operations). As an illustrative example, the phrase "this year's No. 1 typhoon" may be integrated (e.g., completely integrated) into the promotional message (e.g., "This year's No. 1 typhoon has come: Stay at home and watch my live broadcast!"). For example, system 300 (e.g., including agentic AI system 700) may provide the exemplary disclosed promotion based on past promotion data (e.g., and/or learned configuration data) for example that may correspond to positively received or successful previous livestreams using the exemplary disclosed agentic AI operations.

In at least some exemplary embodiments, system 300 (e.g., including agentic AI system 700) may send promotional messages about the model's live broadcast to viewers who follow the model, similarly to as described above regarding the exemplary disclosed promotional activity. For example, within 5 minutes of a model starting a live broadcast, the exemplary disclosed agentic AI may send a promotional message to specific viewers who have previously followed the model. Also for example, the exemplary disclosed agentic AI may automatically edit highlights of the model's live broadcast (e.g., such as pole dancing performances and quick toy performances) to generate a promotional video of the model's live broadcast, and then send the promotional material to a specific promotion platform.

Figure 26:
FIG. 26 is a schematic illustration of an exemplary embodiment of the exemplary disclosed system.

In at least some exemplary embodiments and as illustrated in FIG. 26, system 300 (e.g., including agentic AI system 700) may operate (e.g., act) as a screenwriter and/or director, providing guidance to a model for the model's live performance in real-time. For example, before a model starts a live broadcast, the exemplary disclosed agentic AI may combine the model's personal portrait (e.g., details and personal information), the model's audience portrait (e.g., details and data of the model's viewers), the model's historical live broadcast data (e.g., over any desired time period), system-wide aggregate data (e.g., for certain types of models and/or substantially all models), and/or any other suitable data to generate a performance script for the model using the exemplary disclosed agentic AI operations. The performance script may include guidance as to what content to utilize in performing and/or at which time period to use such content (e.g., as well as guidance on the model's appearance, demeanor, and/or styling). For example, system 300 (e.g., including agentic AI system 700) may provide the exemplary disclosed performance script based on past performance data (e.g., and/or learned configuration data) for example that may correspond to positively received or successful previous livestreams using the exemplary disclosed agentic AI operations. For example, when a model starts a live broadcast, the exemplary disclosed agentic AI may consider (e.g., integrate into the analysis and agentic AI operations) real-time operational data of the model's live broadcast (e.g., a number of viewers, a number of viewers' rewards, and/or other suitable data) to provide real-time guidance to the model, such as asking the live broadcast model to continue showing a current action and/or instructing the model to change the current action. As an illustrative example (e.g., as illustrated in FIG. 26), the exemplary disclosed agentic AI may perform user-perceptible operations such as displaying text and/or images or animation to stop patting (e.g., patting the buttocks), and to remove clothing (e.g., remove a shirt), to the model via the model's GUI 405 (e.g., and/or to a viewer via the viewer's GUI 405 prior to the model performing the action, for example so that the viewer anticipates the actions).

In at least some exemplary embodiments, system 300 (e.g., including agentic AI system 700) may operate (e.g., act) as a reviewer to review live broadcast data. For example, the exemplary disclosed agentic AI may provide suggestions for the model's next live broadcast based on the data of the current live broadcast and/or historical live broadcast data using the exemplary disclosed agentic AI operations. Also for example, the exemplary disclosed agentic AI may operate to compare the demand predicted based on operational data with actual results (e.g., previously predicted demand compared with later actual results), and then dynamically adjust and/or optimize subsequent demand inference plans based on the comparison. Also for example, the exemplary disclosed agentic AI may be used to determine whether the demand previously predicted by the agentic AI based on running data (e.g., real-time data) meets expectations, and then output a judgment result (e.g., that may be used to improve the exemplary disclosed agentic AI operations).

Figure 27:
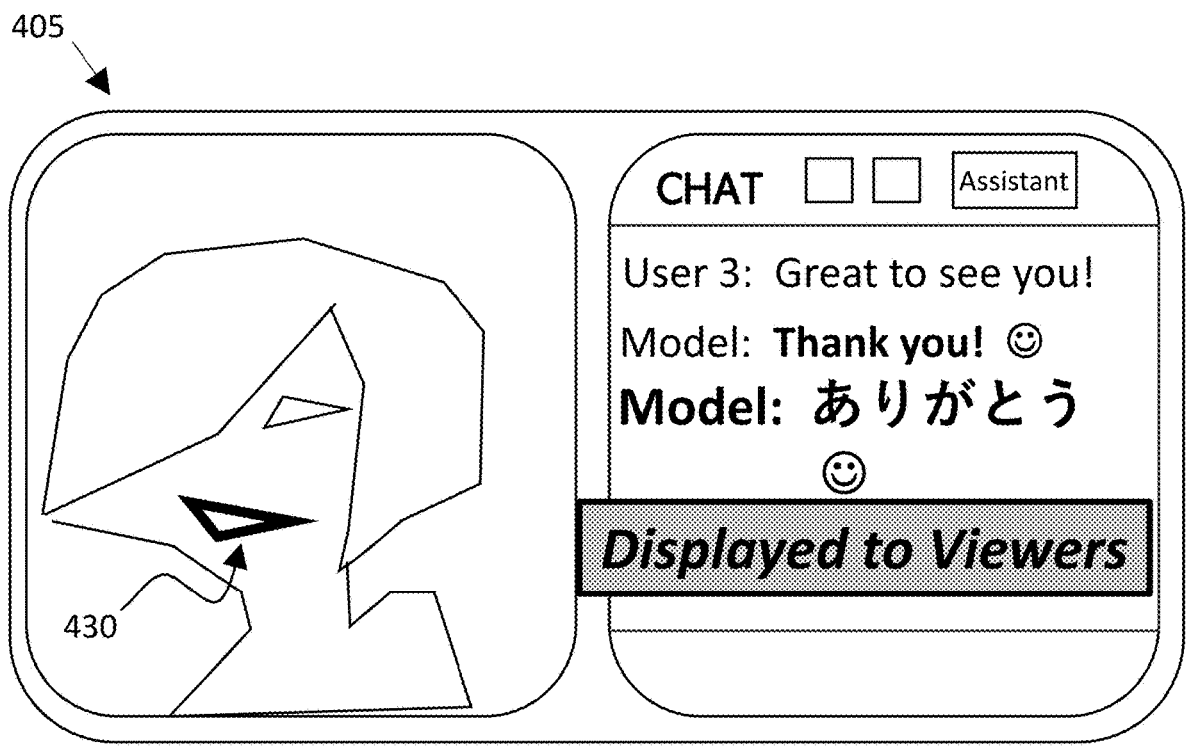
FIG. 27 is a schematic illustration of an exemplary embodiment of the exemplary disclosed system.

In at least some exemplary embodiments and as illustrated in FIG. 27, system 300 (e.g., including agentic AI system 700) may operate (e.g., act) as a real-time translator, translating the model's text (e.g., in the chat) and/or audio (e.g., video) message (e.g., display via GUI 405) and/or words in real-time. For example, the exemplary disclosed agentic AI may translate the audience's messages into the language (e.g., the model's native language or language in which the model is fluent) that the model understands in real-time. The language may be input via the exemplary disclosed application by the model and/or detected by system 300 based on monitoring the model's livestream (e.g., to determine a language the model is speaking). System 300 may similarly translate the model's own messages. At the same time for example, the exemplary disclosed agentic AI may read the translated language aloud to the model to inform the model of the audience's messages. Also for example, the exemplary disclosed agentic AI may translate the model's messages (e.g., text words and spoken words via livestreaming) into different languages in real-time. For example, the exemplary disclosed agentic AI may modify the model's lip shape (e.g., lip shape 430 as illustrated in FIG. 27) in the live broadcast to the corresponding language. For example, the exemplary disclosed agentic AI may display a graphic of the model's lips substantially seamlessly integrated with the model's image to match the spoken translated words (e.g., which may be altered to be similar to the model's voice via the exemplary disclosed agentic AI operations, so that it appears that the model's own voice is speaking the translated words). The live broadcast screen transmitted to different audiences (e.g., to a viewer via GUI 405) may be the model's lip shape 430 matching the language that the viewer is fluent in (e.g., which may be selected similarly to the model's language described above). The model's message may thereby be translated to as many languages as suitable based on the languages of respective viewers, with lip shape 430 presented to respective viewers to match the language a given viewer (e.g., translated into a language understandable to the viewer) is hearing via GUI 405. As an illustrative example, when an English language-speaking model says "thank you" in the live broadcast, the exemplary disclosed agentic AI may modify the language to the Japanese words "ありがとう" (thank you in Japanese) and at the same time modifies the model's lip shape 430 to match the lip shape of saying the Japanese words "ありがとう" (thank you in Japanese) as illustrated in FIG. 27.

In at least some exemplary embodiments, system 300 (e.g., including agentic AI system 700) may operate to provide permissions. For example, prior to invoking the execution module to perform the exemplary disclosed user-perceptible operation based on the execution instruction (e.g., as described above regarding module 725), the exemplary disclosed agentic AI may operate to verify an authority of the agentic AI (e.g., via use of authorization permissions) for invoking the execution module. The exemplary disclosed agentic AI may also operate to, in response to the agentic AI satisfying (e.g., verification that the authorization permissions satisfies) an authorization condition, invoke (e.g., via the agentic AI) the execution module to perform the user-perceptible operation based on the execution instruction. Also for example, the exemplary disclosed agentic AI may operate to, in response to the agentic AI failing to satisfy (e.g., verification that the authorization permissions fail to satisfy) the authorization condition, output (e.g., via the agentic AI) an authorization request for invoking the execution module. The authorization request may be configured to obtain user confirmation from the model user granting the agentic AI permission to invoke the execution module.

Figure 28:
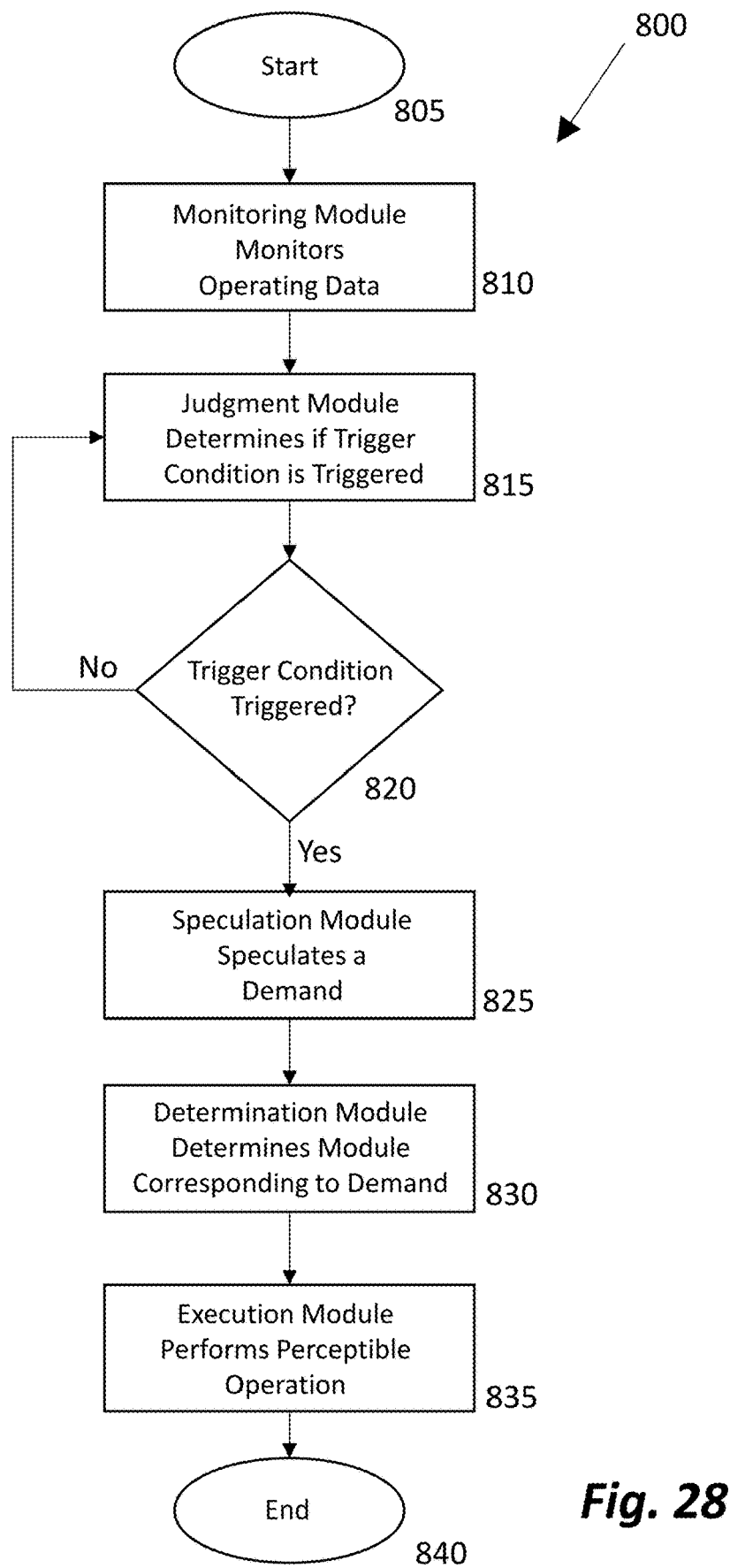
FIG. 28 is a flowchart showing an exemplary process of the present invention.

FIG. 28 illustrates an exemplary process for use of the exemplary disclosed system. Process 800 begins at step 805. At step 810, system 300 (e.g., including agentic AI system 700) may operate to invoke the exemplary disclosed monitoring module to monitor, via the exemplary disclosed agentic AI, the exemplary disclosed operational data associated with the model user's livestream for example as described above. At step 815, system 300 (e.g., including agentic AI system 700) may operate to invoke the exemplary disclosed judgment module to determine, via the exemplary disclosed agentic AI, whether the exemplary disclosed operational data satisfies the exemplary disclosed trigger condition for example as described above.

At step 820, system 300 (e.g., including agentic AI system 700) may operate to determine whether or not a trigger condition has been triggered. If a trigger condition has not been triggered, process 800 may return to step 815. If a trigger condition has been triggered, process 800 may proceed to step 825 as further described below.

At step 825, system 300 (e.g., including agentic AI system 700) may operate to invoke the exemplary disclosed speculation module to speculate, via the exemplary disclosed agentic AI, at least one exemplary disclosed demand of the model user based on the exemplary disclosed operational data and the exemplary disclosed trigger condition for example as described above. At step 830, system 300 (e.g., including agentic AI system 700) may operate to invoke the exemplary disclosed determination module to determine, via the exemplary disclosed agentic AI, at least one exemplary disclosed execution module and an exemplary disclosed execution instruction corresponding to the at least one exemplary disclosed demand of the model user for example as described above. At step 835, system 300 (e.g., including agentic AI system 700) may operate to invoke at least one exemplary disclosed execution module to perform, via the agentic AI, a corresponding exemplary disclosed user-perceptible operation based on the execution instruction for example as described above. The exemplary disclosed user-perceptible operation may be configured to address the at least one exemplary disclosed demand of the model user. Process 800 ends at step 840.

In at least some exemplary embodiments, the exemplary disclosed method may be an interaction method. The interaction method may include invoking a monitoring module (e.g., monitoring module 705) to monitor, via the exemplary disclosed agentic AI, operational data associated with a model user's livestream, wherein the operational data comprises passive data not acted on by the model user without prompting such as at least one of user-imperceptible data, user-neglected data, user-unperceived data, or user-perceptible data lacking utilization guidance. The interaction method may also include invoking a judgment module (e.g., judgment module 710) to determine, via the agentic AI, whether the operational data satisfies a trigger condition. The interaction method may further include invoking a speculation module (e.g., speculation module 715) to speculate, via the agentic AI, at least one demand of the model user based on the operational data and the trigger condition, in response to a determination that the operational data satisfies the trigger condition. The interaction method may also include invoking a determination module (e.g., determination module 720) to determine, via the agentic AI, at least one execution module (e.g., execution module 725) and an execution instruction corresponding to the at least one demand of the model user. The interaction method may further include invoking the at least one execution module to perform, via the agentic AI, a corresponding user-perceptible operation based on the execution instruction, wherein the user-perceptible operation may be configured to address the at least one demand of the model user.

In at least some exemplary embodiments, speculating at least one demand of the model user based on the operational data and the trigger condition may include speculating a plurality of potential exemplary disclosed demands of the model user based on the exemplary disclosed operational data and the exemplary disclosed trigger condition. Speculating at least one demand of the model user based on the operational data and the trigger condition may also include selecting, via a pre-trained speculation algorithm (e.g., similarly to the exemplary disclosed algorithms described herein, for example including the exemplary disclosed comparison operations), at least one of the plurality of potential demands that matches an actual demand of the model user as the at least one demand of the model user. For example, the exemplary disclosed agentic AI may perceive operational data such as the model user's performance. As an illustrative example, real-time analysis of the operational data performed by the exemplary disclosed agentic AI may indicate that the model user has beads of sweat on his or her forehead and a slightly increased breathing rate, indicating that a short break and hydration may be suitable for the model user. The exemplary disclosed agentic AI may also perceive operational data such as comments and barrage data, livestream audience data, and/or data on high-tipping viewers. Also for example, the exemplary disclosed agentic AI may analyze desires or wants of both regular viewers and high-tipping viewers in real-time. The exemplary disclosed agentic AI may also infer or determine the model's goals (e.g., maintaining relationships with high-ticket viewers, earning more tips, and/or any other suitable goals). As an illustrative example, based on combining real-time analysis with the model's goals, the exemplary disclosed agentic AI may infer that the user should take a short break and express gratitude to the high-tipping viewers, while also prepare for the next performance. Accordingly at this point, the exemplary disclosed agentic AI may propose (e.g., decide to suggest) a short break to the model user, allowing the model user to interact with and express gratitude to the high-tipping viewers. The exemplary disclosed agentic AI may also provide a script to the model user for the next performance, including for example suggesting that the model user ask the high-tipping viewers what other performances the high-tipping viewers would like to see.

In at least some exemplary embodiments, the exemplary disclosed operational data may include interaction configuration data (e.g., configuration data as described above) associated with the model user's livestream. The exemplary disclosed method may include speculating, via the exemplary disclosed agentic AI, the at least one demand of the model user based on the exemplary disclosed configuration data and the exemplary disclosed trigger condition. The at least one exemplary disclosed demand may include an audience incentive interaction demand for incentivizing interactions by an audience viewing the model user's livestream, in response to a determination that the configuration data satisfies the trigger condition. The audience incentive interaction demand may be, for example, similar to the exemplary disclosed audience incentive interaction demands described above regarding FIGS. 19A and 19B. The exemplary disclosed method may include causing, via the exemplary disclosed agentic AI, output of the audience incentive interaction demand on an interface (e.g., GUI 405) associated with the model user's livestream.

In at least some exemplary embodiments, the exemplary disclosed method may include causing, via the exemplary disclosed agentic AI, output of a visual effect corresponding to the audience incentive interaction demand on the interface associated with the model user's livestream. As an illustrative example, the visual effect corresponding to the audience incentive interaction demand may be similar to the visual effects illustrated in FIGS. 19A and 19B (e.g., and/or may include any suitable images and/or animation).

In at least some exemplary embodiments, the exemplary disclosed operational data may include audience interaction data associated with the model user's livestream for example as described above regarding FIGS. 22 through 24. In response to a determination (e.g., via the exemplary disclosed agentic AI) that the exemplary disclosed audience interaction data satisfies a trigger condition, the exemplary disclosed agentic AI may speculate the at least one exemplary disclosed demand of the model user based on the audience interaction data and the trigger condition. The at least one demand may include a response demand for responding to the audience interaction data (e.g., as an illustrative example as shown in FIG. 24 and for example as described above regarding FIG. 24). The exemplary disclosed method may include causing, via the exemplary disclosed agentic AI, output of the response demand on an interface (e.g., GUI 405) associated with the model user's livestream. For example, a viewer user may view the response via GUI 405.

In at least some exemplary embodiments, the audience interaction data may include the exemplary disclosed rewards data such as tipping data. The tipping data may include at least one of (e.g., one or more of) a tip type, a tip amount, an audience user ID, a timestamp, and/or any other suitable data. Causing output of the exemplary disclosed response demand may include a visual effect such as causing superimposition. For example, the exemplary disclosed causing superimposition may include superimposing (e.g., displaying), on a video feed of the model user within an interface (e.g., GUI 405) associated with the livestream, a visual effect representing the response demand (e.g., for example as illustrated in one or more of FIGS. 22-24). The visual effect may include at least one of a tip type, a tip amount, an audience user ID, or timestamp and/or any other suitable data.

In at least some exemplary embodiments, the exemplary disclosed operational data may include technical configuration data associated with the model user's livestream. In response to an exemplary disclosed determination (e.g., via the exemplary disclosed agentic AI) that the technical configuration data satisfies the trigger condition, the exemplary disclosed agentic AI may speculate the at least one exemplary disclosed demand of the model user based on the technical configuration data and the trigger condition. The at least one demand may include a software and/or hardware configuration demand (e.g., demand involving or including one or more of the exemplary disclosed software and hardware for example as described herein). For example, the demand may involve operation of the application and/or operation of the model's accessory (e.g., male accessory 308 and/or female accessory 315). The exemplary disclosed agentic AI may cause corresponding software and/or hardware to execute configuration operations (e.g., similar to as described herein regarding the exemplary disclosed configuration data) corresponding to the software and/or hardware configuration demand.

In at least some exemplary embodiments, the exemplary disclosed operational data may include streaming operation configuration data associated with the model user's livestream (e.g., livestream content displayed via GUI 405 including, for example, image and audio data). The streaming operation configuration data may include at least one of temporal information or content information associated with the livestream data. In response to a determination (e.g., via the exemplary disclosed agentic AI) that the at least one of temporal information or content information satisfies the trigger condition, the exemplary disclosed agentic AI may speculate the at least one exemplary disclosed demand of the model user based on the at least one of temporal information or content information, and the trigger condition. The at least one demand may include a promotion demand (e.g., similar to the exemplary disclosed promotional content described above). The exemplary disclosed agentic AI may operate to invoke a predetermined application to output corresponding promotional information (e.g., similar to as described above regarding the exemplary disclosed promotional content).

In at least some exemplary embodiments, the exemplary disclosed operational data may include streaming operation configuration data associated with the model user's livestream. In response to a determination (e.g., via the exemplary disclosed agentic AI) that the streaming operation configuration data satisfies the trigger condition, the exemplary disclosed agentic AI may speculate the at least one exemplary disclosed demand of the model user based on the streaming operation configuration data and the trigger condition. The at least one demand may include a streaming content planning demand (e.g., similar to the exemplary disclosed performance guidance and script described above, for example regarding FIG. 26). The exemplary disclosed agentic AI may cause output of corresponding streaming content planning information to the model user (e.g., similar to the illustrative example shown in FIG. 26).

In at least some exemplary embodiments, the exemplary disclosed agentic AI may determine distinct streaming phases of the model user's livestream. For example, the exemplary disclosed agentic AI may identify, categorize, and/or designate different portions or phases of the model user's livestream content. Further for example, the exemplary disclosed agentic AI may dynamically define distinct trigger conditions (e.g., similarly to as described above regarding the exemplary disclosed trigger conditions) for the operational data according to respective streaming phases determined by the exemplary disclosed agentic AI. The exemplary disclosed distinct streaming phases may be determined by the exemplary disclosed agentic AI based on at least one of (e.g., one or more of) elapsed duration of the model user's livestream, scheduled duration of the model user's livestream, audience user count in the model user's streaming channel (e.g., including being based on data of how the audience count varies), tipping amount from audience users in the model user's streaming channel (e.g., including being based on data of how the tipping amount varies), and/or any other suitable data associated with the livestream content.

In at least some exemplary embodiments, the exemplary disclosed agentic AI may, prior to invoking the execution module to perform the user-perceptible operation based on the execution instruction for example as described above, verify an authority of the agentic AI (e.g., via authorization permissions) for invoking the execution module (e.g., as described above regarding the exemplary disclosed permissions). In response to verification that the agentic AI satisfies (e.g., the authorization permissions satisfy) an authorization condition as described above, the exemplary disclosed agentic AI may invoke the exemplary disclosed execution module to perform the exemplary disclosed user-perceptible operation based on the exemplary disclosed execution instruction.

In at least some exemplary embodiments, the exemplary disclosed agentic AI may, in response to the agentic AI failing to satisfy (e.g., verification that the authorization permissions fail to satisfy) the authorization condition, output an authorization request for invoking the exemplary disclosed execution module. The authorization request may be configured to obtain user confirmation from the model user granting the agentic AI permission to invoke the exemplary disclosed execution module.

In at least some exemplary embodiments, the exemplary disclosed agentic AI may compare a predicted model user demand with actual live broadcast data for example as described above to obtain an comparison result. The exemplary disclosed agentic AI may iterate (e.g., iteratively generate) a next prediction operation based on the comparison result. The next prediction operation may include a next demand prediction operation for the current model live broadcast and a demand prediction operation for the next model live broadcast. The exemplary disclosed agentic AI may thereby predict demand for future livestreams of a model user.

The invention includes other illustrative embodiments ("Embodiments") as follows.

Embodiment 1: An interaction method, comprising: invoking a monitoring module to monitor, via an agentic AI, operational data associated with a livestream of a model user, wherein the operational data includes passive data not acted on by the model user without prompting (e.g., user-imperceptible data, user-neglected data, user-unperceived data, and/or user-perceptible data lacking utilization guidance); invoking a judgment module to determine, via the agentic AI, whether the operational data satisfies a trigger condition; invoking a speculation module to speculate, via the agentic AI, at least one demand of the model user based on the operational data and the trigger condition, in response to a determination that the operational data satisfies the trigger condition; invoking a determination module to determine, via the agentic AI, at least one execution module and an execution instruction corresponding to the at least one demand of the model user; and invoking the at least one execution module to perform, via the agentic AI, a corresponding user-perceptible operation based on the execution instruction, wherein the user-perceptible operation is configured to address the at least one demand of the model user.

Embodiment 2: The interaction method of Embodiment 1, wherein speculating the at least one demand of the model user based on the operational data and the trigger condition includes: speculating a plurality of potential demands of the model user based on the operational data and the trigger condition; and selecting, via a pre-trained speculation algorithm, at least one of the plurality of potential demands matching an actual demand of the model user as the at least one demand of the model user.

Embodiment 3: The interaction method of Embodiment 2, wherein speculating the plurality of potential demands of the model user based on the operational data and the trigger condition includes: performing real-time analysis on the operational data and the trigger condition; speculating or determining one or more objectives of the model user; speculating the plurality of potential demands of the model user based on the real-time analysis of the operational data and the trigger condition and the one or more objectives of the model user.

Embodiment 4: The interaction method of Embodiment 1, wherein the operational data includes interaction configuration data associated with the livestream of the model user, the interaction method further comprising: speculating, via the agentic AI, the at least one demand of the model user based on the interaction configuration data and the trigger condition, wherein the at least one demand includes an audience incentive interaction demand for incentivizing interactions by an audience viewing the livestream of the model user, in response to a determination that the interaction configuration data satisfies the trigger condition; and causing, via the agentic AI, output of the audience incentive interaction demand on an interface associated with the livestream of the model user.

Embodiment 5: The interaction method of Embodiment 4, further comprising causing, via the agentic AI, output of a visual effect corresponding to the audience incentive interaction demand on the interface associated with the livestream of the model user.

Embodiment 6: The interaction method of Embodiment 1, wherein the operational data includes audience interaction data associated with the livestream of the model user, the interaction method further comprising: in response to a determination, via the agentic AI, that the audience interaction data satisfies the trigger condition, speculating, via the agentic AI, the at least one demand of the model user based on the audience interaction data and the trigger condition; wherein the at least one demand includes a response demand for responding to the audience interaction data; and causing, via the agentic AI, output of the response demand on an interface associated with the livestream of the model user.

Embodiment 7: The interaction method of Embodiment 6, wherein: the audience interaction data includes tipping data including at least one selected from the group of a tip type, a tip amount, an audience user ID, a timestamp, and combinations thereof; and the causing output of the response demand includes causing superimposition, on a video feed of the model user displayed using the interface associated with the livestream, of a visual effect representing the response demand; wherein the visual effect includes at least one selected from the group of the tip type, the tip amount, the audience user ID, the timestamp, and combinations thereof.

Embodiment 8: The interaction method of Embodiment 1, wherein the operational data includes technical configuration data associated with the livestream of the model user, the interaction method further comprising: in response to a determination, via the agentic AI, that the technical configuration data satisfies the trigger condition: speculating, via the agentic AI, the at least one demand of the model user based on the technical configuration data and the trigger condition, wherein the at least one demand includes at least one of a software configuration demand or a hardware configuration demand; and causing, via the agentic AI, at least one of corresponding software or hardware to execute configuration operations corresponding to the at least one of the software configuration demand or the hardware configuration demand.

Embodiment 9: The interaction method of Embodiment 1, wherein the operational data includes streaming operation configuration data associated with the livestream of the model user, the streaming operation configuration data including at least one of temporal information or content information, the interaction method further comprising: in response to a determination, via the agentic AI, that the at least one of temporal information or content information satisfies the trigger condition: speculating, via the agentic AI, the at least one demand of the model user based on the trigger condition and the at least one of temporal information or content information, wherein the at least one demand includes a promotion demand; and invoking, via the agentic AI, a predetermined application to output promotional information corresponding to the promotion demand.

Embodiment 10: The interaction method of Embodiment 1, wherein the operational data includes streaming operation configuration data associated with the livestream of the model user, further comprising: in response to a determination, via the agentic AI, that the streaming operation configuration data satisfies the trigger condition: speculating, via the agentic AI, the at least one demand of the model user based on the streaming operation configuration data and the trigger condition, wherein the at least one demand includes a streaming content planning demand; and causing, via the agentic AI, output of streaming content planning information, corresponding to the streaming content planning demand, to the model user.

Embodiment 11: The interaction method of Embodiment 10, further comprising: determining, via the agentic AI, distinct streaming phases of the livestream of the model user; and dynamically defining, via the agentic AI, distinct trigger conditions for the operational data according to respective distinct streaming phases.

Embodiment 12: The interaction method of Embodiment 11, wherein the distinct streaming phases are determined based on at least one of: an elapsed duration of the livestream of the model user; a scheduled duration of the livestream of the model user; an audience user count in a streaming channel of the model user; or a tipping amount from audience users in the streaming channel of the model user.

Embodiment 13: The interaction method of Embodiment 1, further comprising, prior to the invoking the at least one execution module to perform the user-perceptible operation based on the execution instruction: verifying an authority of the agentic AI for invoking the at least one execution module; and in response to the agentic AI satisfying an authorization condition, invoking, via the agentic AI, the at least one execution module to perform the user-perceptible operation based on the execution instruction.

Embodiment 14: The interaction method of Embodiment 13, further comprising: in response to the agentic AI failing to satisfy the authorization condition, outputting, via the agentic AI, an authorization request for invoking the at least one execution module; wherein the authorization request is configured to obtain user confirmation from the model user granting the agentic AI permission to invoke the at least one execution module.

Embodiment 15: The interaction method of Embodiment 1, further comprising: comparing, via the agentic AI, a predicted model user demand with actual live broadcast data associated with the livestream of the model user to obtain a comparison result; and iterating, via the agentic AI, a next prediction operation based on the comparison result; wherein the next prediction operation includes a next demand prediction operation of a current model live broadcast associated with the livestream of the model user and a demand prediction operation of a next model live broadcast associated with the livestream of the model user.

Embodiment 16: An interaction system, comprising: a monitoring module, a judgment module, a speculation module, a determination module, and at least one execution module, the modules comprising computer-executable code stored in non-volatile memory; and a memory for storing instructions and a processor for executing the instructions; wherein the computer-executable code, when operating on the processor, causes the system to: invoke the monitoring module to monitor, via an agentic AI, operational data associated with a livestream of a model user, wherein the operational data includes passive data not acted on by the model user without prompting (e.g., user-imperceptible data, user-neglected data, user-unperceived data, and/or user-perceptible data lacking utilization guidance); invoke the judgment module to determine, via the agentic AI, whether the operational data satisfies a trigger condition; invoke the speculation module to speculate, via the agentic AI, at least one demand of the model user based on the operational data and the trigger condition, in response to a determination that the operational data satisfies the trigger condition; invoke the determination module to determine, via the agentic AI, at least one execution module and an execution instruction corresponding to the at least one demand of the model user; and invoke the at least one execution module to perform, via the agentic AI, a corresponding user-perceptible operation based on the execution instruction, wherein the user-perceptible operation is configured to address the at least one demand of the model user.

Embodiment 17: The interaction system of Embodiment 16, wherein the computer-executable code, when operating on the processor, and causing the system to speculate the at least one demand of the model user based on the operational data and the trigger condition, includes: speculating a plurality of potential demands of the model user based on the operational data and the trigger condition; and selecting, via a pre-trained speculation algorithm, at least one of the plurality of potential demands matching an actual demand of the model user as the at least one demand of the model user.

Embodiment 18: The interaction system of Embodiment 16, wherein the operational data includes interaction configuration data associated with the livestream of the model user, and the computer-executable code, when operating on the processor, further causes the system to: speculate, via the agentic AI, the at least one demand of the model user based on the interaction configuration data and the trigger condition, wherein the at least one demand includes an audience incentive interaction demand for incentivizing interactions by an audience viewing the livestream of the model user, in response to a determination that the interaction configuration data satisfies the trigger condition; and cause, via the agentic AI, output of the audience incentive interaction demand on an interface associated with the livestream of the model user.

Embodiment 19: A non-transitory computer-readable storage medium, comprising: machine-readable instructions, the machine-readable instructions, when executed by a processor of a controller, cause the controller to: invoke a monitoring module to monitor, via an agentic AI, operational data associated with a livestream of a model user, wherein the operational data includes passive data not acted on by the model user without prompting (e.g., user-imperceptible data, user-neglected data, user-unperceived data, and/or user-perceptible data lacking utilization guidance); invoke a judgment module to determine, via the agentic AI, whether the operational data satisfies a trigger condition; invoke a speculation module to speculate, via the agentic AI, at least one demand of the model user based on the operational data and the trigger condition, in response to a determination that the operational data satisfies the trigger condition; invoke a determination module to determine, via the agentic AI, at least one execution module and an execution instruction corresponding to the at least one demand of the model user; and invoke the at least one execution module to perform, via the agentic AI, a corresponding user-perceptible operation based on the execution instruction, wherein the user-perceptible operation is configured to address the at least one demand of the model user.

Embodiment 20: The non-transitory computer-readable storage medium of Embodiment 19, wherein the operational data includes audience interaction data associated with the livestream of the model user, and the machine-readable instructions, when executed by a processor of a controller, further causes the controller to: in response to a determination, via the agentic AI, that the audience interaction data satisfies the trigger condition, speculate, via the agentic AI, the at least one demand of the model user based on the audience interaction data and the trigger condition; wherein the at least one demand includes a response demand for responding to the audience interaction data; and cause, via the agentic AI, output of the response demand on an interface associated with the livestream of the model user.

Embodiment 21: An interactive method, comprising: monitoring, using a monitoring module, operational data of a live broadcast of a live broadcast platform, the operational data of the live broadcast including at least one of operational data of the live broadcast associated with a model and operational data of the live broadcast of other models of the live broadcast platform; determining, using a determination module, execution information in response to the operational data of the live broadcast satisfying triggering of a reminder event, wherein the execution information includes determining an application module as an execution object for executing a corresponding reminder operation; and executing, using the application module, the corresponding reminder operation in response to the execution information, wherein the corresponding reminder operation is configured to characterize the reminder event to the model.

Embodiment 22: The interactive method of Embodiment 21, wherein the operational data of the live broadcast associated with the model includes at least one of historical live broadcast data of the live broadcast associated with the model, real-time live broadcast data of the live broadcast associated with the model, or statistical data associated with the model determined after the live broadcast; the interactive method further comprising determining, at different stages of the model's live broadcast, the execution information based on preset rules at the different stages of the model's live broadcast.

Embodiment 23: The interactive method of Embodiment 21, wherein the application module that executes the corresponding reminder operation is configured to characterize the reminder event to the model differently from how the live broadcast platform displays the operation data of the live broadcast.

Embodiment 24: The interactive method of Embodiment 21, wherein executing, using the application module, the corresponding reminder operation includes: executing, using the application module, at least one of outputting visual prompt information, outputting messages that are perceptible by the model's senses, and activating a predetermined program function.

Embodiment 25: The interactive method of Embodiment 21, wherein executing, using the application module, the corresponding reminder operation includes: executing, using the application module, display of a notification message on a preset user interface to characterize the reminder event to the model; wherein the notification message includes at least one of text, image, audio, or video.

Embodiment 26: The interactive method of Embodiment 25, wherein: the notification message includes at least one of preset text, image, audio, or video; or the notification message includes at least one of text, image, audio, or video generated by an AI model based on the operational data of the live broadcast, wherein the notification message generated by the AI model is associated with a preset characteristic of the model or one or more viewers of an audience.

Embodiment 27: The interactive method of Embodiment 21, wherein executing, using the application module, the corresponding reminder operation includes: executing, using the application module, display of an action prompt for a different reminder event than the reminder event;

wherein the action prompt is configured to prompt the model to provide feedback on the reminder event to one or more viewers of the audience.

Embodiment 28: The interactive method of Embodiment 21, further comprising: monitoring, using the monitoring module, the model's body movements; and rendering a special effect corresponding to the action prompts on the display of the live broadcast on the preset user interface when the model's body movements match the action prompts; wherein the special effect is pushed to at least one of the one or more viewers of the audience viewing the live broadcast.

Embodiment 29: The interactive method of Embodiment 21, further comprising: generating a reminder message of at least one of the application module performing the corresponding operation or feedback of the model on the application module performing the corresponding operation; and pushing the reminder message to at least one of one or more viewers of the audience viewing the live broadcast.

Embodiment 30: The interactive method of Embodiment 21, wherein the operational data of the live broadcast includes at least one of a number of viewers of the live broadcast, a number of viewers' rewards, an amount of viewers' rewards, times of viewers' rewards, viewers' identities, viewers' characteristic information, or the data of one or more other live broadcasts of one or more of the other models.

Embodiment 31: The interactive method of Embodiment 21, wherein the execution object includes a stimulation device of the model, the interactive method further comprising: performing, using the stimulation device of the model, at least one action corresponding to the reminder event to characterize the reminder event to the model; wherein an association between the at least one action performed by the stimulation device and the reminder event is preset.

Embodiment 32: The interactive method of Embodiment 21, wherein the application module includes one or more software modules running on equipment of the model, the application module including at least one of a smart panel, game plug-ins, or toy control plug-ins, each of which assist the model in live broadcasting.

Embodiment 33: The interactive method of Embodiment 21, wherein executing, using the application module, the corresponding reminder operation in response to the execution information includes: recording, using a recording module, a video of the live broadcast of the model for a preset duration; and saving, using a memory module, the recording video of the live broadcast of the model associated with the reminder event.

Embodiment 34: The interactive method of Embodiment 21, wherein executing, using the application module, the corresponding reminder operation in response to the execution information includes: recording, using an analysis module, at least one time node of the operational data of the live broadcast that satisfies triggering of the reminder event; saving, using an analysis module, live broadcast data of the model and associating the live broadcast data with the at least one time node of the reminder event; and displaying, using a display module, a relationship between the live broadcast data of the model, the reminder event, and the at least one time node of the reminder event on a preset graphical interface; wherein, the live broadcast data is a recording video of the live broadcast of the model.

Embodiment 35: An interactive system, comprising: a monitoring module, a determination module, and an application module, the modules comprising computer-executable code stored in non-volatile memory; and a memory for storing instructions and a processor for executing the instructions; wherein the computer-executable code, when operating on the processor, causes the system to: monitor, using the monitoring module, operational data of a live broadcast of a live broadcast platform, the operational data of the live broadcast including at least one of operational data of the live broadcast associated with a model and operational data of the live broadcast of other models of the live broadcast platform; determine, using the determination module, execution information in response to the operational data of the live broadcast satisfying triggering of a reminder event, wherein the execution information includes determining the application module as an execution object for executing a corresponding reminder operation; and execute, using the application module, the corresponding reminder operation in response to the execution information, wherein the corresponding reminder operation is configured to characterize the reminder event to the model.

Embodiment 36: The interactive system of Embodiment 35, wherein the operational data of the live broadcast associated with the model includes at least one of historical live broadcast data of the live broadcast associated with the model, real-time live broadcast data of the live broadcast associated with the model, or statistical data associated with the model determined after the live broadcast; the interactive system further comprising determining, at different stages of the model's live broadcast, the execution information based on preset rules at the different stages of the model's live broadcast.

Embodiment 37: The interactive system of Embodiment 35, wherein the application module that executes the corresponding reminder operation is configured to characterize the reminder event to the model differently from how the live broadcast platform displays the operation data of the live broadcast.

Embodiment 38: The interactive system of Embodiment 35, wherein executing, using the application module, the corresponding reminder operation includes: outputting visual prompt information, outputting messages that the model perceives with the model's senses, and activating a predetermined program function.

Embodiment 39: A non-transitory computer-readable storage medium, comprising: machine-readable instructions, the machine-readable instructions, when executed by a processor of a controller, cause the controller to: monitor, using a monitoring module, operational data of a live broadcast of a live broadcast platform, the operational data of the live broadcast including at least one of operational data of the live broadcast associated with a model and operational data of the live broadcast of other models of the live broadcast platform; determine, using a determination module, execution information in response to the operational data of the live broadcast satisfying triggering of a reminder event, wherein the execution information includes determining an application module as an execution object for executing a corresponding reminder operation; and execute, using the application module, the corresponding reminder operation in response to the execution information, wherein the corresponding reminder operation is configured to characterize the reminder event to the model.

Embodiment 40: The non-transitory computer-readable storage medium of Embodiment 19, wherein executing, using the application module, the corresponding reminder operation includes: executing, using the application module, display of a notification message on a preset user interface to characterize the reminder event to the model; wherein the notification message includes at least one of text, image, audio, or video.

The exemplary disclosed system and method may provide an efficient and effective technique for models to be notified of valuable data during a live broadcast. The exemplary disclosed system and method may provide an efficient and effective technique for models to perform actions during a livestream based on data obtained in real-time (e.g., real-time and/or near real-time) during a broadcast. For example, the exemplary disclosed system and method may provide a technique for models to quickly provide feedback to viewers based on significant amounts of data generated during a live broadcast. The exemplary disclosed system and method may provide an efficient and effective technique for managing complicated settings for a live broadcast when a user such as a model is preparing for and/or participating in a livestream broadcast. Also for example, the exemplary disclosed system and method may provide an efficient and effective technique for managing viewer and system messaging during livestreaming.

In at least some exemplary embodiments, the exemplary disclosed system and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

An illustrative representation of a computing device appropriate for use with embodiments of the system of the present disclosure is shown in FIG. 29. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 30, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Referring to FIG. 30, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 30, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An interaction method, comprising:
    invoking a monitoring module to monitor, via an agentic AI, operational data associated with a livestream of a model user, wherein the operational data includes passive data not acted on by the model user without prompting;

invoking a judgment module to determine, via the agentic AI, whether the operational data satisfies a trigger condition;

invoking a speculation module to speculate, via the agentic AI, at least one demand of the model user based on the operational data and the trigger condition, in response to a determination that the operational data satisfies the trigger condition;

invoking a determination module to determine, via the agentic AI, at least one execution module and an execution instruction corresponding to the at least one demand of the model user; and invoking the at least one execution module to perform, via the agentic AI, a corresponding user-perceptible operation based on the execution instruction, wherein the user-perceptible operation is configured to address the at least one demand of the model user.

2. The interaction method of claim 1, wherein speculating the at least one demand of the model user based on the operational data and the trigger condition includes:

speculating a plurality of potential demands of the model user based on the operational data and the trigger condition; and selecting, via a pre-trained speculation algorithm, at least one of the plurality of potential demands matching an actual demand of the model user as the at least one demand of the model user.

3. The interaction method of claim 2, wherein speculating the plurality of potential demands of the model user based on the operational data and the trigger condition includes:

performing real-time analysis on the operational data and the trigger condition;

speculating or determining one or more objectives of the model user;

speculating the plurality of potential demands of the model user based on the real-time analysis of the operational data and the trigger condition and the one or more objectives of the model user.

4. The interaction method of claim 1, wherein the operational data includes interaction configuration data associated with the livestream of the model user, the interaction method further comprising:

speculating, via the agentic AI, the at least one demand of the model user based on the interaction configuration data and the trigger condition, wherein the at least one demand includes an audience incentive interaction demand for incentivizing interactions by an audience viewing the livestream of the model user, in response to a determination that the interaction configuration data satisfies the trigger condition; and causing, via the agentic AI, output of the audience incentive interaction demand on an interface associated with the livestream of the model user.

5. The interaction method of claim 4, further comprising causing, via the agentic AI, output of a visual effect corresponding to the audience incentive interaction demand on the interface associated with the livestream of the model user.

6. The interaction method of claim 1, wherein the operational data includes audience interaction data associated with the livestream of the model user, the interaction method further comprising:

in response to a determination, via the agentic AI, that the audience interaction data satisfies the trigger condition, speculating, via the agentic AI, the at least one demand of the model user based on the audience interaction data and the trigger condition;

wherein the at least one demand includes a response demand for responding to the audience interaction data; and causing, via the agentic AI, output of the response demand on an interface associated with the livestream of the model user.

7. The interaction method of claim 6, wherein:

the audience interaction data includes tipping data including at least one selected from the group of a tip type, a tip amount, an audience user ID, a timestamp, and combinations thereof; and the causing output of the response demand includes causing superimposition, on a video feed of the model user displayed using the interface associated with the livestream, of a visual effect representing the response demand;

wherein the visual effect includes at least one selected from the group of the tip type, the tip amount, the audience user ID, the timestamp, and combinations thereof.

8. The interaction method of claim 1, wherein the operational data includes technical configuration data associated with the livestream of the model user, the interaction method further comprising:

in response to a determination, via the agentic AI, that the technical configuration data satisfies the trigger condition:

speculating, via the agentic AI, the at least one demand of the model user based on the technical configuration data and the trigger condition, wherein the at least one demand includes at least one of a software configuration demand or a hardware configuration demand; and causing, via the agentic AI, at least one of corresponding software or hardware to execute configuration operations corresponding to the at least one of the software configuration demand or the hardware configuration demand.

9. The interaction method of claim 1, wherein the operational data includes streaming operation configuration data associated with the livestream of the model user, the streaming operation configuration data including at least one of temporal information or content information, the interaction method further comprising:

in response to a determination, via the agentic AI, that the at least one of temporal information or content information satisfies the trigger condition:

speculating, via the agentic AI, the at least one demand of the model user based on the trigger condition and the at least one of temporal information or content information, wherein the at least one demand includes a promotion demand; and invoking, via the agentic AI, a predetermined application to output promotional information corresponding to the promotion demand.

10. The interaction method of claim 1, wherein the operational data includes streaming operation configuration data associated with the livestream of the model user, further comprising:

in response to a determination, via the agentic AI, that the streaming operation configuration data satisfies the trigger condition:

speculating, via the agentic AI, the at least one demand of the model user based on the streaming operation configuration data and the trigger condition, wherein the at least one demand includes a streaming content planning demand; and causing, via the agentic AI, output of streaming content planning information, corresponding to the streaming content planning demand, to the model user.

11. The interaction method of claim 10, further comprising:
determining, via the agentic AI, distinct streaming phases of the livestream of the model user; and
dynamically defining, via the agentic AI, distinct trigger conditions for the operational data according to respective distinct streaming phases.

12. The interaction method of claim 11, wherein the distinct streaming phases are determined based on at least one of:
an elapsed duration of the livestream of the model user;
a scheduled duration of the livestream of the model user;
an audience user count in a streaming channel of the model user; or
a tipping amount from audience users in the streaming channel of the model user.

13. The interaction method of claim 1, further comprising, prior to the invoking the at least one execution module to perform the user-perceptible operation based on the execution instruction:
verifying an authority of the agentic AI for invoking the at least one execution module; and
in response to the agentic AI satisfying an authorization condition, invoking, via the agentic AI, the at least one execution module to perform the user-perceptible operation based on the execution instruction.

14. The interaction method of claim 13, further comprising:
in response to the agentic AI failing to satisfy the authorization condition, outputting, via the agentic AI, an authorization request for invoking the at least one execution module;
wherein the authorization request is configured to obtain user confirmation from the model user granting the agentic AI permission to invoke the at least one execution module.

15. The interaction method of claim 1, further comprising:
comparing, via the agentic AI, a predicted model user demand with actual live broadcast data associated with the livestream of the model user to obtain a comparison result; and
iterating, via the agentic AI, a next prediction operation based on the comparison result;
wherein the next prediction operation includes a next demand prediction operation of a current model live broadcast associated with the livestream of the model user and a demand prediction operation of a next model live broadcast associated with the livestream of the model user.

16. An interaction system, comprising:
a monitoring module, a judgment module, a speculation module, a determination module, and at least one execution module, the modules comprising computer-executable code stored in non-volatile memory; and
a memory for storing instructions and a processor for executing the instructions;
wherein the computer-executable code, when operating on the processor, causes the system to:
invoke the monitoring module to monitor, via an agentic AI, operational data associated with a livestream of a model user, wherein the operational data includes passive data not acted on by the model user without prompting;
invoke the judgment module to determine, via the agentic AI, whether the operational data satisfies a trigger condition;
invoke the speculation module to speculate, via the agentic AI, at least one demand of the model user based on the operational data and the trigger condition, in response to a determination that the operational data satisfies the trigger condition;
invoke the determination module to determine, via the agentic AI, at least one execution module and an execution instruction corresponding to the at least one demand of the model user; and
invoke the at least one execution module to perform, via the agentic AI, a corresponding user-perceptible operation based on the execution instruction, wherein the user-perceptible operation is configured to address the at least one demand of the model user.

17. The interaction system of claim 16, wherein the computer-executable code, when operating on the processor, and causing the system to speculate the at least one demand of the model user based on the operational data and the trigger condition, includes:
speculating a plurality of potential demands of the model user based on the operational data and the trigger condition; and
selecting, via a pre-trained speculation algorithm, at least one of the plurality of potential demands matching an actual demand of the model user as the at least one demand of the model user.

18. The interaction system of claim 16, wherein the operational data includes interaction configuration data associated with the livestream of the model user, and the computer-executable code, when operating on the processor, further causes the system to:
speculate, via the agentic AI, the at least one demand of the model user based on the interaction configuration data and the trigger condition, wherein the at least one demand includes an audience incentive interaction demand for incentivizing interactions by an audience viewing the livestream of the model user, in response to a determination that the interaction configuration data satisfies the trigger condition; and
cause, via the agentic AI, output of the audience incentive interaction demand on an interface associated with the livestream of the model user.

19. A non-transitory computer-readable storage medium, comprising:
machine-readable instructions,
the machine-readable instructions, when executed by a processor of a controller, cause the controller to:
invoke a monitoring module to monitor, via an agentic AI, operational data associated with a livestream of a model user, wherein the operational data includes passive data not acted on by the model user without prompting;
invoke a judgment module to determine, via the agentic AI, whether the operational data satisfies a trigger condition;
invoke a speculation module to speculate, via the agentic AI, at least one demand of the model user based on the operational data and the trigger condition, in response to a determination that the operational data satisfies the trigger condition;
invoke a determination module to determine, via the agentic AI, at least one execution module and an execution instruction corresponding to the at least one demand of the model user; and invoke the at least one execution module to perform, via the agentic AI, a corresponding user-perceptible operation based on the execution instruction, wherein the user-perceptible operation is configured to address the at least one demand of the model user.

20. The non-transitory computer-readable storage medium of claim 19, wherein the operational data includes audience interaction data associated with the livestream of the model user, and the machine-readable instructions, when executed by a processor of a controller, further causes the controller to:
- in response to a determination, via the agentic AI, that the audience interaction data satisfies the trigger condition, speculate, via the agentic AI, the at least one demand of the model user based on the audience interaction data and the trigger condition;
- wherein the at least one demand includes a response demand for responding to the audience interaction data; and
- cause, via the agentic AI, output of the response demand on an interface associated with the livestream of the model user.

\* \* \* \* \*